US012684621B2

(12) United States Patent
Zhang et al.

(10) Patent No.: US 12,684,621 B2
(45) Date of Patent: Jul. 14, 2026

(54) TECHNIQUES FOR FULL-DUPLEX CHANNEL ACCESS IN SHARED RADIO FREQUENCY SPECTRUM

(71) Applicant: QUALCOMM Incorporated, San Diego, CA (US)

(72) Inventors: Qian Zhang, Basking Ridge, NJ (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 393 days.

(21) Appl. No.: 18/446,168

(22) Filed: Aug. 8, 2023

(65) Prior Publication Data

US 2025/0056608 A1      Feb. 13, 2025

(51) Int. Cl.
*H04W 74/0816*      (2024.01)
*H04W 72/1268*      (2023.01)
*H04W 72/1273*      (2023.01)

(52) U.S. Cl.
CPC ... *H04W 74/0816* (2013.01); *H04W 72/1268* (2013.01); *H04W 72/1273* (2013.01)

(58) Field of Classification Search
CPC ......... H04W 72/1263; H04W 72/1268; H04W 72/1273; H04W 72/232; H04W 74/0816
See application file for complete search history.

(56) References Cited

U.S. PATENT DOCUMENTS

2020/0314906 A1 * 10/2020 Goyal ............... H04W 74/0816
2022/0124806 A1 * 4/2022 Hu ..................... H04W 16/28
2023/0354275 A1 * 11/2023 Moon ............... H04W 72/0446
2025/0176017 A1 * 5/2025 Talarico ........... H04W 74/0808

FOREIGN PATENT DOCUMENTS

WO      WO-2024262410 A1 * 12/2024   ........ H04W 72/0446

* cited by examiner

*Primary Examiner* — Awet Haile
(74) *Attorney, Agent, or Firm* — Holland & Hart LLP/Qualcomm Incorporated

(57)      ABSTRACT

Methods, systems, and devices for wireless communication are described for full-duplex communications using shared radio frequency spectrum. An uplink user equipment (UE) may be scheduled for an uplink transmission in a full-duplex channel occupancy time (COT), concurrently with one or more downlink transmissions of a downlink UE using the same wireless resources. Prior to transmitting the uplink communications, the uplink UE may perform a listen-before-talk (LBT) procedure, may provide an indication that LBT has passed, and then transmit the uplink communication. The network entity may monitor for the indication from the uplink UE and, upon detection, may continue to transmit a downlink grant to the downlink UE. If the network entity does not detect a signal from the uplink UE, it may transmit a different uplink grant to a different uplink UE, or may adjust the downlink transmission to use different resources or transmission parameters.

29 Claims, 31 Drawing Sheets

210-a 115-a 205-a

220

235

225

210-b

230

105-a

215

205-b 115-b

UL Grant 215

DL Grant 220

LBT confirmation indication 225

UL Transmission 230

DL Transmission 235

200

130

105

115

Network
Entity

Transceiver

1610

Antenna

1615

Communications
Manager

1620

Memory

Code

1630

1625

1640

Processor

1635

1605

1600

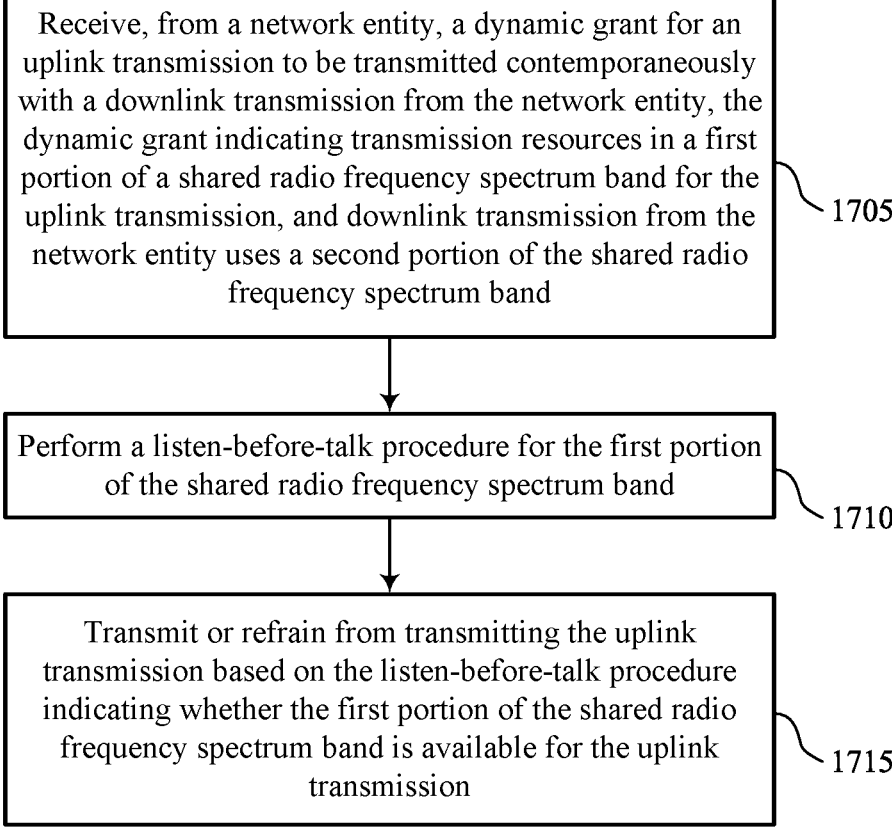

Receive, from a network entity, a dynamic grant for an uplink transmission to be transmitted contemporaneously with a downlink transmission from the network entity, the dynamic grant indicating transmission resources in a first portion of a shared radio frequency spectrum band for the uplink transmission, and downlink transmission from the network entity uses a second portion of the shared radio frequency spectrum band

1705

Perform a listen-before-talk procedure for the first portion of the shared radio frequency spectrum band

1710

Transmit or refrain from transmitting the uplink transmission based on the listen-before-talk procedure indicating whether the first portion of the shared radio frequency spectrum band is available for the uplink transmission

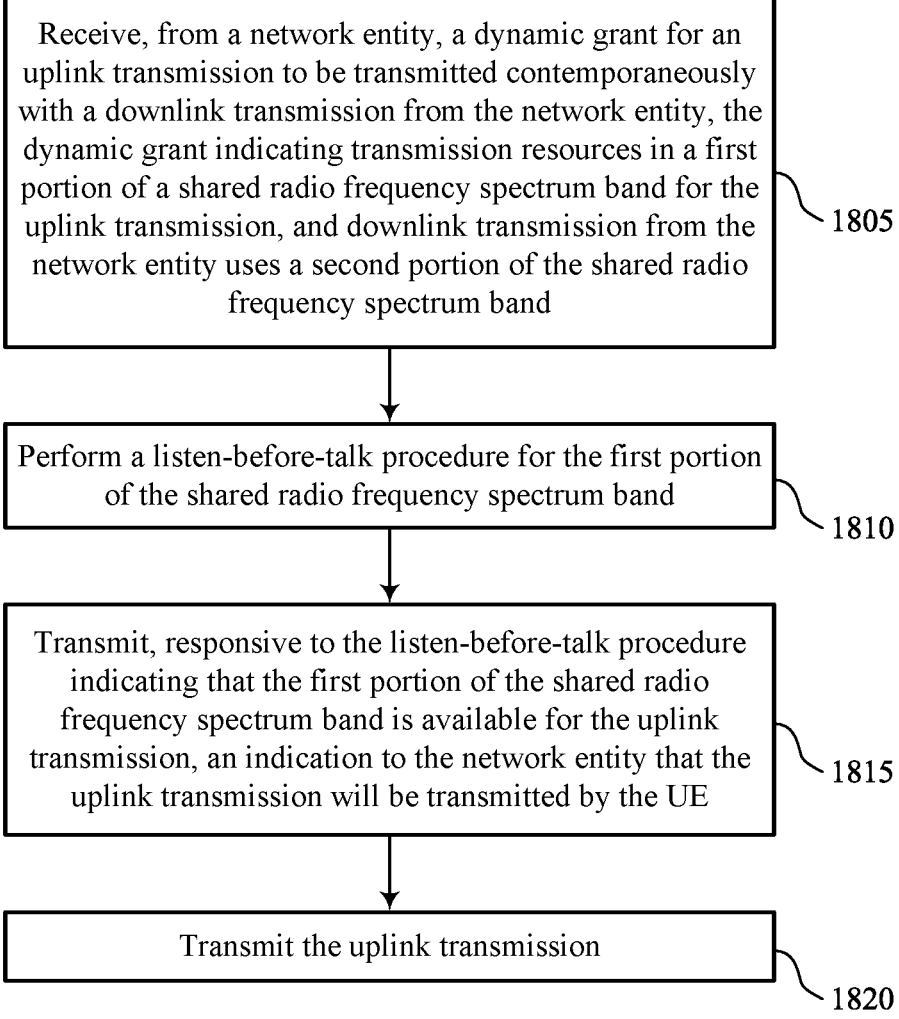

Receive, from a network entity, a dynamic grant for an uplink transmission to be transmitted contemporaneously with a downlink transmission from the network entity, the dynamic grant indicating transmission resources in a first portion of a shared radio frequency spectrum band for the uplink transmission, and downlink transmission from the network entity uses a second portion of the shared radio frequency spectrum band

1805

Perform a listen-before-talk procedure for the first portion of the shared radio frequency spectrum band

1810

Transmit, responsive to the listen-before-talk procedure indicating that the first portion of the shared radio frequency spectrum band is available for the uplink transmission, an indication to the network entity that the uplink transmission will be transmitted by the UE

1815

Transmit the uplink transmission

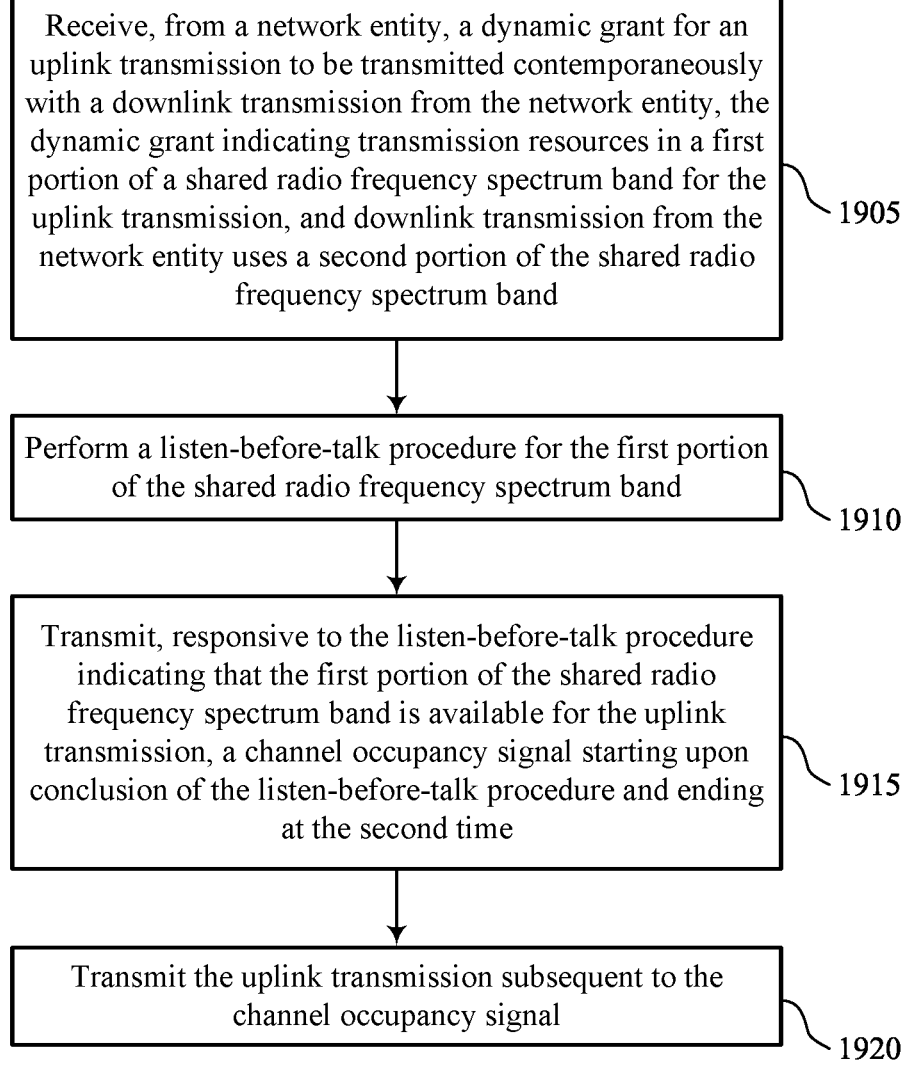

Receive, from a network entity, a dynamic grant for an uplink transmission to be transmitted contemporaneously with a downlink transmission from the network entity, the dynamic grant indicating transmission resources in a first portion of a shared radio frequency spectrum band for the uplink transmission, and downlink transmission from the network entity uses a second portion of the shared radio frequency spectrum band     1905

Perform a listen-before-talk procedure for the first portion of the shared radio frequency spectrum band     1910

Transmit, responsive to the listen-before-talk procedure indicating that the first portion of the shared radio frequency spectrum band is available for the uplink transmission, a channel occupancy signal starting upon conclusion of the listen-before-talk procedure and ending at the second time     1915

Transmit the uplink transmission subsequent to the channel occupancy signal     1920

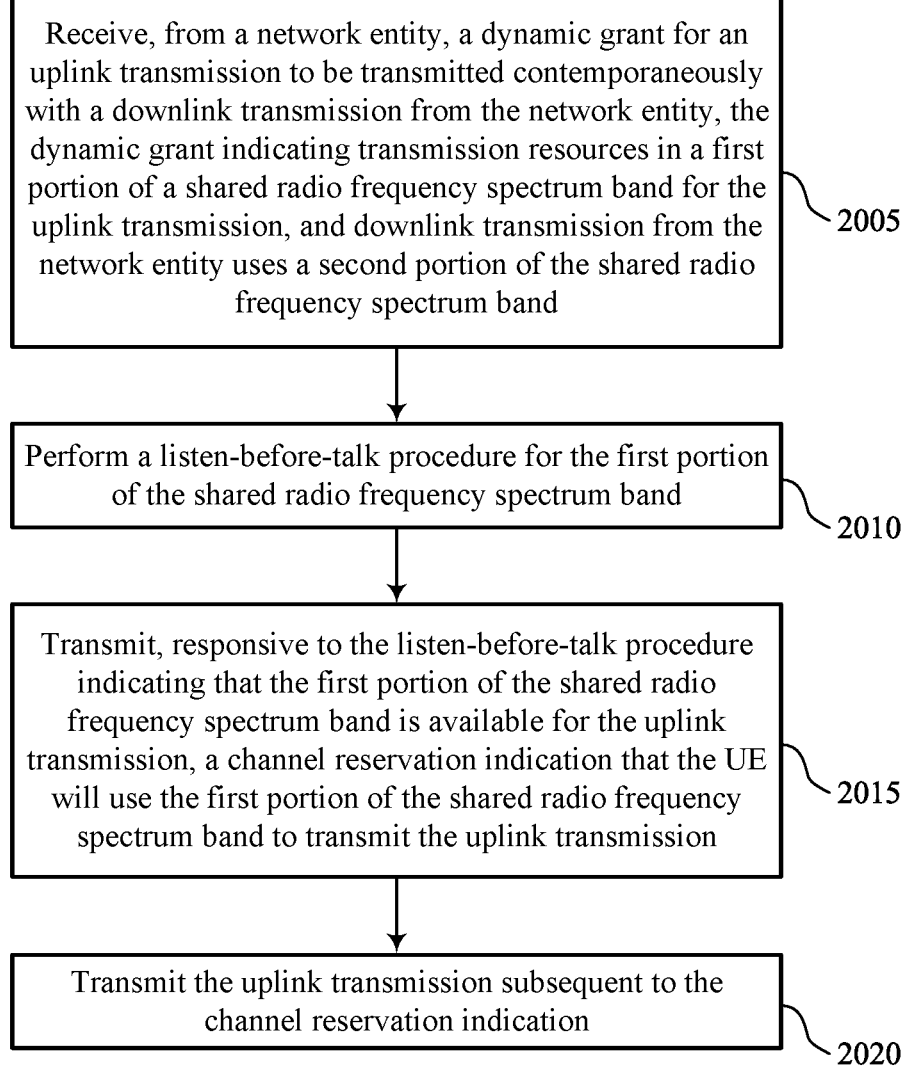

Receive, from a network entity, a dynamic grant for an uplink transmission to be transmitted contemporaneously with a downlink transmission from the network entity, the dynamic grant indicating transmission resources in a first portion of a shared radio frequency spectrum band for the uplink transmission, and downlink transmission from the network entity uses a second portion of the shared radio frequency spectrum band

2005

Perform a listen-before-talk procedure for the first portion of the shared radio frequency spectrum band

2010

Transmit, responsive to the listen-before-talk procedure indicating that the first portion of the shared radio frequency spectrum band is available for the uplink transmission, a channel reservation indication that the UE will use the first portion of the shared radio frequency spectrum band to transmit the uplink transmission

2015

Transmit the uplink transmission subsequent to the channel reservation indication

Figure 21:
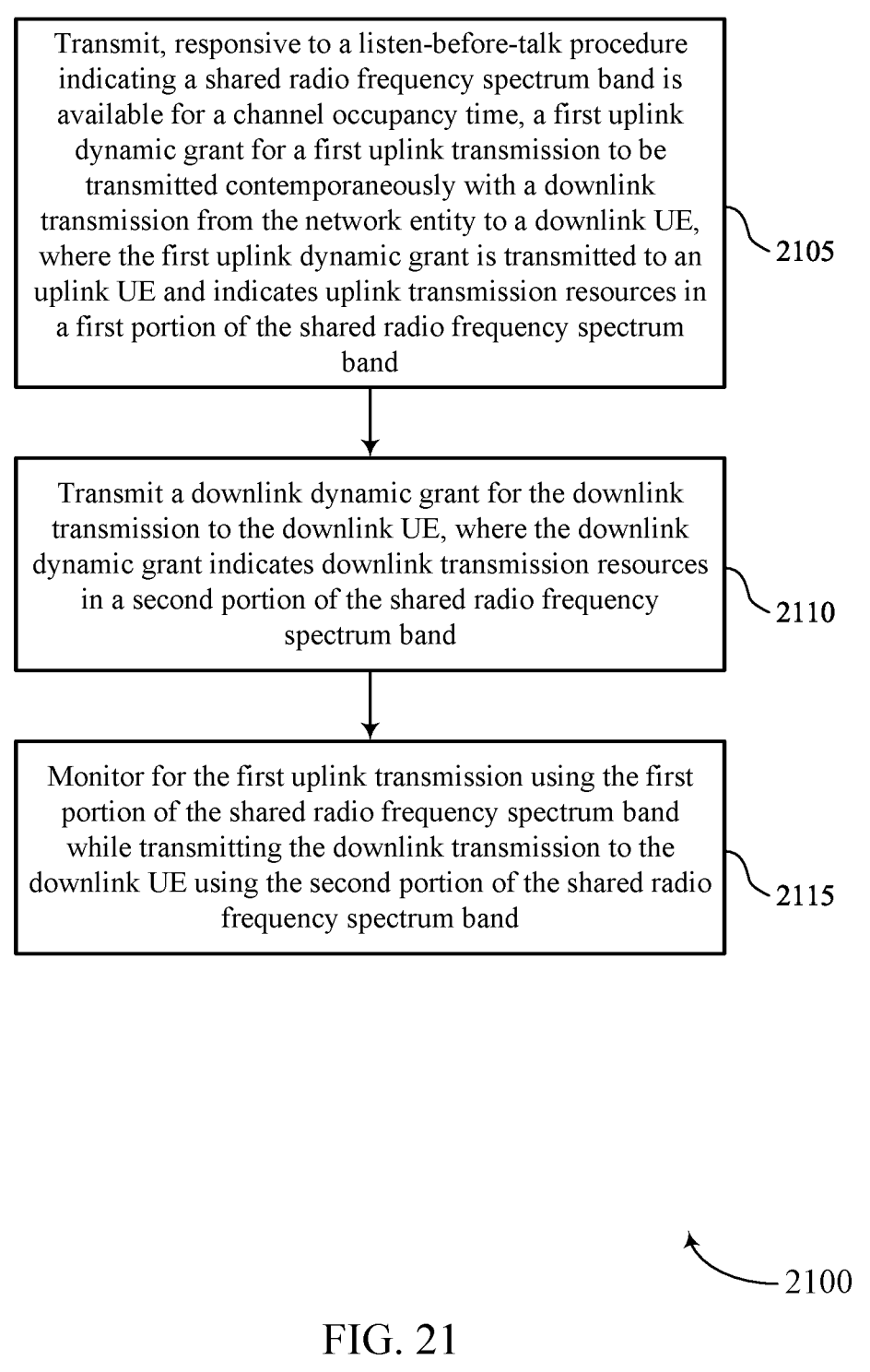

Transmit, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band

2105

Transmit a downlink dynamic grant for the downlink transmission to the downlink UE, where the downlink dynamic grant indicates downlink transmission resources in a second portion of the shared radio frequency spectrum band

2110

Monitor for the first uplink transmission using the first portion of the shared radio frequency spectrum band while transmitting the downlink transmission to the downlink UE using the second portion of the shared radio frequency spectrum band

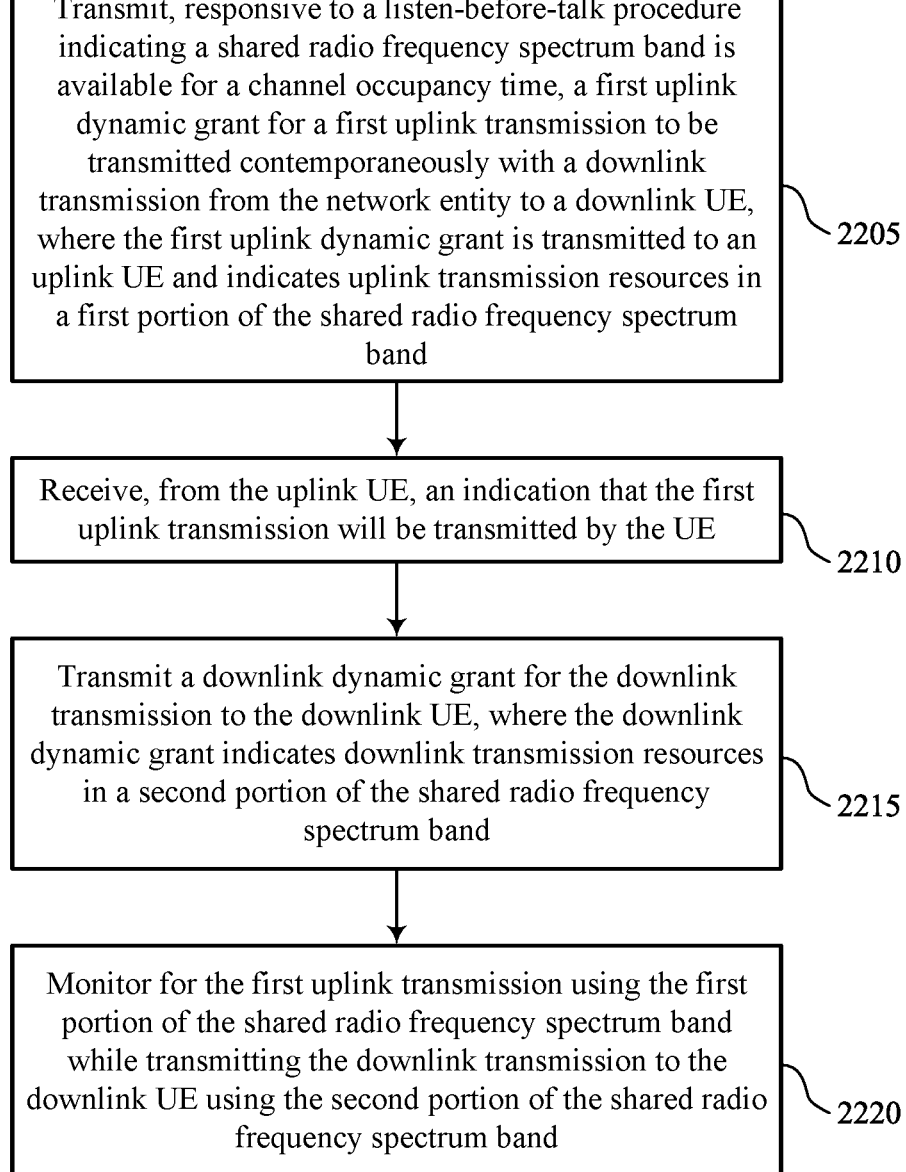

Transmit, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band

2205

Receive, from the uplink UE, an indication that the first uplink transmission will be transmitted by the UE

2210

Transmit a downlink dynamic grant for the downlink transmission to the downlink UE, where the downlink dynamic grant indicates downlink transmission resources in a second portion of the shared radio frequency spectrum band

2215

Monitor for the first uplink transmission using the first portion of the shared radio frequency spectrum band while transmitting the downlink transmission to the downlink UE using the second portion of the shared radio frequency spectrum band

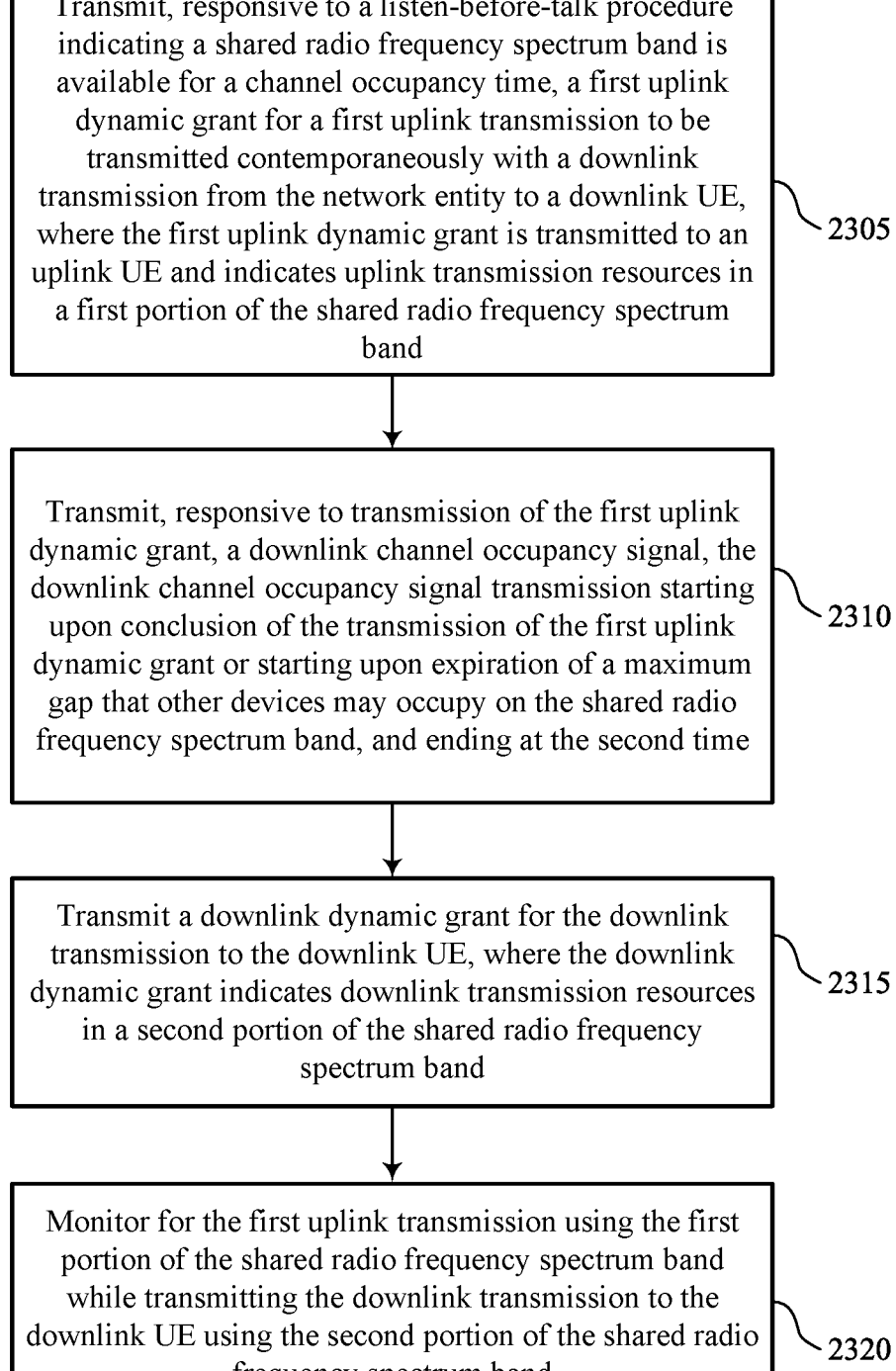

Transmit, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band    2305

Transmit, responsive to transmission of the first uplink dynamic grant, a downlink channel occupancy signal, the downlink channel occupancy signal transmission starting upon conclusion of the transmission of the first uplink dynamic grant or starting upon expiration of a maximum gap that other devices may occupy on the shared radio frequency spectrum band, and ending at the second time    2310

Transmit a downlink dynamic grant for the downlink transmission to the downlink UE, where the downlink dynamic grant indicates downlink transmission resources in a second portion of the shared radio frequency spectrum band    2315

Monitor for the first uplink transmission using the first portion of the shared radio frequency spectrum band while transmitting the downlink transmission to the downlink UE using the second portion of the shared radio frequency spectrum band    2320

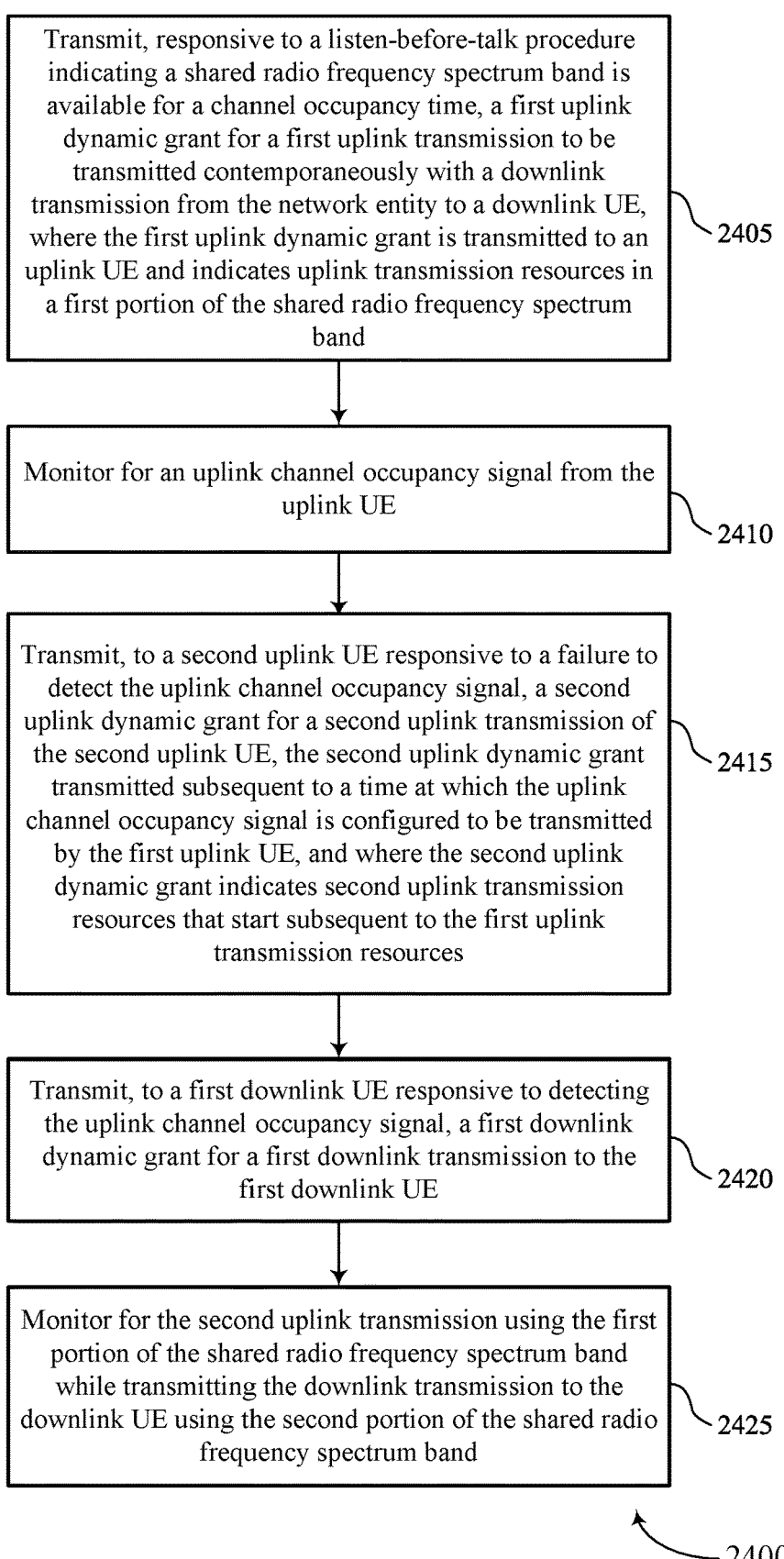

Transmit, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band

2405

Monitor for an uplink channel occupancy signal from the uplink UE

2410

Transmit, to a second uplink UE responsive to a failure to detect the uplink channel occupancy signal, a second uplink dynamic grant for a second uplink transmission of the second uplink UE, the second uplink dynamic grant transmitted subsequent to a time at which the uplink channel occupancy signal is configured to be transmitted by the first uplink UE, and where the second uplink dynamic grant indicates second uplink transmission resources that start subsequent to the first uplink transmission resources

2415

Transmit, to a first downlink UE responsive to detecting the uplink channel occupancy signal, a first downlink dynamic grant for a first downlink transmission to the first downlink UE

2420

Monitor for the second uplink transmission using the first portion of the shared radio frequency spectrum band while transmitting the downlink transmission to the downlink UE using the second portion of the shared radio frequency spectrum band

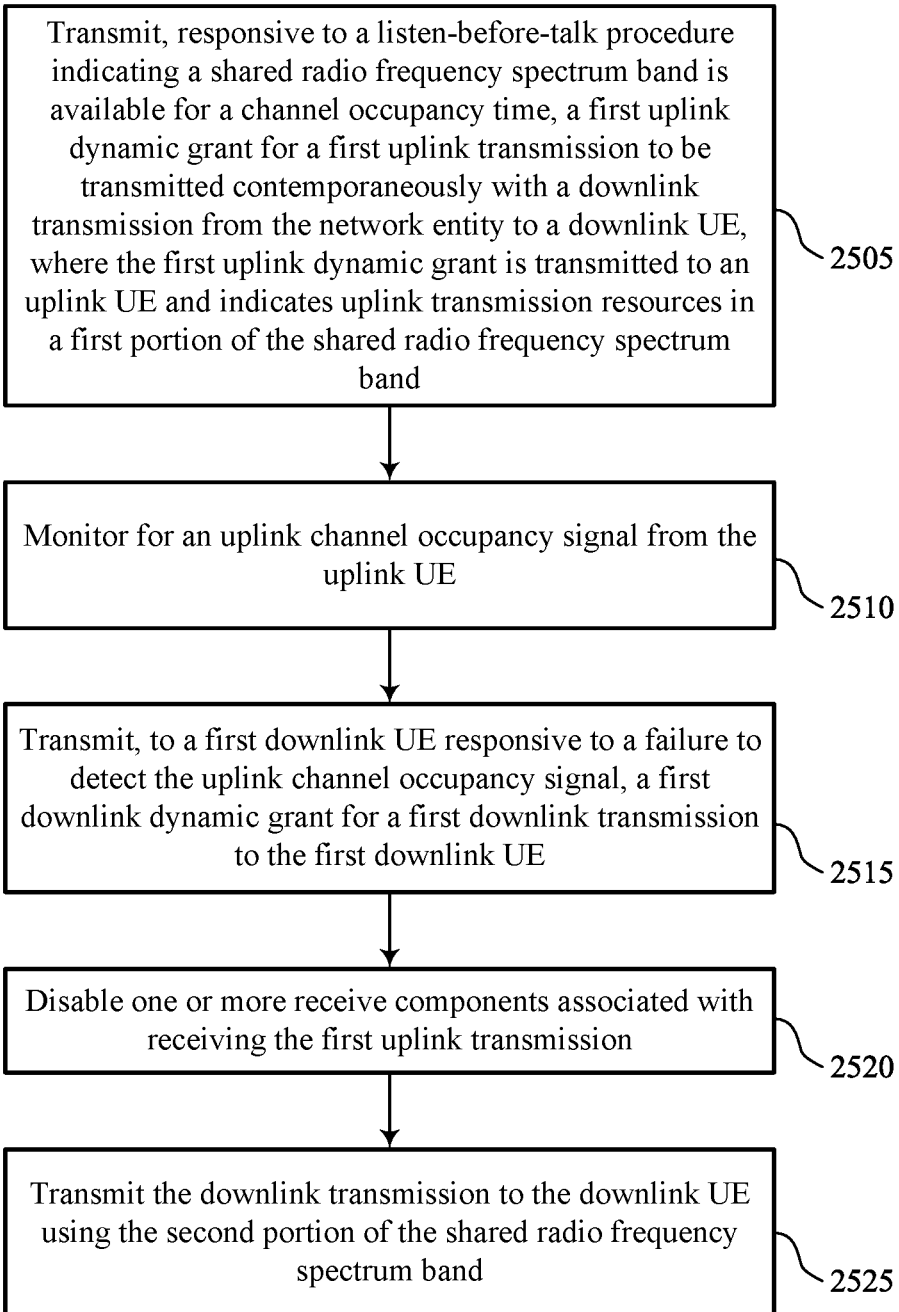

Transmit, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band

2505

Monitor for an uplink channel occupancy signal from the uplink UE

2510

Transmit, to a first downlink UE responsive to a failure to detect the uplink channel occupancy signal, a first downlink dynamic grant for a first downlink transmission to the first downlink UE

2515

Disable one or more receive components associated with receiving the first uplink transmission

2520

Transmit the downlink transmission to the downlink UE using the second portion of the shared radio frequency spectrum band

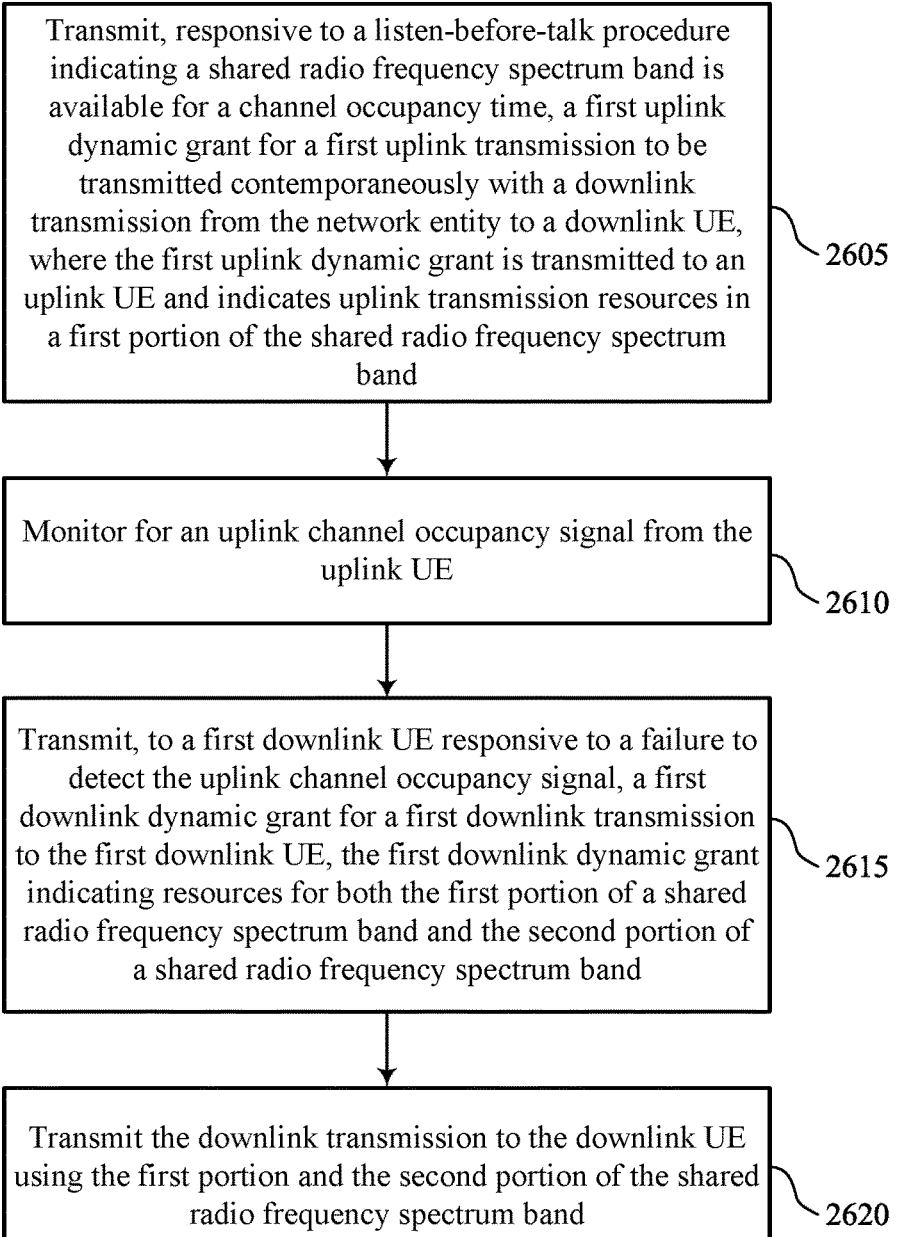

Transmit, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band

2605

Monitor for an uplink channel occupancy signal from the uplink UE

2610

Transmit, to a first downlink UE responsive to a failure to detect the uplink channel occupancy signal, a first downlink dynamic grant for a first downlink transmission to the first downlink UE, the first downlink dynamic grant indicating resources for both the first portion of a shared radio frequency spectrum band and the second portion of a shared radio frequency spectrum band

2615

Transmit the downlink transmission to the downlink UE using the first portion and the second portion of the shared radio frequency spectrum band

Figure 27:
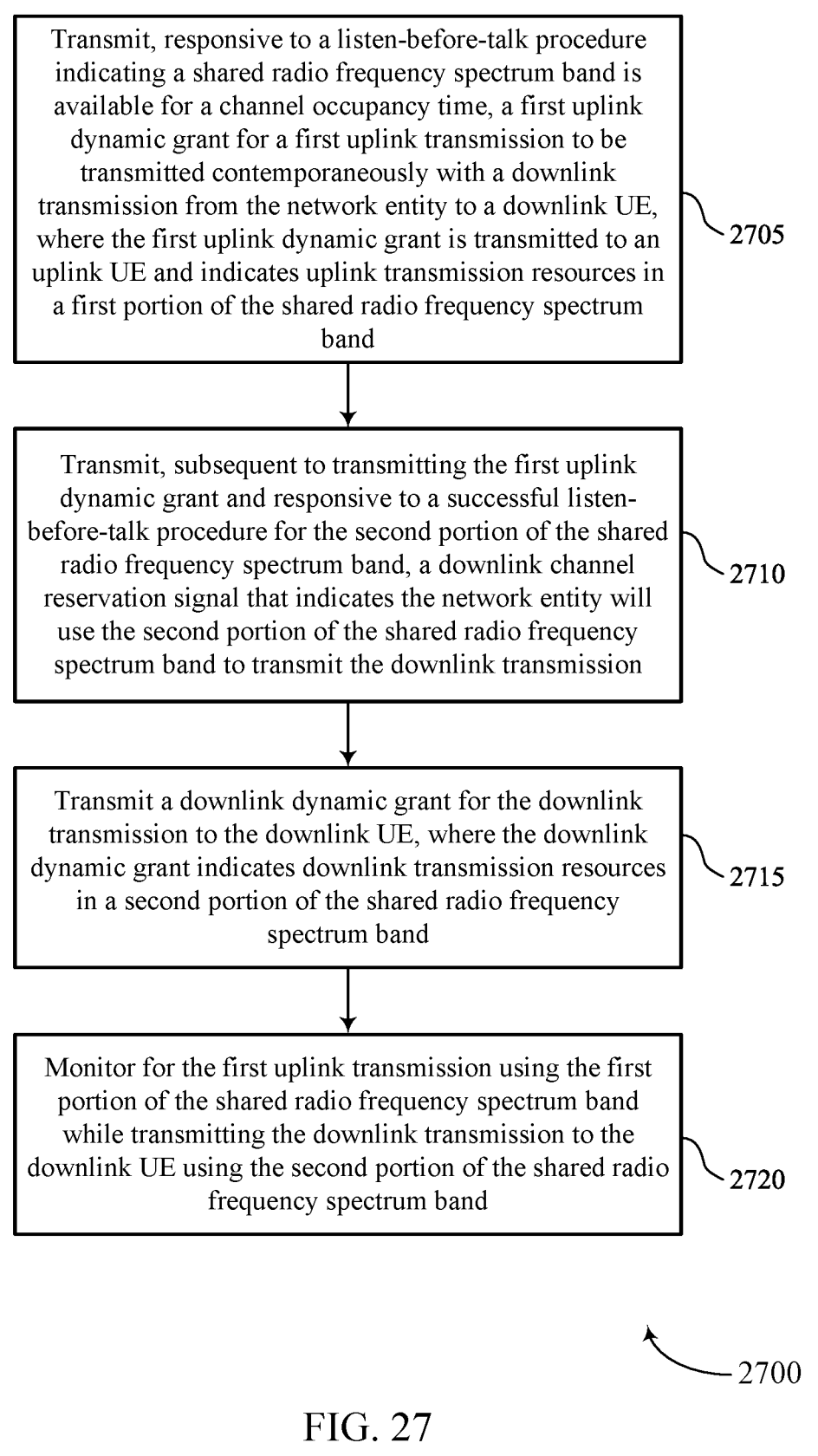

Transmit, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band ⟩ 2705

Transmit, subsequent to transmitting the first uplink dynamic grant and responsive to a successful listen-before-talk procedure for the second portion of the shared radio frequency spectrum band, a downlink channel reservation signal that indicates the network entity will use the second portion of the shared radio frequency spectrum band to transmit the downlink transmission ⟩ 2710

Transmit a downlink dynamic grant for the downlink transmission to the downlink UE, where the downlink dynamic grant indicates downlink transmission resources in a second portion of the shared radio frequency spectrum band ⟩ 2715

Monitor for the first uplink transmission using the first portion of the shared radio frequency spectrum band while transmitting the downlink transmission to the downlink UE using the second portion of the shared radio frequency spectrum band ⟩ 2720

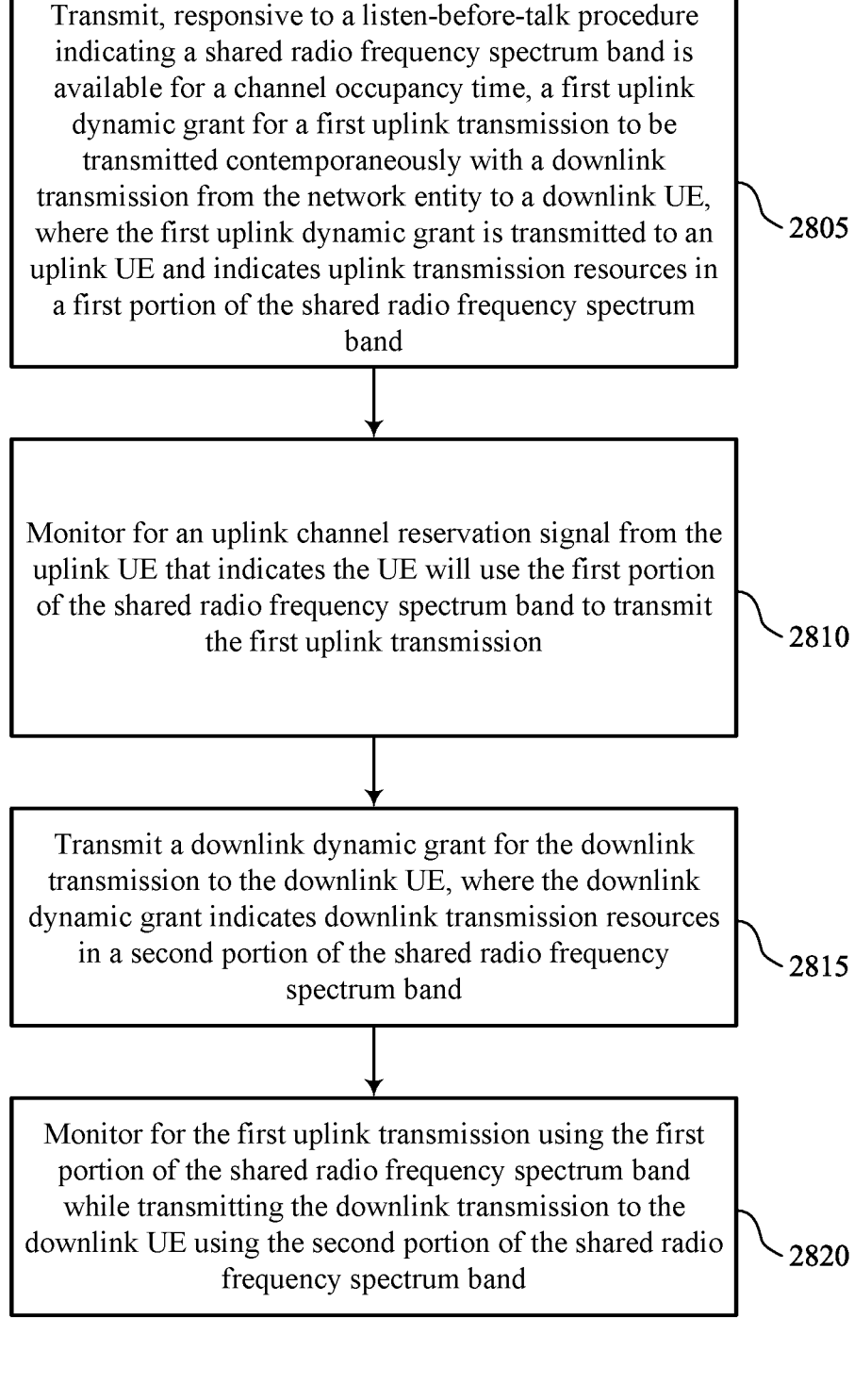

Transmit, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band

2805

Monitor for an uplink channel reservation signal from the uplink UE that indicates the UE will use the first portion of the shared radio frequency spectrum band to transmit the first uplink transmission

2810

Transmit a downlink dynamic grant for the downlink transmission to the downlink UE, where the downlink dynamic grant indicates downlink transmission resources in a second portion of the shared radio frequency spectrum band

2815

Monitor for the first uplink transmission using the first portion of the shared radio frequency spectrum band while transmitting the downlink transmission to the downlink UE using the second portion of the shared radio frequency spectrum band

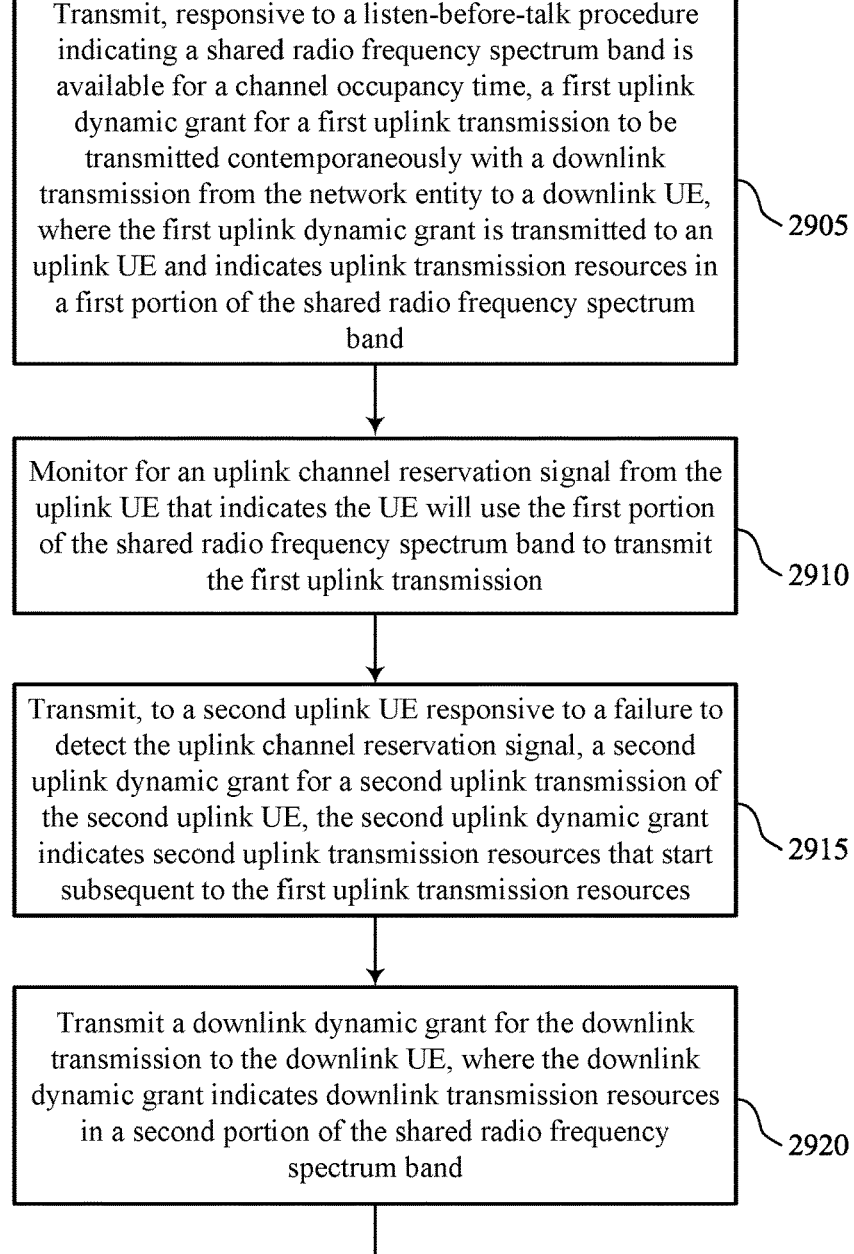

Transmit, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band

2905

Monitor for an uplink channel reservation signal from the uplink UE that indicates the UE will use the first portion of the shared radio frequency spectrum band to transmit the first uplink transmission

2910

Transmit, to a second uplink UE responsive to a failure to detect the uplink channel reservation signal, a second uplink dynamic grant for a second uplink transmission of the second uplink UE, the second uplink dynamic grant indicates second uplink transmission resources that start subsequent to the first uplink transmission resources

2915

Transmit a downlink dynamic grant for the downlink transmission to the downlink UE, where the downlink dynamic grant indicates downlink transmission resources in a second portion of the shared radio frequency spectrum band

2920

Monitor for the second uplink transmission using the first portion of the shared radio frequency spectrum band while transmitting the downlink transmission to the downlink UE using the second portion of the shared radio frequency spectrum band

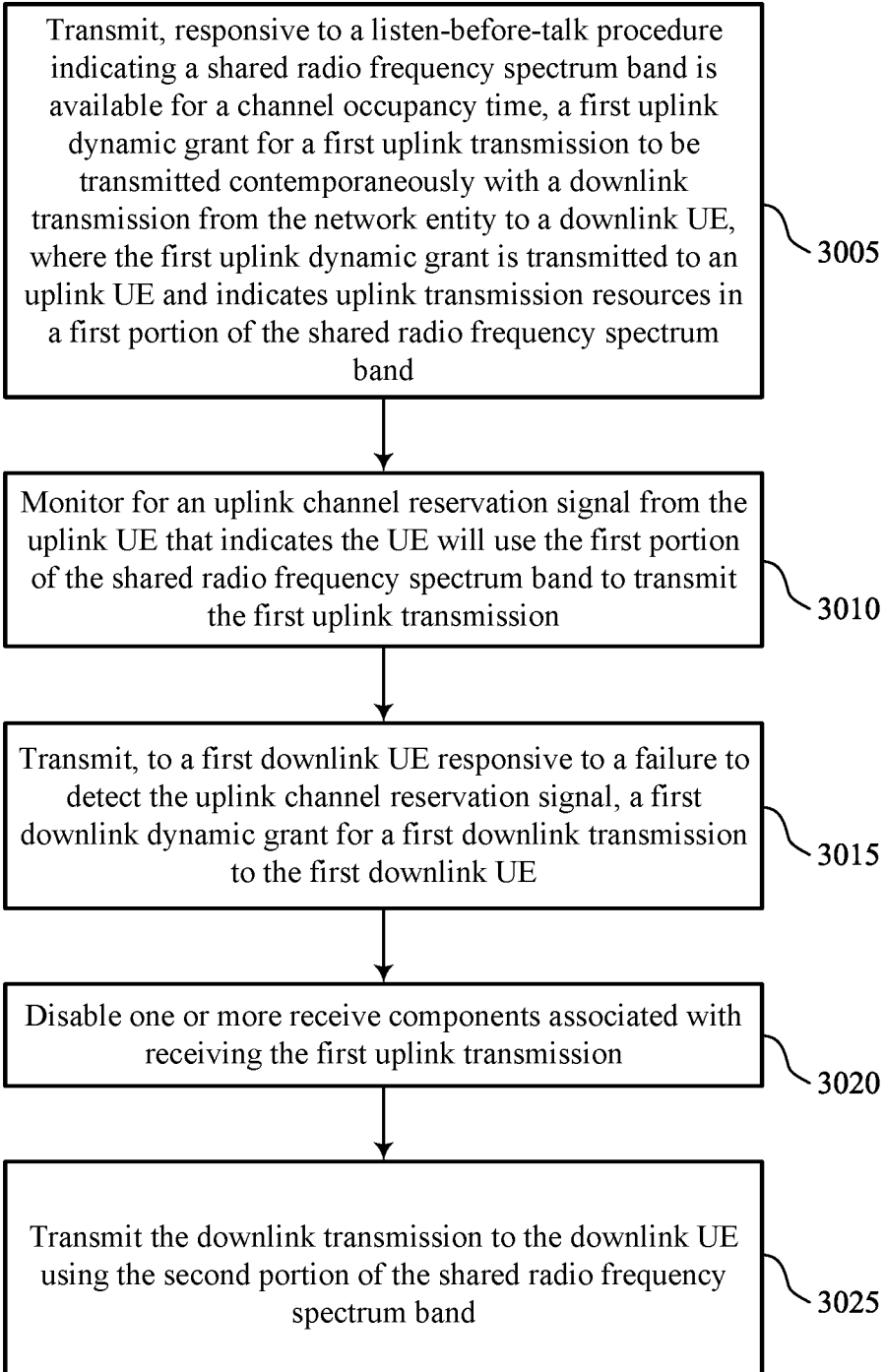

Transmit, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band — 3005

Monitor for an uplink channel reservation signal from the uplink UE that indicates the UE will use the first portion of the shared radio frequency spectrum band to transmit the first uplink transmission — 3010

Transmit, to a first downlink UE responsive to a failure to detect the uplink channel reservation signal, a first downlink dynamic grant for a first downlink transmission to the first downlink UE — 3015

Disable one or more receive components associated with receiving the first uplink transmission — 3020

Transmit the downlink transmission to the downlink UE using the second portion of the shared radio frequency spectrum band — 3025

Figure 31:
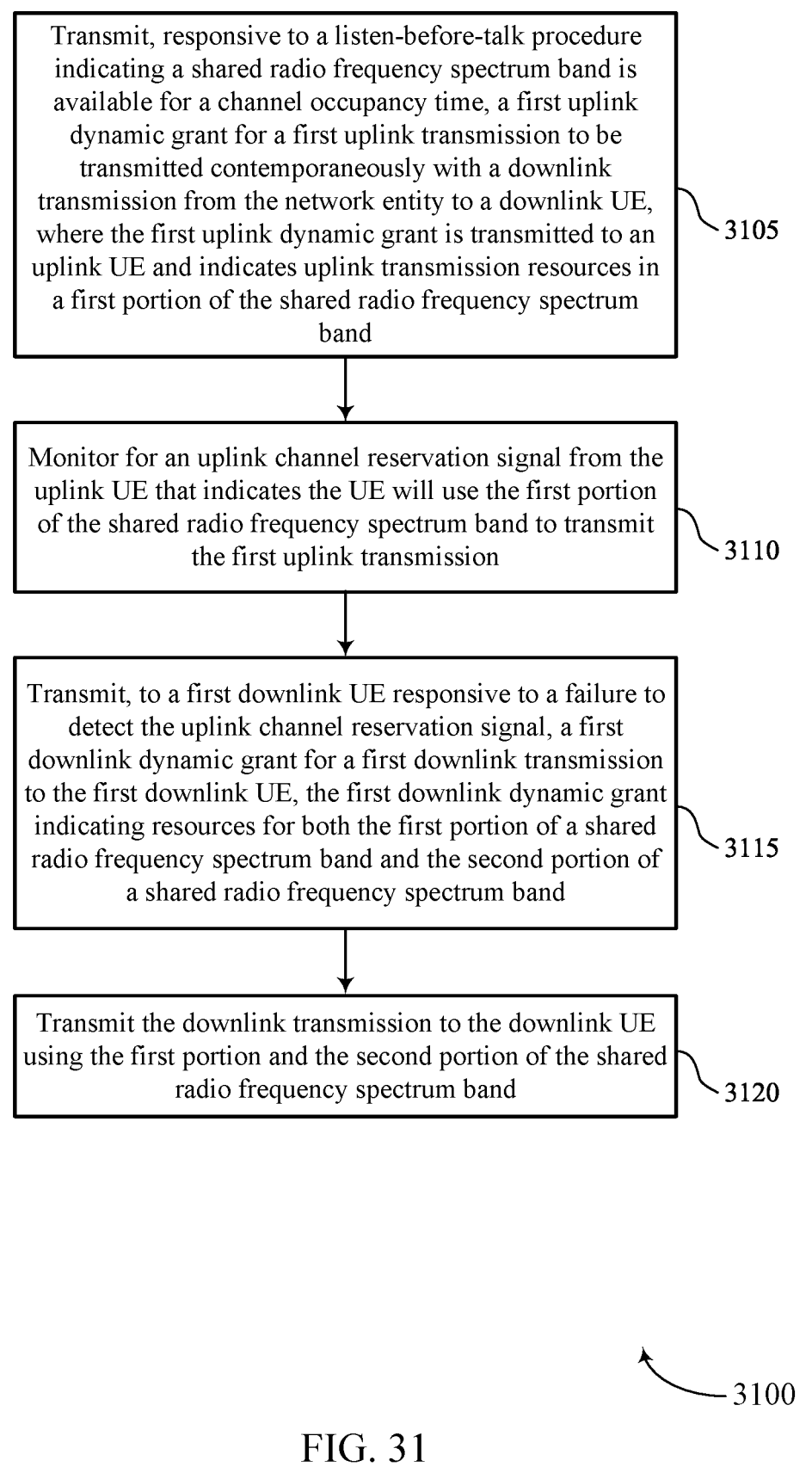

Transmit, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band ⟍ 3105

Monitor for an uplink channel reservation signal from the uplink UE that indicates the UE will use the first portion of the shared radio frequency spectrum band to transmit the first uplink transmission ⟍ 3110

Transmit, to a first downlink UE responsive to a failure to detect the uplink channel reservation signal, a first downlink dynamic grant for a first downlink transmission to the first downlink UE, the first downlink dynamic grant indicating resources for both the first portion of a shared radio frequency spectrum band and the second portion of a shared radio frequency spectrum band ⟍ 3115

Transmit the downlink transmission to the downlink UE using the first portion and the second portion of the shared radio frequency spectrum band ⟍ 3120

TECHNIQUES FOR FULL-DUPLEX CHANNEL ACCESS IN SHARED RADIO FREQUENCY SPECTRUM

FIELD OF TECHNOLOGY

The following relates to wireless communication, including techniques for full-duplex channel access in shared radio frequency spectrum.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

In some systems, certain devices (e.g., base stations, transmission-reception points, radio heads, or other network entities) may operate in a full-duplex mode in which the device transmits signals and receives signals using a same set of wireless resources (e.g., a same or overlapping set of time and frequency resources). Efficient techniques for reliable communications when a device is operating in full-duplex mode can help to enhance network efficiency, enhance network throughput, and create an enhanced user experience.

SUMMARY

The described techniques relate to improved methods, systems, devices, and apparatuses that support techniques for full-duplex channel access in shared radio frequency spectrum. In accordance with various aspects, described techniques provide for an uplink user equipment (UE) to be scheduled in a full-duplex channel occupancy time (COT) for uplink transmissions that are concurrent with downlink transmissions of a downlink UE using the same wireless resources in a shared or unlicensed radio frequency spectrum. In some aspects, a network entity may obtain a portion of the shared or unlicensed radio frequency spectrum for the COT, and may schedule a first UE for downlink communications and a second UE for uplink communications using full-duplex. Prior to transmitting the uplink communications, the second UE may perform a listen-before-talk (LBT) procedure and, in the event of a LBT failure, the second UE may skip the scheduled uplink transmission.

In some aspects, when LBT has passed, the second UE may provide an indication that it will transmit the uplink communication. In some cases, the second UE may transmit a channel occupancy signal (e.g., a filler signal) or a channel reservation signal (e.g. a clear-to-send (CTS) signal) that indicates LBT has passed and that may prevent another device from transmitting using the channel. The network entity may monitor for the signal from the second UE and, if the signal is detected, may continue to transmit a downlink grant to the first UE in accordance with the full-duplex procedure. If the network entity does not detect the signal from the second UE, it may transmit a different uplink grant to a different uplink UE (e.g., a third UE). In other cases the downlink grant, after determination that the second UE did not transmit an indication that LBT passed, may use the full bandwidth of the channel for the downlink transmission, may use a different downlink beam that does not account for full-duplex interference, or both.

A method for wireless communication by a user equipment (UE) is described. The method may include receiving, from a network entity, a dynamic grant for an uplink transmission to be transmitted contemporaneously with a downlink transmission from the network entity, the dynamic grant indicating transmission resources in a first portion of a shared radio frequency spectrum band for the uplink transmission, and downlink transmission from the network entity uses a second portion of the shared radio frequency spectrum band, performing a listen-before-talk procedure for the first portion of the shared radio frequency spectrum band, and transmitting or refraining from transmitting the uplink transmission based on the listen-before-talk procedure indicating whether the first portion of the shared radio frequency spectrum band is available for the uplink transmission.

A UE for wireless communication is described. The UE may include one or more memories storing processor executable code, and one or more processors coupled with the one or more memories. The one or more processors may individually or collectively operable to execute the code to cause the UE to receive, from a network entity, a dynamic grant for an uplink transmission to be transmitted contemporaneously with a downlink transmission from the network entity, the dynamic grant indicating transmission resources in a first portion of a shared radio frequency spectrum band for the uplink transmission, and downlink transmission from the network entity uses a second portion of the shared radio frequency spectrum band, perform a listen-before-talk procedure for the first portion of the shared radio frequency spectrum band, and transmit or refrain from transmitting the uplink transmission based on the listen-before-talk procedure indicating whether the first portion of the shared radio frequency spectrum band is available for the uplink transmission.

Another UE for wireless communication is described. The UE may include means for receiving, from a network entity, a dynamic grant for an uplink transmission to be transmitted contemporaneously with a downlink transmission from the network entity, the dynamic grant indicating transmission resources in a first portion of a shared radio frequency spectrum band for the uplink transmission, and downlink transmission from the network entity uses a second portion of the shared radio frequency spectrum band, means for performing a listen-before-talk procedure for the first portion of the shared radio frequency spectrum band, and means for transmitting or refraining from transmitting the uplink transmission based on the listen-before-talk procedure indicating whether the first portion of the shared radio frequency spectrum band is available for the uplink transmission.

A non-transitory computer-readable medium storing code for wireless communication is described. The code may include instructions executable by a processor to receive, from a network entity, a dynamic grant for an uplink transmission to be transmitted contemporaneously with a downlink transmission from the network entity, the dynamic grant indicating transmission resources in a first portion of a shared radio frequency spectrum band for the uplink transmission, and downlink transmission from the network entity uses a second portion of the shared radio frequency spectrum band, perform a listen-before-talk procedure for the first portion of the shared radio frequency spectrum band, and transmit or refrain from transmitting the uplink transmission based on the listen-before-talk procedure indicating whether the first portion of the shared radio frequency spectrum band is available for the uplink transmission.

Some examples of the method, UEs, and non-transitory computer-readable medium described herein may further include operations, features, means, or instructions for transmitting, responsive to the listen-before-talk procedure indicating that the first portion of the shared radio frequency spectrum band is available for the uplink transmission, an indication to the network entity that the uplink transmission will be transmitted by the UE. In some examples of the method, UEs, and non-transitory computer-readable medium described herein, communications with the network entity are performed according to a full-duplex communication procedure at the network entity that is initiated responsive to the network entity obtaining at least the second portion of the shared radio frequency spectrum band for a channel occupancy time and the first portion of the shared radio frequency spectrum band and the second portion of the shared radio frequency spectrum band occupy non-overlapping frequency resources of the shared radio frequency spectrum band, partially overlapping frequency resources of the shared radio frequency spectrum band, or fully overlapping frequency resources of the shared radio frequency spectrum band.

In some examples of the method, UEs, and non-transitory computer-readable medium described herein, the dynamic grant for the uplink transmission is received at a first time, and indicates the uplink transmission is to start at a second time, and where the method UEs, and non-transitory computer-readable medium may include operations, features, means, or instructions for transmitting, responsive to the listen-before-talk procedure indicating that the first portion of the shared radio frequency spectrum band is available for the uplink transmission, a channel occupancy signal starting upon conclusion of the listen-before-talk procedure and ending at the second time.

In some examples of the method, UEs, and non-transitory computer-readable medium described herein, the channel occupancy signal may be a preconfigured signal, may be configured by radio resource control (RRC) signaling, may be configured in an uplink scheduling control information communication, or any combinations thereof.

Some examples of the method, UEs, and non-transitory computer-readable medium described herein may further include operations, features, means, or instructions for transmitting, responsive to the listen-before-talk procedure indicating that the first portion of the shared radio frequency spectrum band is available for the uplink transmission, a channel reservation indication that the UE will use the first portion of the shared radio frequency spectrum band to transmit the uplink transmission. In some examples of the method, UEs, and non-transitory computer-readable medium described herein, the channel reservation indication may be a CTS signal that is broadcast using the first portion of the shared radio frequency spectrum band. In some examples of the method, UEs, and non-transitory computer-readable medium described herein, the channel reservation indication may be transmitted in a first slot after receipt of the dynamic grant.

In some examples of the method, UEs, and non-transitory computer-readable medium described herein, the dynamic grant indicates that the uplink transmission is to be started using one or more parameters associated with a full-duplex communication procedure. In some examples of the method, UEs, and non-transitory computer-readable medium described herein, the dynamic grant includes a beam indication for a transmission beam for the uplink transmission that is associated with the full-duplex communication procedure. In some examples of the method, UEs, and non-transitory computer-readable medium described herein, the shared radio frequency spectrum band may be unlicensed radio frequency spectrum.

A method for wireless communication by a network entity is described. The method may include transmitting, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band, transmitting a downlink dynamic grant for the downlink transmission to the downlink UE, where the downlink dynamic grant indicates downlink transmission resources in a second portion of the shared radio frequency spectrum band, and monitoring for the first uplink transmission using the first portion of the shared radio frequency spectrum band while transmitting the downlink transmission to the downlink UE using the second portion of the shared radio frequency spectrum band.

A network entity for wireless communication is described. The network entity may include one or more memories storing processor executable code, and one or more processors coupled with the one or more memories. The one or more processors may individually or collectively operable to execute the code to cause the network entity to transmit, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band, transmit a downlink dynamic grant for the downlink transmission to the downlink UE, where the downlink dynamic grant indicates downlink transmission resources in a second portion of the shared radio frequency spectrum band, and monitor for the first uplink transmission using the first portion of the shared radio frequency spectrum band while transmitting the downlink transmission to the downlink UE using the second portion of the shared radio frequency spectrum band.

Another network entity for wireless communication is described. The network entity may include means for transmitting, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band, means for transmitting a downlink dynamic grant for the downlink transmission to the downlink UE, where the downlink dynamic grant indicates downlink transmission resources in a second portion of the shared radio frequency spectrum band, and means for monitoring for the first uplink transmission using the first portion of the shared radio frequency spectrum band while transmitting the downlink transmission to the downlink UE using the second portion of the shared radio frequency spectrum band.

A non-transitory computer-readable medium storing code for wireless communication is described. The code may include instructions executable by a processor to transmit, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band, transmit a downlink dynamic grant for the downlink transmission to the downlink UE, where the downlink dynamic grant indicates downlink transmission resources in a second portion of the shared radio frequency spectrum band, and monitor for the first uplink transmission using the first portion of the shared radio frequency spectrum band while transmitting the downlink transmission to the downlink UE using the second portion of the shared radio frequency spectrum band.

In some examples of the method, network entities, and non-transitory computer-readable medium described herein, communications with the downlink UE and the uplink UE may be performed according to a full-duplex communication procedure at the network entity and the first portion of the shared radio frequency spectrum band and the second portion of the shared radio frequency spectrum band occupy non-overlapping frequency resources of the shared radio frequency spectrum band, partially overlapping frequency resources of the shared radio frequency spectrum band, or fully overlapping frequency resources of the shared radio frequency spectrum band.

Some examples of the method, network entities, and non-transitory computer-readable medium described herein may further include operations, features, means, or instructions for receiving, from the uplink UE, an indication that the first uplink transmission will be transmitted by the UE.

In some examples of the method, network entities, and non-transitory computer-readable medium described herein, the first uplink dynamic grant is transmitted at a first time, and indicates the first uplink transmission is to start at a second time, and where the method, network entities, and non-transitory computer-readable medium may include operations, features, means, or instructions for transmitting, responsive to transmission of the first uplink dynamic grant, a downlink channel occupancy signal, the downlink channel occupancy signal transmission starting upon conclusion of the transmission of the first uplink dynamic grant or starting upon expiration of a maximum gap that other devices may occupy on the shared radio frequency spectrum band, and ending at the second time.

Some examples of the method, network entities, and non-transitory computer-readable medium described herein may further include operations, features, means, or instructions for monitoring, prior to transmitting the downlink dynamic grant, for an uplink channel occupancy signal from the uplink UE. In some examples of the method, network entities, and non-transitory computer-readable medium described herein, the transmitting the downlink dynamic grant may include operations, features, means, or instructions for transmitting, to a first downlink UE responsive to detecting the uplink channel occupancy signal, a first downlink dynamic grant for a first downlink transmission to the first downlink UE.

In some examples of the method, network entities, and non-transitory computer-readable medium described herein, the uplink UE may be a first uplink UE and the uplink transmission resources are first uplink transmission resources and the method, apparatuses, and non-transitory computer-readable medium may include further operations, features, means, or instructions for transmitting, to a second uplink UE responsive to a failure to detect the uplink channel occupancy signal, a second uplink dynamic grant for a second uplink transmission of the second uplink UE, the second uplink dynamic grant transmitted subsequent to a time at which the uplink channel occupancy signal is configured to be transmitted by the first uplink UE, and where the second uplink dynamic grant indicates second uplink transmission resources that start subsequent to the first uplink transmission resources.

In some examples of the method, network entities, and non-transitory computer-readable medium described herein, the transmitting the downlink dynamic grant may include operations, features, means, or instructions for transmitting, to a first downlink UE responsive to a failure to detect the uplink channel occupancy signal, a first downlink dynamic grant for a first downlink transmission to the first downlink UE and disabling one or more receive components associated with receiving the first uplink transmission. In some examples of the method, network entities, and non-transitory computer-readable medium described herein, the transmitting the downlink dynamic grant may include operations, features, means, or instructions for transmitting, to a first downlink UE responsive to a failure to detect the uplink channel occupancy signal, a first downlink dynamic grant for a first downlink transmission to the first downlink UE, the first downlink dynamic grant indicating resources for both the first portion of a shared radio frequency spectrum band and the second portion of a shared radio frequency spectrum band.

In some examples of the method, network entities, and non-transitory computer-readable medium described herein, the uplink channel occupancy signal may be a preconfigured signal, may be configured by RRC signaling, may be configured in an uplink scheduling control information communication, or any combinations thereof. In some examples of the method, network entities, and non-transitory computer-readable medium described herein, the uplink channel occupancy signal may be a sounding reference signal.

Some examples of the method, network entities, and non-transitory computer-readable medium described herein may further include operations, features, means, or instructions for transmitting, subsequent to transmitting the first uplink dynamic grant and responsive to a successful listen-before-talk procedure for the second portion of the shared radio frequency spectrum band, a downlink channel reservation signal that indicates the network entity will use the second portion of the shared radio frequency spectrum band to transmit the downlink transmission. In some examples of the method, network entities, and non-transitory computer-readable medium described herein, the downlink channel reservation signal may be a CTS signal that is broadcast using the second portion of the shared radio frequency spectrum band.

Some examples of the method, network entities, and non-transitory computer-readable medium described herein may further include operations, features, means, or instructions for monitoring, prior to transmitting the downlink dynamic grant, for an uplink channel reservation signal from the uplink UE that indicates the UE will use the first portion of the shared radio frequency spectrum band to transmit the first uplink transmission, and where the monitoring for the first uplink transmission is responsive to the uplink channel reservation signal. In some examples of the method, network entities, and non-transitory computer-readable medium described herein, the uplink channel reservation signal may be received in a slot after transmission of the first uplink dynamic grant.

In some examples of the method, network entities, and non-transitory computer-readable medium described herein, the uplink UE may be a first uplink UE and the uplink transmission resources may be first uplink transmission resources and the method, apparatuses, and non-transitory computer-readable medium may include further operations, features, means, or instructions for transmitting, to a second uplink UE responsive to a failure to detect the uplink channel reservation signal, a second uplink dynamic grant for a second uplink transmission of the second uplink UE, the second uplink dynamic grant transmitted subsequent to a time at which the uplink channel occupancy signal is configured to be transmitted by the first uplink UE, and where the second uplink dynamic grant indicates second uplink transmission resources that start subsequent to the first uplink transmission resources.

In some examples of the method, network entities, and non-transitory computer-readable medium described herein, the transmitting the downlink dynamic grant may include operations, features, means, or instructions for transmitting, to a first downlink UE responsive to a failure to detect the uplink channel reservation signal, a first downlink dynamic grant for a first downlink transmission to the first downlink UE and disabling one or more receive components associated with receiving the first uplink transmission.

In some examples of the method, network entities, and non-transitory computer-readable medium described herein, the transmitting the downlink dynamic grant may include operations, features, means, or instructions for transmitting, to a first downlink UE responsive to a failure to detect the uplink channel reservation signal, a first downlink dynamic grant for a first downlink transmission to the first downlink UE, the first downlink dynamic grant indicating resources for both the first portion of a shared radio frequency spectrum band and the second portion of a shared radio frequency spectrum band.

In some examples of the method, network entities, and non-transitory computer-readable medium described herein, the first uplink dynamic grant indicates that the first uplink transmission is to be started using one or more parameters associated with a full-duplex communication procedure. In some examples of the method, network entities, and non-transitory computer-readable medium described herein, the first uplink dynamic grant includes a beam indication for a transmission beam for the first uplink transmission that is associated with a full-duplex communication procedure. In some examples of the method, network entities, and non-transitory computer-readable medium described herein, the downlink dynamic grant includes a beam indication for a transmission beam for the downlink transmission that is associated with a full-duplex communication procedure.

BRIEF DESCRIPTION OF THE DRAWINGS

FIGS. 17 through 31 show flowcharts illustrating methods that support techniques for full-duplex channel access in shared radio frequency spectrum in accordance with one or more aspects of the present disclosure.

DETAILED DESCRIPTION

Figure 1:
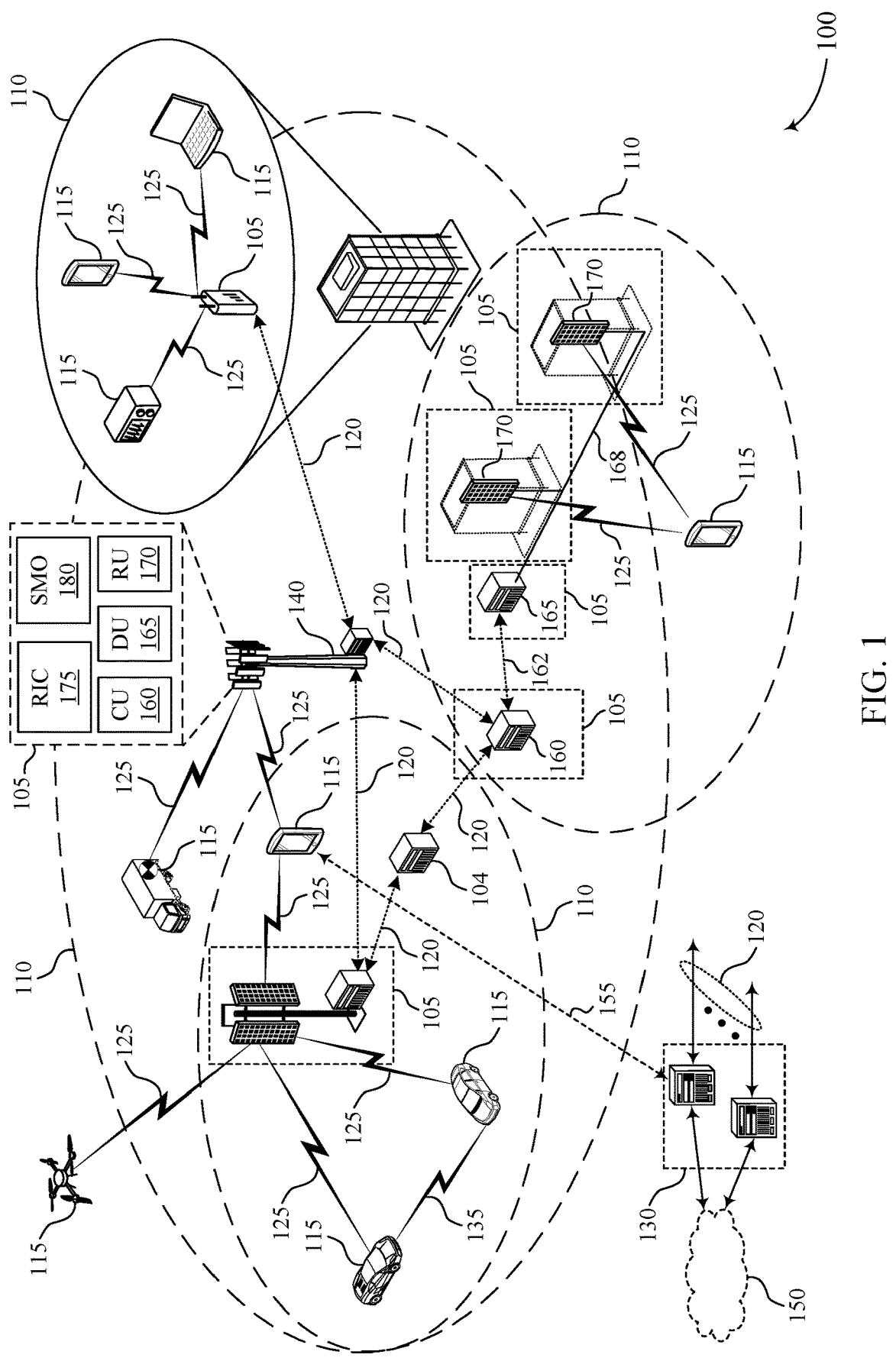
FIG. 1 shows an example of a wireless communications system that supports techniques for full-duplex channel access in shared radio frequency spectrum in accordance with one or more aspects of the present disclosure.

In some systems, one or more devices, such as a network entity or a user equipment (UE), may operate in a full-duplex mode in which the one or more devices transmit signals and receive signals using a same set of wireless resources (e.g., a same set of time and frequency resources). When a device is operating in full-duplex mode, concurrent transmission and reception may result in self-interference where transmitted signals interfere with signals that are to be concurrently received, cross-link interference (CLI) from other transmitters, or both. Such interference may reduce the likelihood of successful reception and decoding of communications, and various techniques to mitigate such interference may be implemented in order to enhance reliability of communications (e.g., higher transmission power during periods of full-duplex operation, reduced coding rates or modulation orders, beam selection to avoid interfering beams, or any combinations thereof). Further, some wireless network deployments may use shared radio frequency spectrum (e.g., unlicensed radio frequency spectrum or radio frequency spectrum that is shared among two or more operators), where transmitting devices confirm that a channel is available prior to transmitting using the channel, such as through a listen-before-talk (LBT) procedure (e.g., a clear channel assessment (CCA)).

In some deployments, full-duplex communication techniques may provide for full-duplex communications at a network entity, and half-duplex communications at UEs. Thus, a network entity may transmit downlink communications to a first UE while receiving uplink communications from a second UE. In other deployments, one or more UEs, or both a UE and network entity, may operate using full-duplex communications. Further, some deployments may use sub-band full duplex (SBFD) in which a bandwidth part may be configured for full-duplex communications and may be obtained at a network entity for a channel occupancy time (COT). In SBFD, the bandwidth part may be divided into downlink frequency resources and uplink frequency resources. For example, a first frequency sub-band may be for uplink communications and a second frequency sub-band may be for downlink communications. In some cases, the first frequency sub-band and second frequency sub-band may be non-overlapping, although techniques as discussed herein may be used in cases where the first and second frequency sub-bands may be partially or fully overlapping. Further, techniques as discussed herein may be used in cases where two or more downlink sub-bands are configured, with one or more uplink sub-bands.

As discussed, when using shared radio frequency spectrum, each transmitting device must pass a LBT procedure prior to starting a transmission. In some cases, a transmitting UE may fail its LBT, and this failure would not be known at the network entity. For example, another device in proximity to the transmitting UE may be using the shared spectrum but is far enough away from the network entity to not be detected when the network entity performs a LBT and obtains the bandwidth part for the COT). In such cases, resources may be wasted because uplink resources that could have been used for uplink transmissions are not able to be used by the uplink UE. Thus, techniques provided herein for coordinated full-duplex operation may enhance efficiency and throughput due to the network entity having knowledge of whether an uplink UE is able to transmit using allocated uplink full-duplex resources.

In accordance with various aspects, described techniques provide for an uplink UE to be scheduled in a full-duplex COT for uplink transmissions that are concurrent with downlink transmissions of a downlink UE using the same wireless resources in a shared or unlicensed radio frequency spectrum. In some aspects, a network entity may obtain a portion of the shared or unlicensed radio frequency spectrum for the COT, and may schedule a first UE for downlink communications and a second UE for uplink communications using full-duplex. Prior to transmitting the uplink communications, the second UE may perform a LBT procedure and, in the event of a LBT failure, the second UE may skip the scheduled uplink transmission. In some aspects, the second UE may provide an indication that LBT has passed and that it will transmit the uplink communication. For example, the second UE may transmit a channel occupancy signal (e.g., a filler signal) or a channel reservation signal (e.g. a clear-to-send (CTS) signal) that indicates LBT has passed and that may prevent another device from transmitting using the channel. The network entity may monitor for the signal from the second UE and, if it is detected, may continue to transmit a downlink grant to the first UE in accordance with the full-duplex procedure. If the network entity does not detect a signal from the second UE, it may transmit a different uplink grant to a different uplink UE (e.g., a third UE). In other cases the downlink grant, after determination that the second UE did not transmit an indication that LBT passed, may use the full bandwidth of the channel for the downlink transmission, may use a different downlink beam that does not account for full-duplex interference, or both.

Techniques as discussed herein may thus provide for enhanced resource utilization and communications efficiency related to full-duplex communications in shared radio frequency spectrum. Such techniques may help to enhance reliability of transmissions in full-duplex communications (e.g., to allow a network entity to schedule other UEs in the event of an LBT failure). Such techniques thus enhance network efficiency through reduced overhead, enhance reliability, enhance throughput, and provide for enhanced user experience.

Aspects of the disclosure are initially described in the context of wireless communications systems. Aspects of the disclosure are further illustrated by and described with reference to resource diagrams, process flows, apparatus diagrams, system diagrams, and flowcharts that relate to techniques for full-duplex channel access in shared radio frequency spectrum.

FIG. 1 shows an example of a wireless communications system 100 that supports techniques for full-duplex channel access in shared radio frequency spectrum in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In the case of the techniques described herein applied in the context of a disaggregated RAN architecture, one or more components of the disaggregated RAN architecture may be configured to support techniques for full-duplex channel access in shared radio frequency spectrum as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

In accordance with various techniques discussed herein, one or more network entities 105 may communicate with one or more UEs 115 using shared wireless resources (e.g., unlicensed radio frequency spectrum) in accordance with full-duplex communications procedures. In some aspects, uplink UE 115 may be scheduled for an uplink transmission in a full-duplex COT, concurrently with one or more downlink transmissions of a downlink UE 115 using the wireless resources associated with the COT. Prior to transmitting the uplink communications, the uplink UE 115 may perform a LBT procedure, may provide an indication that LBT has passed, and then transmit the uplink communication. The network entity 105 may monitor for the indication from the uplink UE 115 and, upon detection, may continue to transmit a downlink grant to the downlink UE 115. If the network entity 105 does not detect a signal from the uplink UE 115, it may transmit a different uplink grant to a different uplink UE 115, or may adjust the downlink transmission to use different resources (e.g., resources that were intended for the uplink transmission) or transmission parameters (e.g., a transmission beam that does not account for full-duplex interference).

Figure 2:
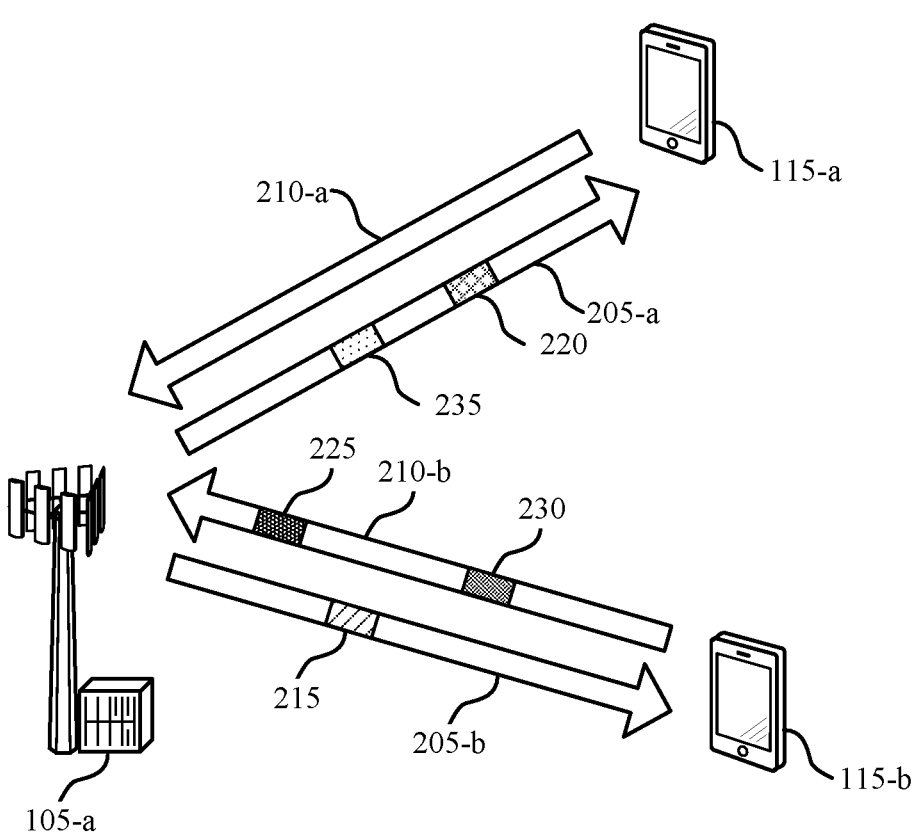
FIG. 2 shows an example of a wireless communications system that supports techniques for full-duplex channel access in shared radio frequency spectrum in accordance with one or more aspects of the present disclosure.

FIG. 2 shows an example of a wireless communications system 200 that supports techniques for full-duplex channel access in shared radio frequency spectrum in accordance with one or more aspects of the present disclosure. The wireless communications system 200 may include a network entity 105-a, a first UE 115-a, and a second UE 115-b, which may represent examples of a network entity 105 and UE 115 as described with reference to FIG. 1.

In this example, the first UE 115-a may communicate with the network entity 105-a via a first downlink carrier 205-a and a first uplink carrier 210-a (e.g., which may be different carriers operating using FDD, or a same carrier operating using TDD). The second UE 115-b may communicate with the network entity 105-a via a second downlink carrier 205-b and a second uplink carrier 210-b. In the example of FIG. 2, the network entity 105-a, for at least some communications, may operate in a full-duplex mode in which a first set of resources may be used for both uplink and downlink communications. For example, a downlink transmission 235 to the first UE 115-a may be transmitted contemporaneously with receipt of an uplink transmission 230 from the second UE 115-b (e.g., using a same set of time and frequency resources).

As discussed herein, the full-duplex communications at the network entity 105-a (e.g., sub-band full-duplex (SBFD) or in-band full-duplex (IBFD)) may be performed using shared radio frequency spectrum (e.g., unlicensed spectrum or licensed spectrum that is shared among two or more operators) in which a LBT procedure may be used for channel access. In some cases, the network entity 105-a may determine that full-duplex communications are to be used, and may perform a LBT procedure for a channel (e.g., by performing a LBT procedure on a bandwidth part to be used for full-duplex communications). Based on the LBT procedure, the network entity 105-a may determine that the channel is available for a COT, and may allocate resources for full-duplex communications within the COT. In some cases, the network entity 105-a may transmit an uplink grant

215 to the second UE 115-b and a downlink grant 220 to the first UE 115-a. Before the second UE 115-b can transmit using the shared radio frequency spectrum band, it may perform a LBT procedure. If the LBT procedure fails (e.g., indicates that the shared radio frequency spectrum band is occupied by another transmitter), the second UE 115-b may skip or defer the uplink transmission 230 to a later time. In some cases, the other transmitter that causes the LBT of the second UE 115-b to fail may be in relatively close proximity to the second UE 115-b, but far enough away from the network entity 105-a that the LBT performed at the network entity 105-a passes.

In some cases, if the LBT procedure at the second UE 115-b passes (e.g., indicates that the shared radio frequency spectrum band is not occupied by another transmitter), the second UE 115-b may transmit a LBT confirmation indication 225 that indicates to the network entity 105-a that the LBT procedure has passed and that the second UE 115-b will transmit the uplink transmission 230. In some cases, the second UE 115-b may transmit a channel occupancy signal (e.g., a filler signal) or a channel reservation signal (e.g. a CTS signal) that indicates LBT has passed and that may prevent another device from transmitting using the channel. The network entity 150-a may monitor for the LBT confirmation indication 225 from the second UE 115-b and, if it is detected, may continue to transmit the downlink grant 220 to the first UE 115-a in accordance with the full-duplex procedure. In some aspects, if the network entity 105-a does not detect the LBT confirmation indication 225 from the second UE 115-b, it may transmit a different uplink grant to a different uplink UE (e.g., a third UE). In other cases the downlink grant 220, after determination that the second UE 115-b did not transmit the LBT confirmation indication 225, may use the full bandwidth of the channel for the downlink transmission 235, may use a different downlink beam that does not account for full-duplex interference, or both. FIGS. 3 through 8 illustrate several examples of coordination and communications using full-duplex techniques.

Figure 3:
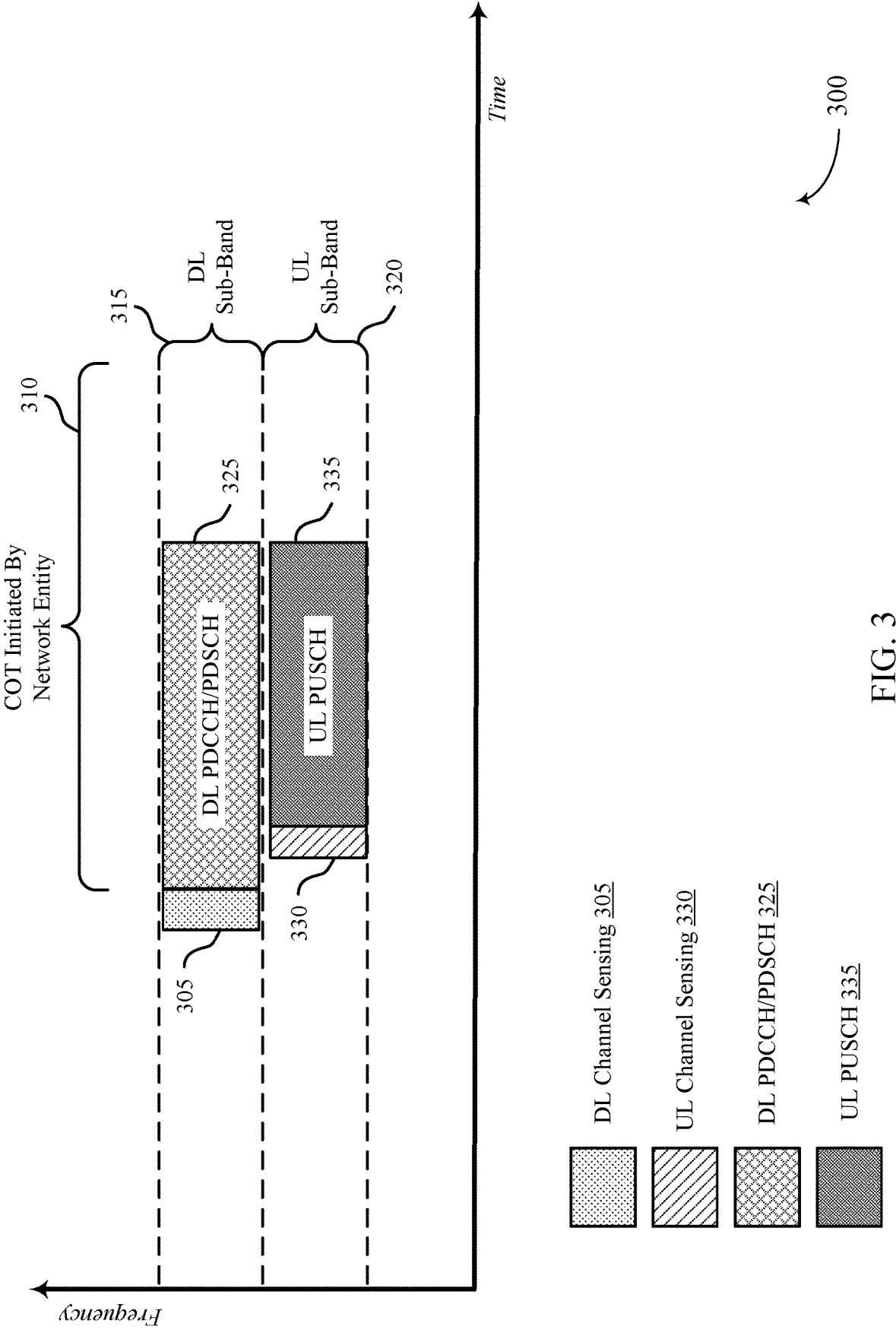
FIGS. 3 through 7 show examples of full-duplex resources in shared radio frequency spectrum that support techniques for full-duplex channel access in shared radio frequency spectrum in accordance with one or more aspects of the present disclosure.

FIG. 3 shows an example of full-duplex resources 300 that supports techniques for full-duplex channel access in shared radio frequency spectrum in accordance with one or more aspects of the present disclosure. The example of FIG. 3 may be used for full-duplex communications between multiple UEs and a network entity, which may be examples of UEs 115 and network entities 105 as described with reference to FIGS. 1 and 2. In some examples, a network entity may transmit configuration information to one or more UEs that indicates full-duplex communications techniques are to be used in shared radio frequency spectrum.

In the example of FIG. 3, a network entity may perform downlink channel sensing 305 (e.g., according to a LBT procedure or a CCA), and initiate a COT 310 for full-duplex communications. As discussed, in communications that use shared radio frequency spectrum, such as NR-unlicensed (NR-U) that may use unlicensed radio frequency spectrum), channel access in both downlink and uplink may rely on a LBT procedure, in which a wireless device (e.g., UE or network entity) will first "sense" the communications channel to confirm that no other devices are using the particular channel prior to any transmission. When a communication channel is a wide bandwidth unlicensed carrier (e.g., several hundreds of MHz), the "channel sensing" procedure relies on detecting the energy level on multiple sub-bands of the communications channel. The LBT parameters (e.g., type/duration such as category 2 or category 4 LBT, CCA parameters, etc.) may be configured in UEs by the network entity. In some cases, the wireless communications system may support dynamic TDD, where the uplink-downlink allocation may change over time to adapt to traffic conditions. To enable dynamic TDD, a UE may determine when and where to transmit and receive based on an indication of the COT 310 structure. For example, the COT 310 may comprise multiple slots and each slot comprises downlink resources, uplink resources, or flexible resources. The COT 310 structure may reduce power consumption and channel access delay, by providing that the network entity can perform scheduling for the associated time period.

In the example of FIG. 3, the COT 310 may include frequency resources in a downlink sub-band 315 and an uplink sub-band 320. As discussed herein, while various examples are shown that illustrate that different sub-bands are non-overlapping, such illustrations are provided for purposes of discussion only with the understanding that techniques disclosed herein may use overlapping or non-overlapping frequency resources. For example, the downlink sub-band 315 and the uplink sub-band 320 may be a same sub-band that occupies a same set of frequency resources, may be partially or fully overlapping, or may be non-overlapping. Further, while one downlink sub-band 315 and one uplink sub-band 320 are illustrated in various examples, other examples may have two or more downlink sub-bands, two or more uplink sub-bands, or any combinations thereof. Additionally, while various examples discussed herein provide that full-duplex communications are performed at the network entity, other examples may provide that one or more UEs perform full-duplex communications (e.g., a UE may contemporaneously transmit and receive communications using SBFD or IBFD).

In accordance with the full-duplex communications, the network entity may transmit a downlink transmission 325 (e.g., a physical downlink control channel (PDCCH), a physical downlink shared channel (PDSCH), or any combinations thereof) contemporaneously with an uplink transmission 335 (e.g., a physical uplink shared channel (PUSCH)). As discussed herein, prior to transmitting the uplink transmission 335, a UE may perform uplink channel sensing 330 (e.g., an uplink LBT procedure). As also discussed herein, in the event that the UE does not gain channel access from the LBT procedure and uplink channel sensing 330, the UE may not transmit the uplink transmission 335 in the COT 310. Such lack of uplink transmission may result in less efficient use of wireless resources. In accordance with various aspects, a network entity may blindly schedule the uplink transmission 335 and determine whether or not the UE actually transmitted based on the presence of a demodulation reference signal (DMRS) of the UE in the uplink sub-band 320 when monitoring for the uplink transmission 335. In other aspects, as discussed in more detail with reference to FIGS. 4 through 7, the UE may transmit an indication of whether or not the LBT procedure passed at the UE. In some cases, after receiving the indication from the UE (e.g., filler signaling or CTS), the network entity is aware that the uplink UE can perform SBFD/FD operation with downlink communications to the downlink UE. In such cases, the network entity may formally schedule the uplink transmission with SBFD specific parameters (e.g., matched DL/UL beams). In some cases, downlink control information (DCI) that scheduled the uplink transmission 335 may include a flag that indicates the uplink UE may start uplink transmission with parameters indicated for SBFD (e.g., using a matched uplink beam for full-duplex (FD) operation). Additionally, or alternatively, in a downlink scheduling DCI, a flag may indicate a downlink UE may start downlink transmissions with parameters indicated for SBFD (e.g., using a matched downlink beam for FD operation).

Figure 4:
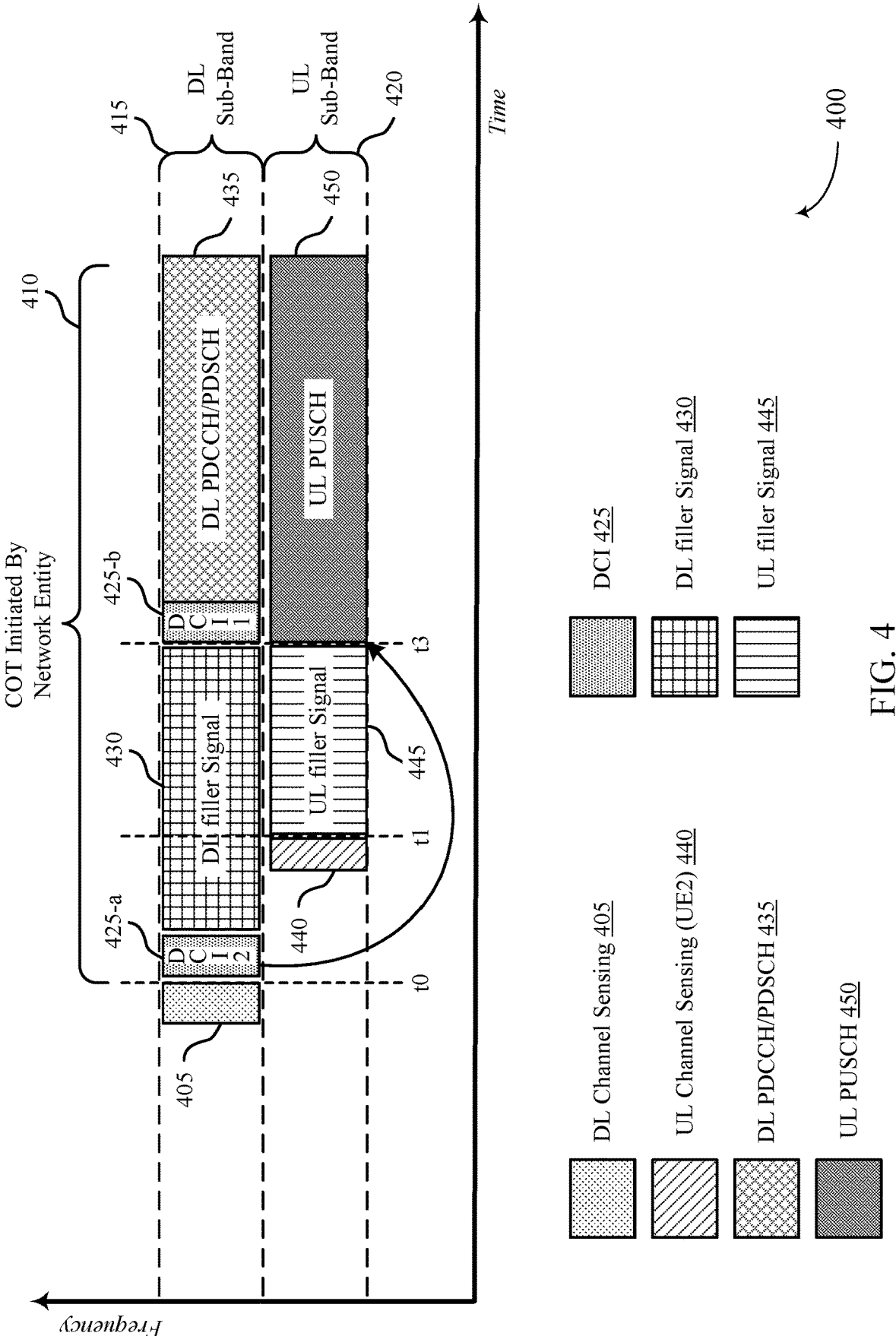

FIG. 4 shows an example of full-duplex resource 400 that support techniques for full-duplex channel access in shared radio frequency spectrum in accordance with one or more aspects of the present disclosure. The example of FIG. 4 may be used for full-duplex communications between multiple UEs and a network entity, which may be examples of UEs 115 and network entities 105 as described with reference to FIGS. 1 and 2. In some examples, a network entity may transmit configuration information to one or more UEs that indicates full-duplex communications techniques are to be used in shared radio frequency spectrum.

In the example of FIG. 4, a network entity may perform downlink channel sensing 405 (e.g., according to a LBT procedure or a CCA), and initiate a COT 410 for full-duplex communications on a downlink sub-band 415 and an uplink sub-band 420. In this example, the COT may start at time t0, and the network entity may transmit DCI 425-*a* (e.g., DCI2 for a second UE that is an uplink UE) that indicates resources for uplink transmission 450 using the uplink sub-band 420. In order to maintain the channel, the network entity may transmit a downlink filler signal 430 until time t3 at which full-duplex communications begin. The uplink UE may receive the DCI 425-*a* and may perform uplink channel sensing 440 (e.g., an LBT procedure). In this example, the uplink channel sensing 440 indicates that the uplink sub-band 420 is available for transmission, and the UE may transmit an uplink filler signal 445 starting at time t1 until full-duplex communications begin at time t3. In this example, the network entity may detect the uplink filler signal 445, and transmit a downlink DCI 425-*b* to the downlink UE (e.g., DCI1 for a first UE that is the downlink UE) that indicates downlink resources for downlink transmission 435 (e.g., PDCCH/PDSCH). As discussed, in some cases the downlink DCI 425-*b* may provide an indication to the first UE that downlink transmissions will use parameters indicated for SBFD (e.g., using a matched downlink beam for FD operation).

It is noted that the example of FIG. 4 shows that the downlink filler signal 430 is transmitted subsequent to the uplink DCI 425-*a* until time t3. In other examples, the downlink filler signal 430 may be transmitted from time t1 to time t3, assuming the maximum gap for other devices (e.g., other WiFi/NR-U devices) to occupy is less than the time from t0 to t1. In some cases, the downlink filler signal 430 may be a reference signal that is transmitted to occupy the channel. Similarly, the uplink filler signal 445 may be a reference signal (e.g., a sounding reference signal (SRS)) that is transmitted until time t3, after which the UE will send the scheduled uplink transmission 450 (e.g., PUSCH). In some cases, the downlink filler signal 430 and the uplink filler signal 445 may be triggered implicitly by a rule (e.g., that may be defined in a standard), or triggered according to a configuration provided by RRC signaling or uplink DCI signaling. In other cases, the LBT at the uplink UE may fail, such as illustrated in the example of FIG. 5.

Figure 5:
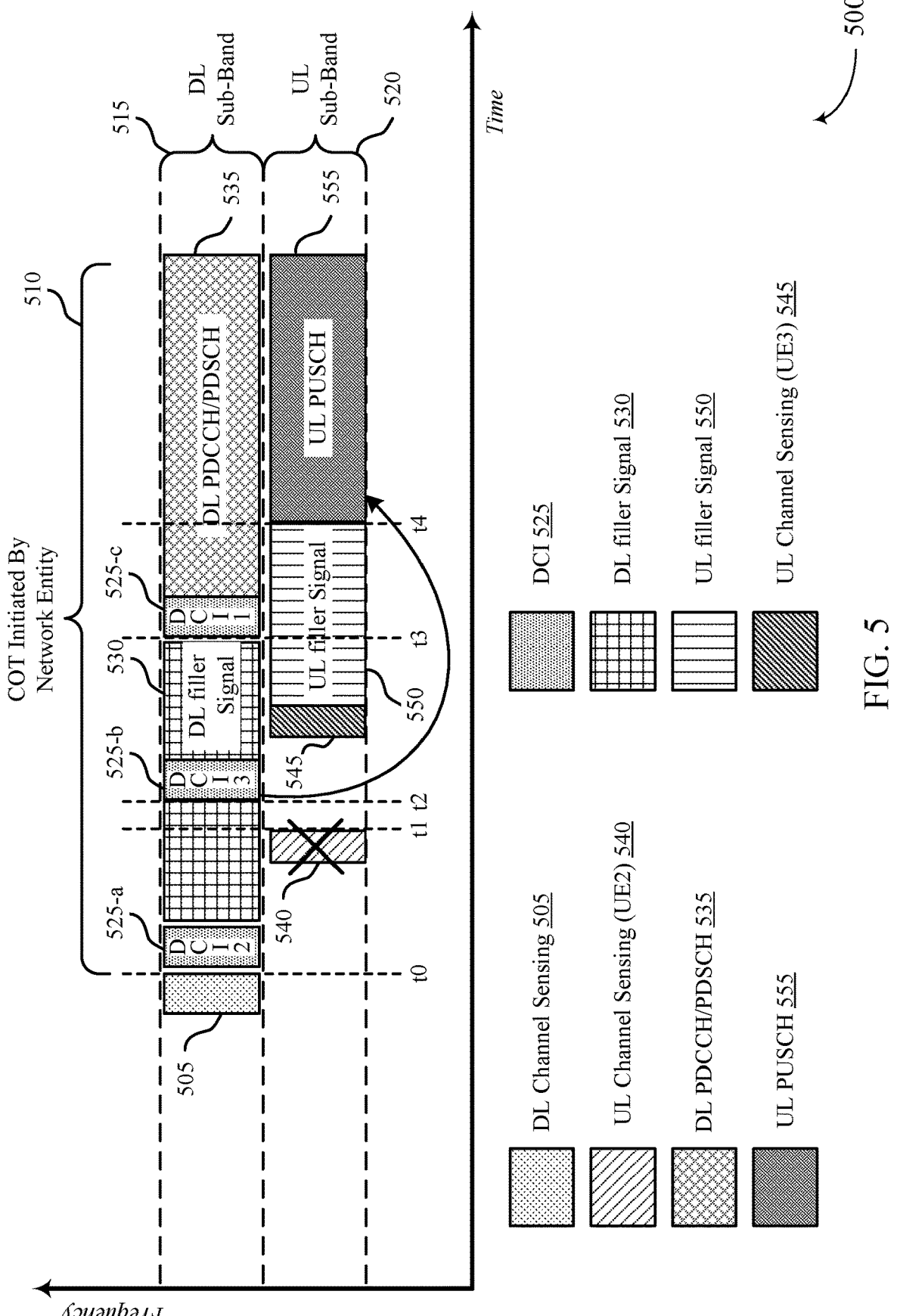

FIG. 5 shows an example of full-duplex resources 500 that support techniques for full-duplex channel access in shared radio frequency spectrum in accordance with one or more aspects of the present disclosure. The example of FIG. 5 may be used for full-duplex communications between multiple UEs and a network entity, which may be examples of UEs 115 and network entities 105 as described with reference to FIGS. 1 and 2. In some examples, a network entity may transmit configuration information to one or more UEs that indicates full-duplex communications techniques are to be used in shared radio frequency spectrum.

In the example of FIG. 5, a network entity may perform downlink channel sensing 505 (e.g., according to a LBT procedure or a CCA), and initiate a COT 510 for full-duplex communications on a downlink sub-band 515 and an uplink sub-band 520. In this example, the COT may start at time t0, and the network entity may transmit DCI 525-*a* (e.g., DCI2 for a second UE that is an uplink UE) that indicates resources for uplink transmission 555 using the uplink sub-band 520. In order to maintain the channel, the network entity may transmit a downlink filler signal 530 in all slots except slots that contain DCI 525 until time t3 at which full-duplex communications are scheduled to begin. The uplink UE may receive the DCI 525-*a* and may perform uplink channel sensing 540 (e.g., an LBT procedure). In this example, the uplink channel sensing 540 indicates that the uplink sub-band 520 is not available for transmission, and the uplink UE does not transmit an uplink filler signal that would otherwise be transmitted starting at time t1. The network entity, at time t2, may determine that an uplink filler signal from the uplink UE has not been detected, and assume that the uplink channel sensing 540 failed.

In order to maintain full-duplex communications in the COT 510, the network entity may transmit a different uplink DCI 525-*b* to a different uplink UE (e.g., DCI3 to a third UE) at time t2. The different uplink DCI 525-*b* may indicate uplink resources that start at time t4, which may be based on a timing between an uplink resource scheduling DCI and an associated uplink transmission. In this example, the third UE may perform uplink channel sensing 545, and the uplink channel sensing 545 indicates that the uplink sub-band 520 is available for transmission, and the third UE may transmit an uplink filler signal 550 starting subsequent to the uplink channel sensing 545 until time t4. In this example, the network entity may detect the uplink filler signal 550, and transmit a downlink DCI 525-*c* to the downlink UE (e.g., DCI1 for a first UE that is the downlink UE) that indicates downlink resources for downlink transmission 535 (e.g., PDCCH/PDSCH). As discussed, in some cases the downlink DCI 525-*c* may provide an indication to the first UE that downlink transmissions will use parameters indicated for SBFD (e.g., using a matched downlink beam for FD operation).

In other examples, instead of scheduling the different uplink UE for full-duplex communications, the network entity may operate using half-duplex for the COT 510. In some cases, the network entity may cancel SBFD and transmit the downlink transmission 535 only, and may turn off receive components within the downlink transmission duration for power saving. In this case, the downlink DCI 525-*c* may indicate downlink parameters for half-duplex (e.g., modulation order, coding rate, downlink beam, or any combinations thereof, that may have a more favorable throughput due to no interference mitigation associated with FD). In other examples, the downlink DCI 525-*c* may be transmitted at time t2 for downlink starting at time t3 for a full bandwidth transmission using both the downlink sub-band 515 and the uplink sub-band 520, with a half-duplex beam.

Figure 6:
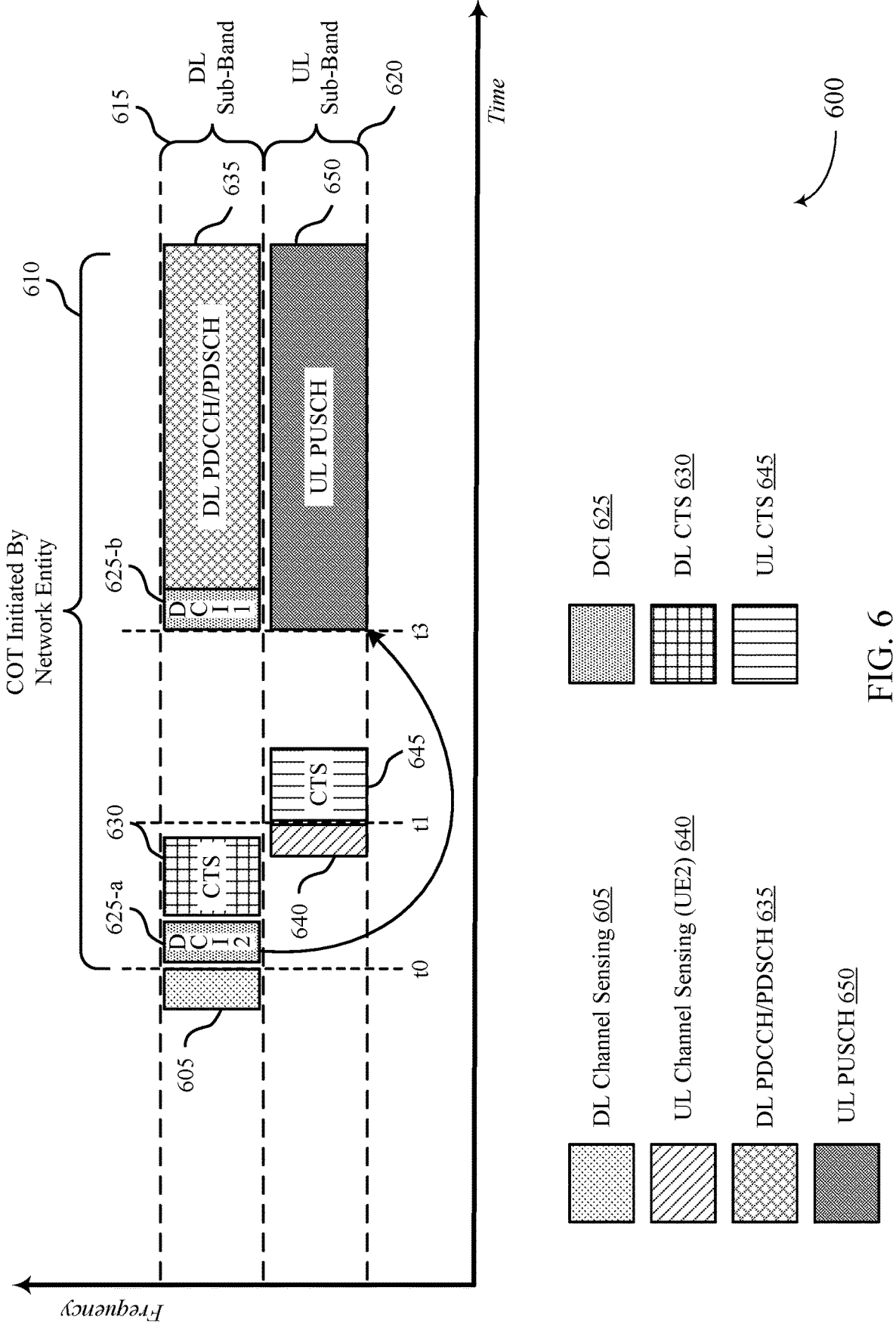

FIG. 6 shows an example of full-duplex resources 600 that support techniques for full-duplex channel access in shared radio frequency spectrum in accordance with one or more aspects of the present disclosure. The example of FIG. 6 may be used for full-duplex communications between multiple UEs and a network entity, which may be examples of UEs 115 and network entities 105 as described with reference to FIGS. 1 and 2. In some examples, a network entity may transmit configuration information to one or more UEs that indicates full-duplex communications techniques are to be used in shared radio frequency spectrum.

In the example of FIG. 6, a network entity may perform downlink channel sensing 605 (e.g., according to a LBT procedure or a CCA), and initiate a COT 610 for full-duplex communications on a downlink sub-band 615 and an uplink sub-band 620. In this example, the COT may start at time t0, and the network entity may transmit DCI 625-*a* (e.g., DCI2 for a second UE that is an uplink UE) that indicates resources for uplink transmission 650 using the uplink sub-band 620. In order to provide an indication that the channel is reserved, the network entity may transmit CTS 630 that indicates channel reservation until the end of the COT 610. The uplink UE may receive the DCI 625-*a* and may perform uplink channel sensing 640 (e.g., an LBT procedure). In this example, the uplink channel sensing 640 indicates that the uplink sub-band 620 is available for transmission, and the UE may transmit CTS 645 that indicates channel reservation until the end of the COT 610. In this example, the network entity may detect the CTS 645, and transmit a downlink DCI 625-*b* to the downlink UE (e.g., DCI1 for a first UE that is the downlink UE) that indicates downlink resources for downlink transmission 635 (e.g., PDCCH/PDSCH). As discussed, in some cases the downlink DCI 625-*b* may provide an indication to the first UE that downlink transmissions will use parameters indicated for SBFD (e.g., using a matched downlink beam for FD operation).

Figure 7:
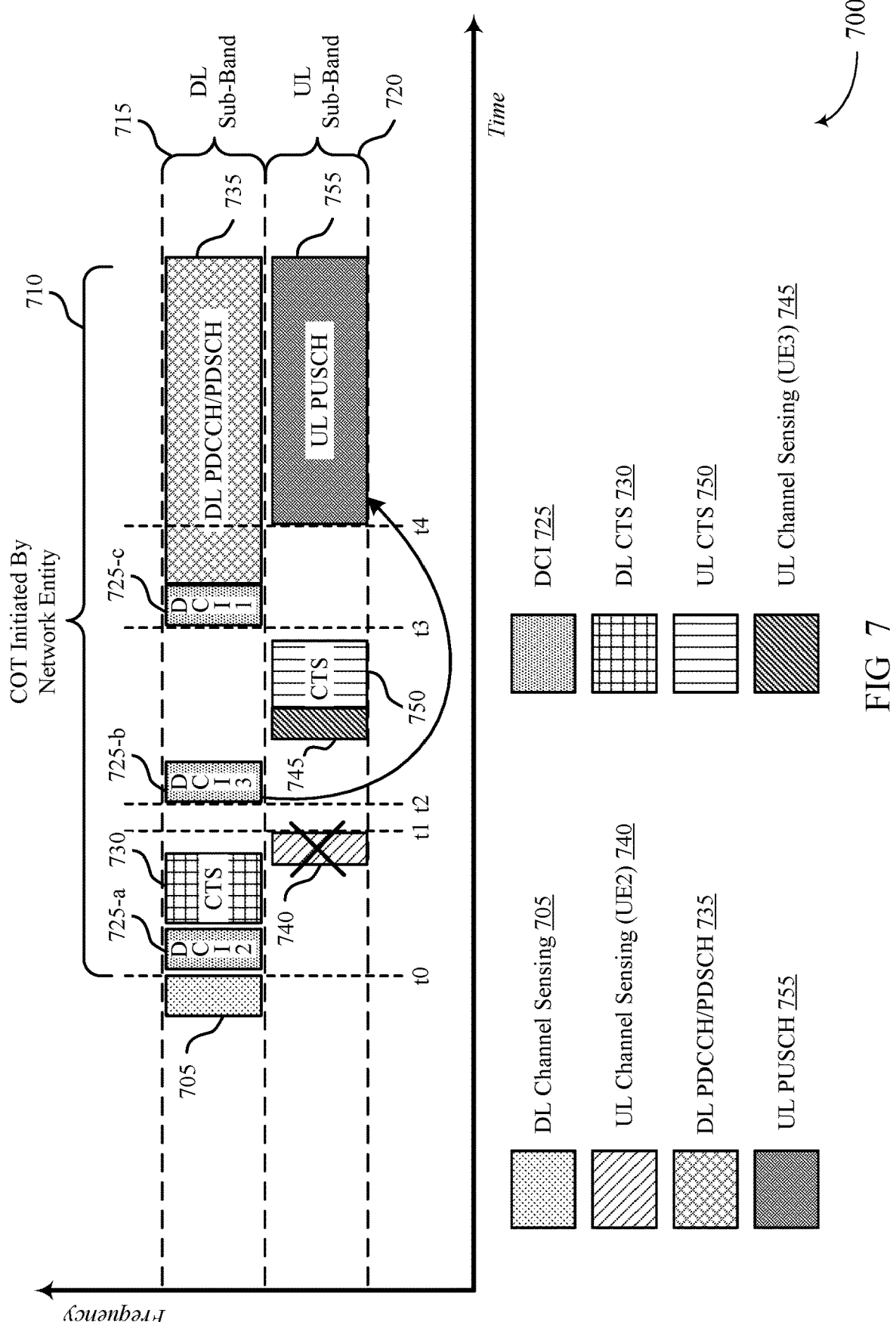

FIG. 7 shows an example of full-duplex resources 700 that support techniques for full-duplex channel access in shared radio frequency spectrum in accordance with one or more aspects of the present disclosure. The example of FIG. 7 may be used for full-duplex communications between multiple UEs and a network entity, which may be examples of UEs 115 and network entities 105 as described with reference to FIGS. 1 and 2. In some examples, a network entity may transmit configuration information to one or more UEs that indicates full-duplex communications techniques are to be used in shared radio frequency spectrum.

In the example of FIG. 7, a network entity may perform downlink channel sensing 705 (e.g., according to a LBT procedure or a CCA), and initiate a COT 710 for full-duplex communications on a downlink sub-band 715 and an uplink sub-band 720. In this example, the COT may start at time t0, and the network entity may transmit DCI 725-*a* (e.g., DCI2 for a second UE that is an uplink UE) that indicates resources for uplink transmission 755 using the uplink sub-band 720. In order to maintain the channel, the network entity may transmit a CTS 730 that indicates channel reservation until the end of the COT 710. The uplink UE may receive the DCI 725-*a* and may perform uplink channel sensing 740 (e.g., an LBT procedure). In this example, the uplink channel sensing 740 indicates that the uplink sub-band 720 is not available for transmission, and the uplink UE does not transmit a CTS that would otherwise be transmitted starting at time t1. The network entity, at time t2, may determine that the CS from the uplink UE has not been detected, and assume that the uplink channel sensing 740 failed.

In order to maintain full-duplex communications in the COT 710, the network entity may transmit a different uplink DCI 725-*b* to a different uplink UE (e.g., DCI3 to a third UE) at time t2. The different uplink DCI 725-*b* may indicate uplink resources that start at time t4, which may be based on a timing between an uplink resource scheduling DCI and an associated uplink transmission. In this example, the third UE may perform uplink channel sensing 745, and the uplink channel sensing 745 indicates that the uplink sub-band 720 is available for transmission, and the third UE may transmit CTS 750. In this example, the network entity may detect the CTS 750, and transmit a downlink DCI 725-*c* to the downlink UE (e.g., DCI1 for a first UE that is the downlink UE) that indicates downlink resources for downlink transmission 735 (e.g., PDCCH/PDSCH). As discussed, in some cases the downlink DCI 725-*c* may provide an indication to the first UE that downlink transmissions will use parameters indicated for SBFD (e.g., using a matched downlink beam for FD operation).

In other examples, instead of scheduling the different uplink UE for full-duplex communications, the network entity may operate using half-duplex for the COT 710. In some cases, the network entity may cancel SBFD and transmit the downlink transmission 735 only, and may turn off receive components within the downlink transmission duration for power saving. In this case, the downlink DCI 725-*c* may indicate downlink parameters for half-duplex (e.g., modulation order, coding rate, downlink beam, or any combinations thereof, that may have a more favorable throughput due to no interference mitigation associated with FD). In other examples, the downlink DCI 725-*c* may be transmitted at time t2 for downlink starting at time t3 for a full bandwidth transmission using both the downlink sub-band 715 and the uplink sub-band 720, with a half-duplex beam.

Figure 8:
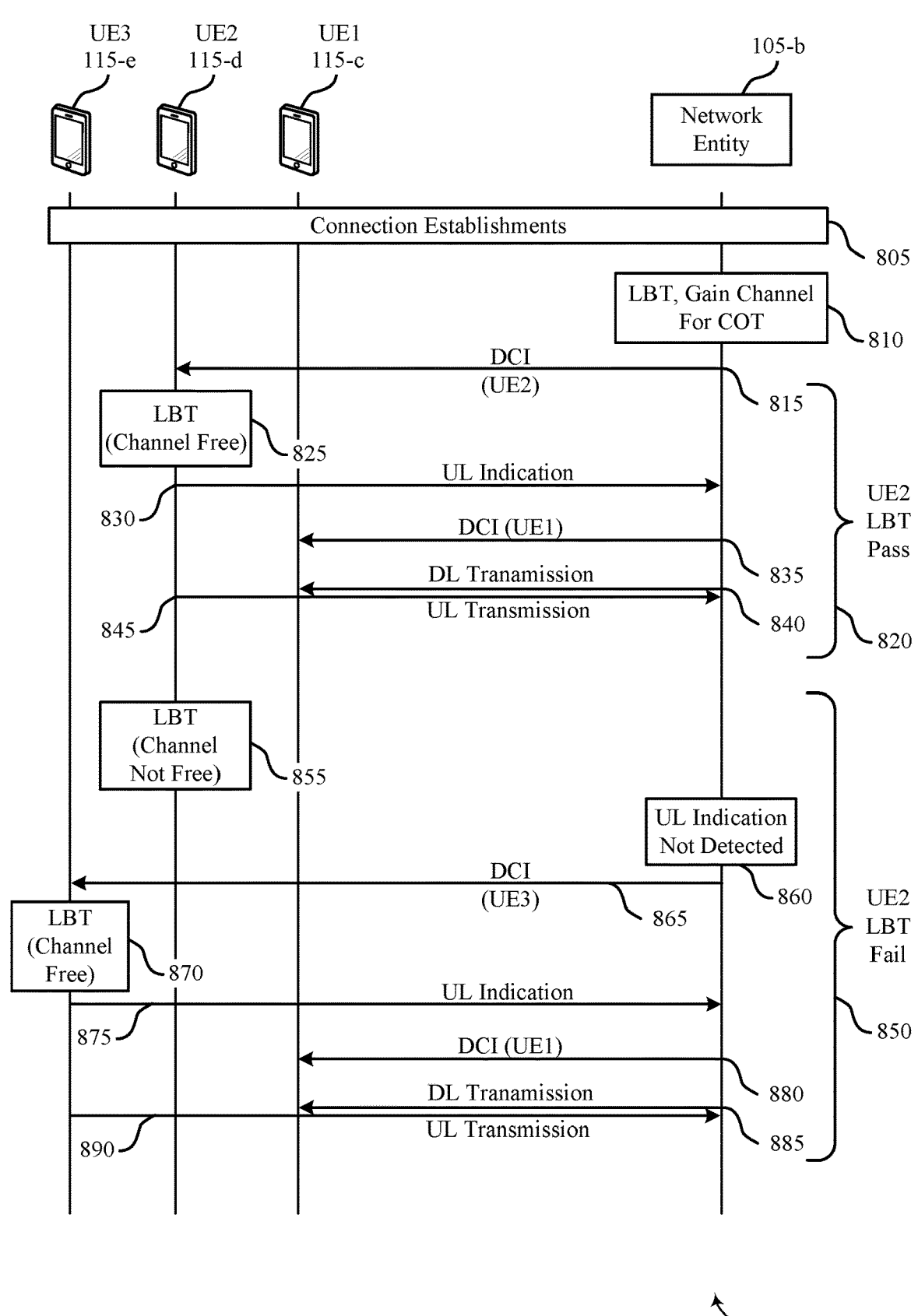
FIG. 8 shows an example of a process flow that supports techniques for full-duplex channel access in shared radio frequency spectrum in accordance with one or more aspects of the present disclosure.

FIG. 8 shows an example of a process flow 800 that supports techniques for full-duplex channel access in shared radio frequency spectrum in accordance with one or more aspects of the present disclosure. The process flow 800 may include various aspects of the present disclosure described with reference to FIGS. 1 through 7. For example, the process flow 800 may illustrate communications for a FD communications between a first UE 115-*c*, a second UE 115-*d*, a third UE 115-*e*, and a network entity 105-*b*, which may be examples of corresponding devices as described with reference to FIGS. 1 through 7. In some examples, the network entity 105-*b* and UEs 115, at 805, may perform respective connection establishment procedures to establish RRC connections for wireless communication. The connection establishment procedure may, in some cases, provide UEs 115 with configuration information for full-duplex communications. For example, the UEs 115 may be configured to transmit signaling that indicates whether a LBT procedure has passed for FD uplink transmissions, in accordance with techniques as discussed herein. Alternative examples of the following may be implemented, where some steps are performed in a different order than described or are not performed at all. In some cases, a step may include additional features not mentioned below, or further steps may be added.

At 810, the network entity 105-*b* may perform a LBT and gain channel access for a COT. In some cases, the LBT is performed by channel sensing and determining that another transmitter is not transmitting on the shared radio frequency spectrum band, and thus that the shared radio frequency spectrum band is available for transmission.

At 815, the network entity 105-*b* may transmit, and second UE 115-*d* (e.g., a first uplink UE) may receive, uplink DCI that includes scheduling information for a FD uplink transmission in the COT. As discussed herein, the second UE 115-*d* operating in the shared radio frequency spectrum band may perform a LBT procedure prior to transmitting, and the UEs 115 and network entity 105-*b* may perform different operations based on whether the LBT passes or fails. In the example of FIG. 8, operations associated with a successful LBT are shown at 820, and operations associated with a failed LBT are shown at 850.

For successful LBT operations 820, the second UE 115-*d* may perform LBT at 825 and determine that the channel is free for the uplink transmission. At 830, the second UE 115-*d* may transmit, and the network entity 105-*b* may receive, an uplink indication that LBT passed. For example, the uplink indication may be a filler signal or CTS transmitted by the second UE 115-*d*.

At 835, the network entity 105-*b* may transmit, and the first UE 115-*c* may receive, a downlink DCI that allocates downlink resources for a FD downlink transmission to the first UE 115-*c*. At 840, the network entity 105-*b* may transmit the downlink transmission contemporaneously with the uplink transmission at 845 transmitted by the second UE 115-*d* in accordance with the uplink DCI.

For unsuccessful LBT operations 850, at 855 the second UE 115-*d* may perform the LBT and determine that LBT failed. For example, the second UE 115-*d* may detect that the uplink sub-band for uplink communications is in use by another transmitter. Based on the failed LBT, the second UE 115-*d* does not transmit any uplink indication and, at 860, the network entity 105-*b* may determine that an uplink indication is not detected. The network entity 105-*b* may assume that the second UE 115-*d* failed LBT and, at 865, may transmit a different uplink DCI to the third UE 115-*e*, that schedules the third UE 115-*e* to transmit a FD uplink transmission.

At 870, the third UE 115-*e* may perform a LBT, and determine that the channel is free for uplink transmissions. At 875, the third UE 115-*e* may transmit, and the network entity 105-*b* may receive, an uplink indication that LBT passed. For example, the uplink indication may be a filler signal or CTS transmitted by the third UE 115-*e*.

At 880, the network entity 105-*b* may transmit, and the first UE 115-*c* may receive, a downlink DCI that allocates downlink resources for a FD downlink transmission to the first UE 115-*c*. At 885, the network entity 105-*b* may transmit the downlink transmission contemporaneously with the uplink transmission at 890 transmitted by the third UE 115-*e* in accordance with the uplink DCI. As discussed herein and illustrated in FIGS. 5 and 7, in some cases the uplink transmission at 890 may start at a later time than the downlink transmission at 885, due to the scheduling delay associated with scheduling the third UE 115-*e* for the FD uplink transmission.

Figure 9:
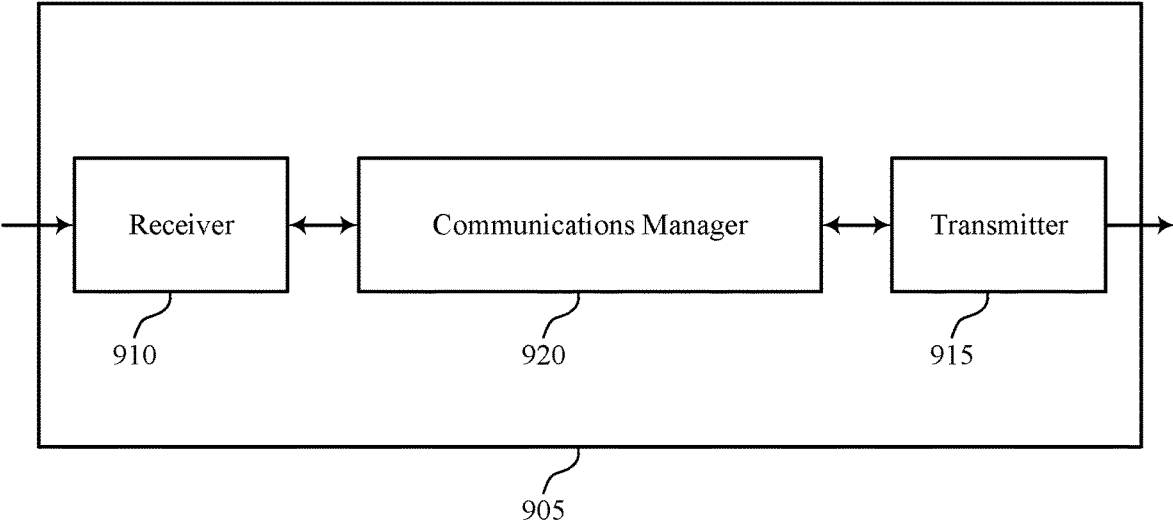
FIGS. 9 and 10 show block diagrams of devices that support techniques for full-duplex channel access in shared radio frequency spectrum in accordance with one or more aspects of the present disclosure.

FIG. 9 shows a block diagram 900 of a device 905 that supports techniques for full-duplex channel access in shared radio frequency spectrum in accordance with one or more aspects of the present disclosure. The device 905 may be an example of aspects of a UE 115 as described herein. The device 905 may include a receiver 910, a transmitter 915, and a communications manager 920. The device 905, or one or more components of the device 905 (e.g., the receiver 910, the transmitter 915, and the communications manager 920), may include at least one processor, which may be coupled with at least one memory, to, individually or collectively, support or enable the described techniques. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for full-duplex channel access in shared radio frequency spectrum). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for full-duplex channel access in shared radio frequency spectrum). In some examples, the transmitter 915 may be co-located with a receiver 910 in a transceiver module. The transmitter 915 may utilize a single antenna or a set of multiple antennas.

The communications manager 920, the receiver 910, the transmitter 915, or various combinations thereof or various components thereof may be examples of means for performing various aspects of techniques for full-duplex channel access in shared radio frequency spectrum as described herein. For example, the communications manager 920, the receiver 910, the transmitter 915, or various combinations or components thereof may be capable of performing one or more of the functions described herein.

In some examples, the communications manager 920, the receiver 910, the transmitter 915, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 920, the receiver 910, the transmitter 915, or various combinations or components thereof may be implemented in code (e.g., as communications management software or firmware) executed by at least one processor. If implemented in code executed by at least one processor, the functions of the communications manager 920, the receiver 910, the transmitter 915, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 920 may be configured to perform various operations (e.g., receiving, obtaining, monitoring, outputting, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to obtain information, output information, or perform various other operations as described herein.

The communications manager 920 may support wireless communication in accordance with examples as disclosed herein. For example, the communications manager 920 is capable of, configured to, or operable to support a means for receiving, from a network entity, a dynamic grant for an uplink transmission to be transmitted contemporaneously with a downlink transmission from the network entity, the dynamic grant indicating transmission resources in a first portion of a shared radio frequency spectrum band for the uplink transmission, and downlink transmission from the network entity uses a second portion of the shared radio frequency spectrum band. The communications manager 920 is capable of, configured to, or operable to support a means for performing a listen-before-talk procedure for the first portion of the shared radio frequency spectrum band. The communications manager 920 is capable of, configured to, or operable to support a means for transmitting or refraining from transmitting the uplink transmission based on the listen-before-talk procedure indicating whether the first portion of the shared radio frequency spectrum band is available for the uplink transmission.

By including or configuring the communications manager 920 in accordance with examples as described herein, the device 905 (e.g., at least one processor controlling or otherwise coupled with the receiver 910, the transmitter 915, the communications manager 920, or a combination thereof) may support techniques for full-duplex communications in shared radio frequency spectrum. Such techniques may help to enhance reliability and scheduling flexibility of transmissions in full-duplex communications (e.g., to allow a network entity to schedule other UEs in the event of an LBT failure). Such techniques thus enhance network efficiency, enhance reliability, enhance throughput, and provide for enhanced user experience.

Figure 10:
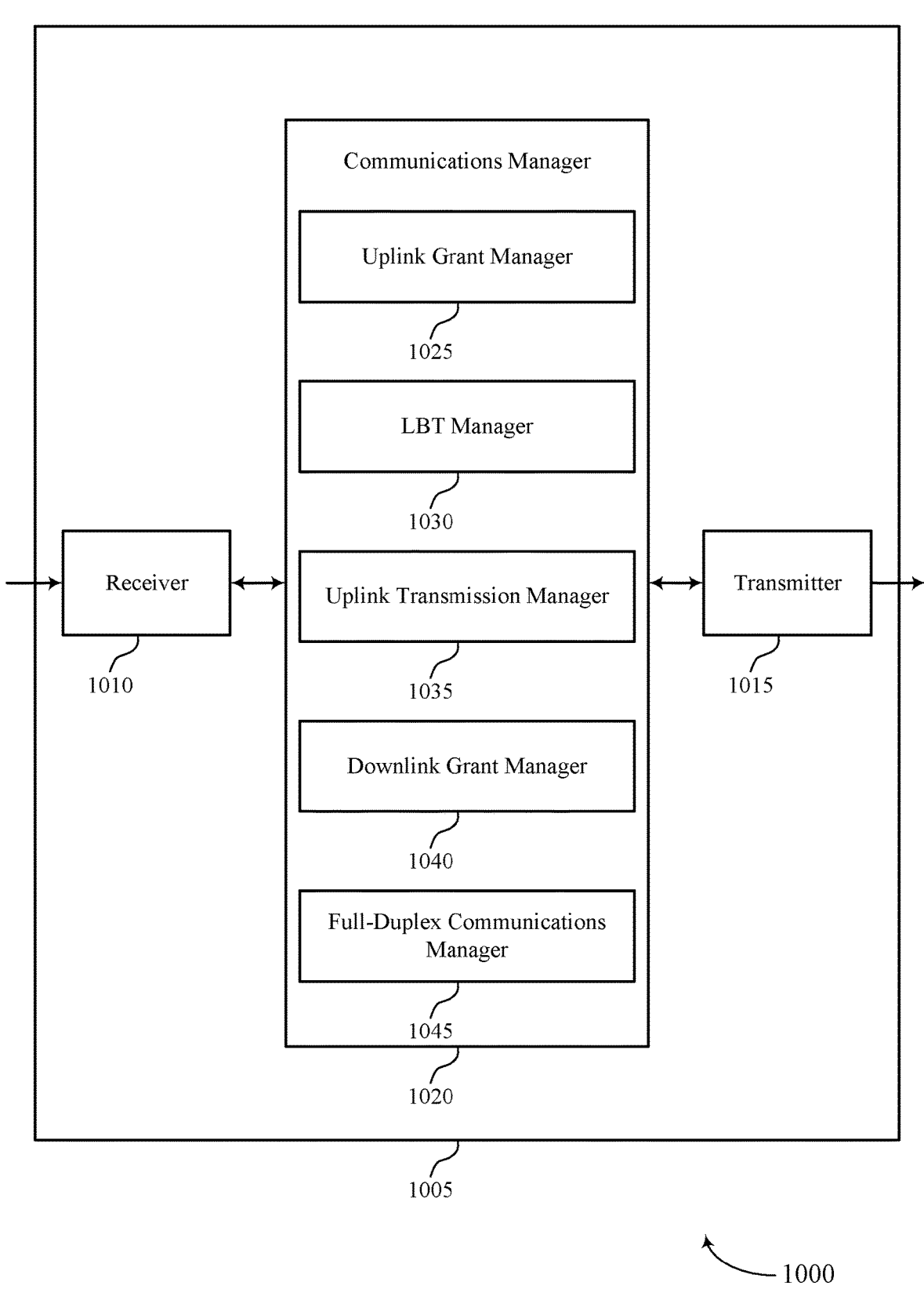

FIG. 10 shows a block diagram 1000 of a device 1005 that supports techniques for full-duplex channel access in shared radio frequency spectrum in accordance with one or more aspects of the present disclosure. The device 1005 may be an example of aspects of a device 905 or a UE 115 as described herein. The device 1005 may include a receiver 1010, a transmitter 1015, and a communications manager 1020. The device 1005, or one of more components of the device 1005 (e.g., the receiver 1010, the transmitter 1015, and the communications manager 1020), may include at least one processor, which may be coupled with at least one memory, to support the described techniques. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for full-duplex channel access in shared radio frequency spectrum). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for full-duplex channel access in shared radio frequency spectrum). In some examples, the transmitter 1015 may be co-located with a receiver 1010 in a transceiver module. The transmitter 1015 may utilize a single antenna or a set of multiple antennas.

The device 1005, or various components thereof, may be an example of means for performing various aspects of techniques for full-duplex channel access in shared radio frequency spectrum as described herein. For example, the communications manager 1020 may include an uplink grant manager 1025, an LBT manager 1030, an uplink transmission manager 1035, a downlink grant manager 1040, a full-duplex communications manager 1045, or any combination thereof. The communications manager 1020 may be an example of aspects of a communications manager 920 as described herein. In some examples, the communications manager 1020, or various components thereof, may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communication in accordance with examples as disclosed herein. The uplink grant manager 1025 is capable of, configured to, or operable to support a means for receiving, from a network entity, a dynamic grant for an uplink transmission to be transmitted contemporaneously with a downlink transmission from the network entity, the dynamic grant indicating transmission resources in a first portion of a shared radio frequency spectrum band for the uplink transmission, and downlink transmission from the network entity uses a second portion of the shared radio frequency spectrum band. The LBT manager 1030 is capable of, configured to, or operable to support a means for performing a listen-before-talk procedure for the first portion of the shared radio frequency spectrum band. The uplink transmission manager 1035 is capable of, configured to, or operable to support a means for transmitting or refraining from transmitting the uplink transmission based on the listen-before-talk procedure indicating whether the first portion of the shared radio frequency spectrum band is available for the uplink transmission.

Figure 11:
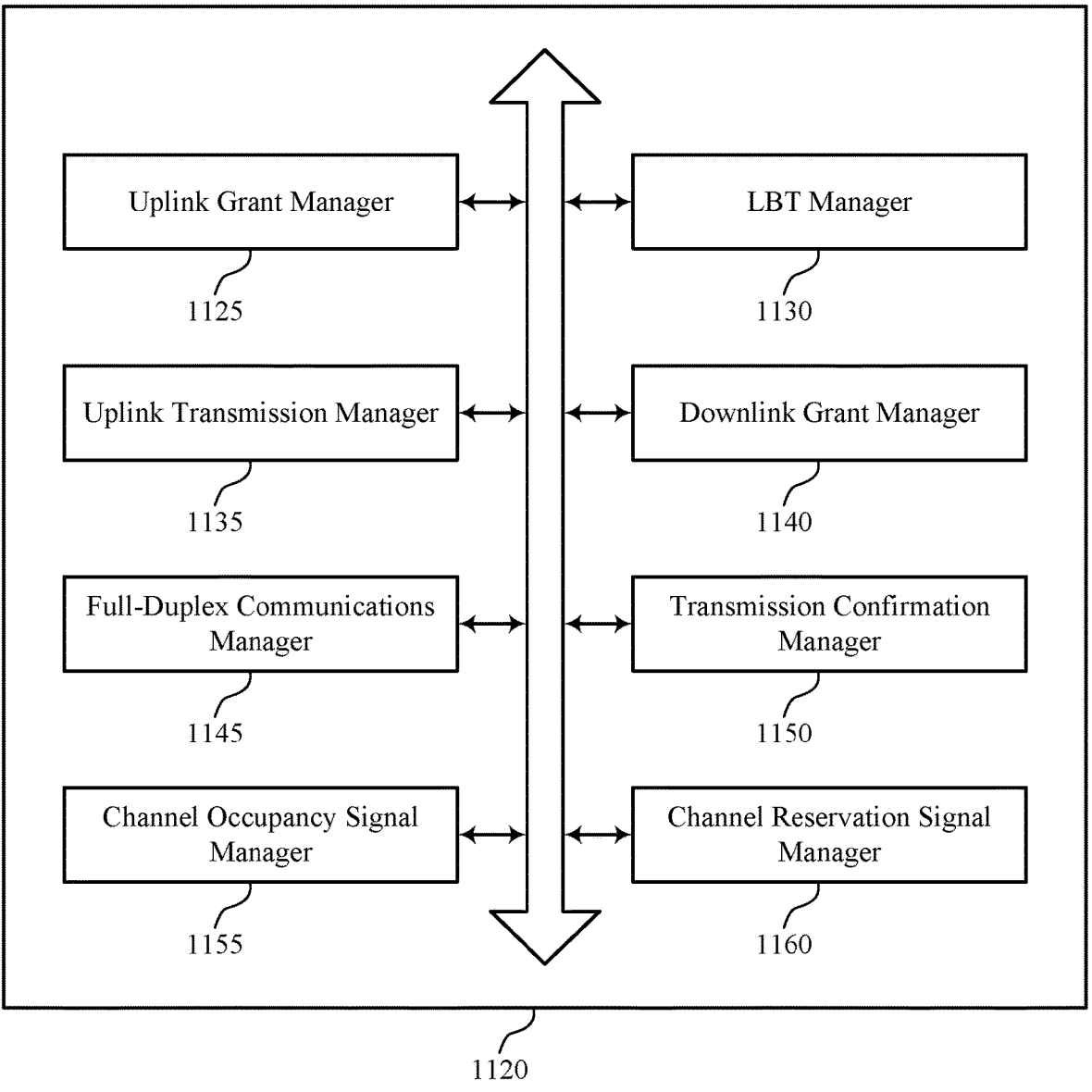
FIG. 11 shows a block diagram of a communications manager that supports techniques for full-duplex channel access in shared radio frequency spectrum in accordance with one or more aspects of the present disclosure.

FIG. 11 shows a block diagram 1100 of a communications manager 1120 that supports techniques for full-duplex channel access in shared radio frequency spectrum in accordance with one or more aspects of the present disclosure. The communications manager 1120 may be an example of aspects of a communications manager 920, a communications manager 1020, or both, as described herein. The communications manager 1120, or various components thereof, may be an example of means for performing various aspects of techniques for full-duplex channel access in shared radio frequency spectrum as described herein. For example, the communications manager 1120 may include an uplink grant manager 1125, an LBT manager 1130, an uplink transmission manager 1135, a downlink grant manager 1140, a full-duplex communications manager 1145, a transmission confirmation manager 1150, a channel occupancy signal manager 1155, a channel reservation signal manager 1160, or any combination thereof. Each of these components, or components or subcomponents thereof (e.g., one or more processors, one or more memories), may communicate, directly or indirectly, with one another (e.g., via one or more buses).

The communications manager 1120 may support wireless communication in accordance with examples as disclosed herein. The uplink grant manager 1125 is capable of, configured to, or operable to support a means for receiving, from a network entity, a dynamic grant for an uplink transmission to be transmitted contemporaneously with a downlink transmission from the network entity, the dynamic grant indicating transmission resources in a first portion of a shared radio frequency spectrum band for the uplink transmission, and downlink transmission from the network entity uses a second portion of the shared radio frequency spectrum band. The LBT manager 1130 is capable of, configured to, or operable to support a means for performing a listen-before-talk procedure for the first portion of the shared radio frequency spectrum band. The uplink transmission manager 1135 is capable of, configured to, or operable to support a means for transmitting or refraining from transmitting the uplink transmission based on the listen-before-talk procedure indicating whether the first portion of the shared radio frequency spectrum band is available for the uplink transmission.

In some examples, the transmission confirmation manager 1150 is capable of, configured to, or operable to support a means for transmitting, responsive to the listen-before-talk procedure indicating that the first portion of the shared radio frequency spectrum band is available for the uplink transmission, an indication to the network entity that the uplink transmission will be transmitted by the UE. In some examples, communications with the network entity are performed according to a full-duplex communication procedure at the network entity that is initiated responsive to the network entity obtaining at least the second portion of the shared radio frequency spectrum band for a channel occupancy time. In some examples, the first portion of the shared radio frequency spectrum band and the second portion of the shared radio frequency spectrum band occupy non-overlapping frequency resources of the shared radio frequency spectrum band, partially overlapping frequency resources of the shared radio frequency spectrum band, or fully overlapping frequency resources of the shared radio frequency spectrum band.

In some examples, the dynamic grant for the uplink transmission is received at a first time and, to support indicates the uplink transmission is to start at a second time, and where the method, the channel occupancy signal manager 1155 is capable of, configured to, or operable to support a means for transmitting, responsive to the listen-before-talk procedure indicating that the first portion of the shared radio frequency spectrum band is available for the uplink transmission, a channel occupancy signal starting upon conclusion of the listen-before-talk procedure and ending at the second time. In some examples, the channel occupancy signal is a preconfigured signal, is configured by RRC signaling, is configured in an uplink scheduling control information communication, or any combinations thereof.

In some examples, the channel reservation signal manager 1160 is capable of, configured to, or operable to support a means for transmitting, responsive to the listen-before-talk procedure indicating that the first portion of the shared radio frequency spectrum band is available for the uplink transmission, a channel reservation indication that the UE will use the first portion of the shared radio frequency spectrum band to transmit the uplink transmission.

In some examples, the channel reservation indication is a clear-to-send (CTS) signal that is broadcast using the first portion of the shared radio frequency spectrum band. In some examples, the channel reservation indication is transmitted in a first slot after receipt of the dynamic grant. In some examples, the dynamic grant indicates that the uplink transmission is to be started using one or more parameters associated with a full-duplex communication procedure. In some examples, the dynamic grant includes a beam indication for a transmission beam for the uplink transmission that is associated with the full-duplex communication procedure. In some examples, the shared radio frequency spectrum band is unlicensed radio frequency spectrum.

Figure 12:
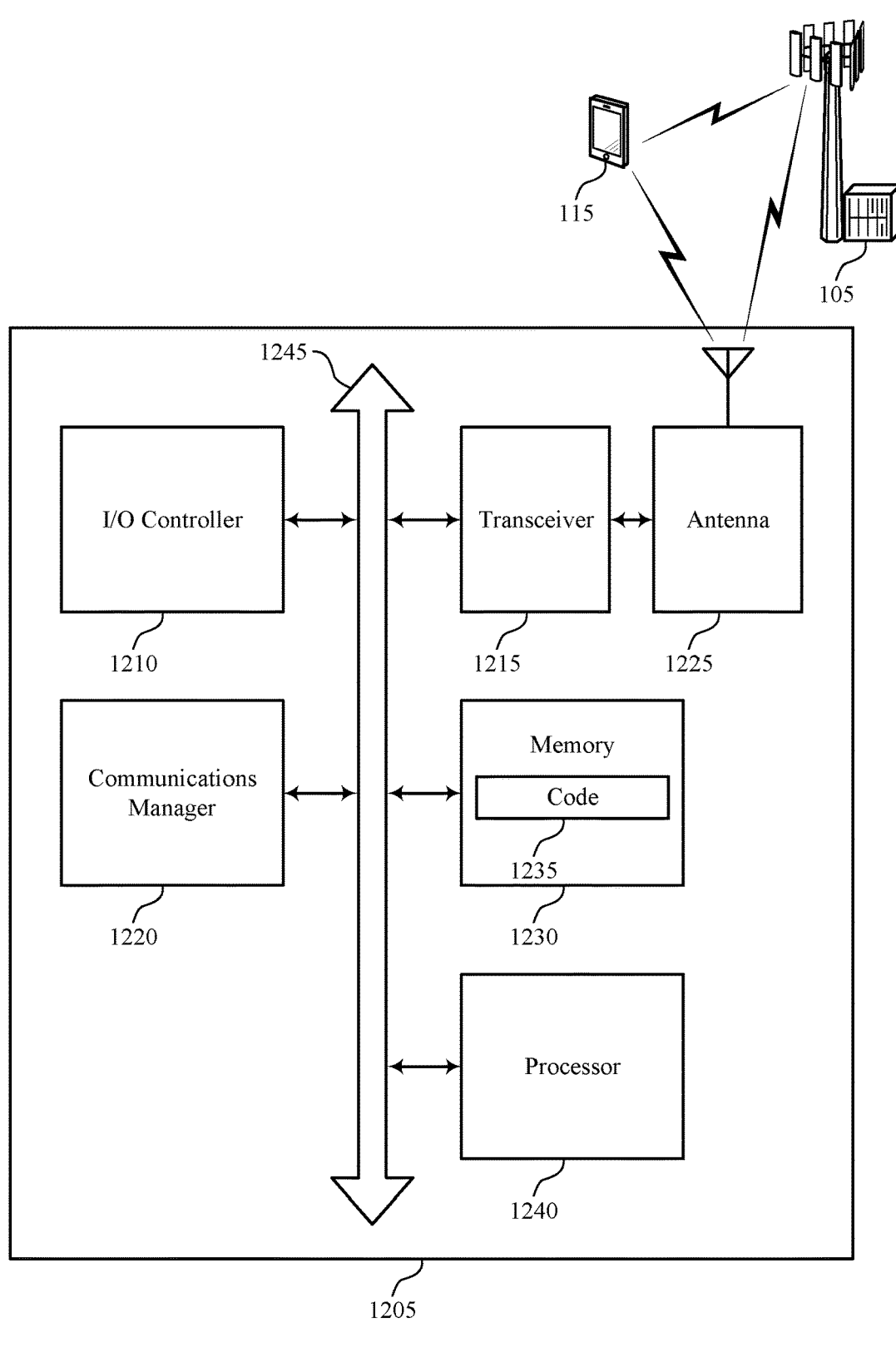
FIG. 12 shows a diagram of a system including a device that supports techniques for full-duplex channel access in shared radio frequency spectrum in accordance with one or more aspects of the present disclosure.

FIG. 12 shows a diagram of a system 1200 including a device 1205 that supports techniques for full-duplex channel access in shared radio frequency spectrum in accordance with one or more aspects of the present disclosure. The device 1205 may be an example of or include the components of a device 905, a device 1005, or a UE 115 as described herein. The device 1205 may communicate (e.g., wirelessly) with one or more network entities 105, one or more UEs 115, or any combination thereof. The device 1205 may include components for bi-directional voice and data communications including components for transmitting and receiving communications, such as a communications manager 1220, an input/output (I/O) controller 1210, a transceiver 1215, an antenna 1225, at least one memory 1230, code 1235, and at least one processor 1240. These components may be in electronic communication or otherwise coupled (e.g., operatively, communicatively, functionally, electronically, electrically) via one or more buses (e.g., a bus 1245).

The I/O controller 1210 may manage input and output signals for the device 1205. The I/O controller 1210 may also manage peripherals not integrated into the device 1205. In some cases, the I/O controller 1210 may represent a physical connection or port to an external peripheral. In some cases, the I/O controller 1210 may utilize an operating system such as iOS®, ANDROID®, MS-DOS®, MS-WINDOWS®, OS/2®, UNIX®, LINUX®, or another known operating system. Additionally or alternatively, the I/O controller 1210 may represent or interact with a modem, a keyboard, a mouse, a touchscreen, or a similar device. In some cases, the I/O controller 1210 may be implemented as part of one or more processors, such as the at least one processor 1240. In some cases, a user may interact with the device 1205 via the I/O controller 1210 or via hardware components controlled by the I/O controller 1210.

In some cases, the device 1205 may include a single antenna 1225. However, in some other cases, the device 1205 may have more than one antenna 1225, which may be capable of concurrently transmitting or receiving multiple wireless transmissions. The transceiver 1215 may communicate bi-directionally, via the one or more antennas 1225, wired, or wireless links as described herein. For example, the transceiver 1215 may represent a wireless transceiver and may communicate bi-directionally with another wireless transceiver. The transceiver 1215 may also include a modem to modulate the packets, to provide the modulated packets to one or more antennas 1225 for transmission, and to demodulate packets received from the one or more antennas 1225. The transceiver 1215, or the transceiver 1215 and one or more antennas 1225, may be an example of a transmitter 915, a transmitter 1015, a receiver 910, a receiver 1010, or any combination thereof or component thereof, as described herein.

The at least one memory 1230 may include random access memory (RAM) and read-only memory (ROM). The at least one memory 1230 may store computer-readable, computer-executable code 1235 including instructions that, when executed by the at least one processor 1240, cause the device 1205 to perform various functions described herein. The code 1235 may be stored in a non-transitory computer-readable medium such as system memory or another type of memory. In some cases, the code 1235 may not be directly executable by the at least one processor 1240 but may cause a computer (e.g., when compiled and executed) to perform functions described herein. In some cases, the at least one memory 1230 may contain, among other things, a basic I/O system (BIOS) which may control basic hardware or software operation such as the interaction with peripheral components or devices.

The at least one processor 1240 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 1240 may be configured to operate a memory array using a memory controller. In some other cases, a memory controller may be integrated into the at least one processor 1240. The at least one processor 1240 may be configured to execute computer-readable instructions stored in a memory (e.g., the at least one memory 1230) to cause the device 1205 to perform various functions (e.g., functions or tasks supporting techniques for full-duplex channel access in shared radio frequency spectrum). For example, the device 1205 or a component of the device 1205 may include at least one processor 1240 and at least one memory 1230 coupled with or to the at least one processor 1240, the at least one processor 1240 and at least one memory 1230 configured to perform various functions described herein. In some examples, the at least one processor 1240 may include multiple processors and the at least one memory 1230 may include multiple memories. One or more of the multiple processors may be coupled with one or more of the multiple memories, which may, individually or collectively, be configured to perform various functions herein. In some examples, the at least one processor 1240 may be a component of a processing system, which may refer to a system (such as a series) of machines, circuitry (including, for example, one or both of processor circuitry (which may include the at least one processor 1240) and memory circuitry (which may include the at least one memory 1230)), or components, that receives or obtains inputs and processes the inputs to produce, generate, or obtain a set of outputs. The processing system may be configured to perform one or more of the functions described herein. As such, the at least one processor 1240 or a processing system including the at least one processor 1240 may be configured to, configurable to, or operable to cause the device 1205 to perform one or more of the functions described herein. Further, as described herein, being "configured to," being "configurable to," and being "operable to" may be used interchangeably and may be associated with a capability, when executing code stored in the at least one memory 1230 or otherwise, to perform one or more of the functions described herein.

The communications manager 1220 may support wireless communication in accordance with examples as disclosed herein. For example, the communications manager 1220 is capable of, configured to, or operable to support a means for receiving, from a network entity, a dynamic grant for an uplink transmission to be transmitted contemporaneously with a downlink transmission from the network entity, the dynamic grant indicating transmission resources in a first portion of a shared radio frequency spectrum band for the uplink transmission, and downlink transmission from the network entity uses a second portion of the shared radio frequency spectrum band. The communications manager 1220 is capable of, configured to, or operable to support a means for performing a listen-before-talk procedure for the first portion of the shared radio frequency spectrum band. The communications manager 1220 is capable of, configured to, or operable to support a means for transmitting or refraining from transmitting the uplink transmission based on the listen-before-talk procedure indicating whether the first portion of the shared radio frequency spectrum band is available for the uplink transmission.

By including or configuring the communications manager 1220 in accordance with examples as described herein, the device 1205 may support techniques for full-duplex communications in shared radio frequency spectrum. Such techniques may help to enhance reliability and scheduling flexibility of transmissions in full-duplex communications (e.g., to allow a network entity to schedule other UEs in the event of an LBT failure). Such techniques thus enhance network efficiency, enhance reliability, reduce latency, enhance throughput, and provide for enhanced user experience.

In some examples, the communications manager 1220 may be configured to perform various operations (e.g., receiving, monitoring, transmitting) using or otherwise in cooperation with the transceiver 1215, the one or more antennas 1225, or any combination thereof. Although the communications manager 1220 is illustrated as a separate component, in some examples, one or more functions described with reference to the communications manager 1220 may be supported by or performed by the at least one processor 1240, the at least one memory 1230, the code 1235, or any combination thereof. For example, the code 1235 may include instructions executable by the at least one processor 1240 to cause the device 1205 to perform various aspects of techniques for full-duplex channel access in shared radio frequency spectrum as described herein, or the at least one processor 1240 and the at least one memory 1230 may be otherwise configured to, individually or collectively, perform or support such operations.

Figure 13:
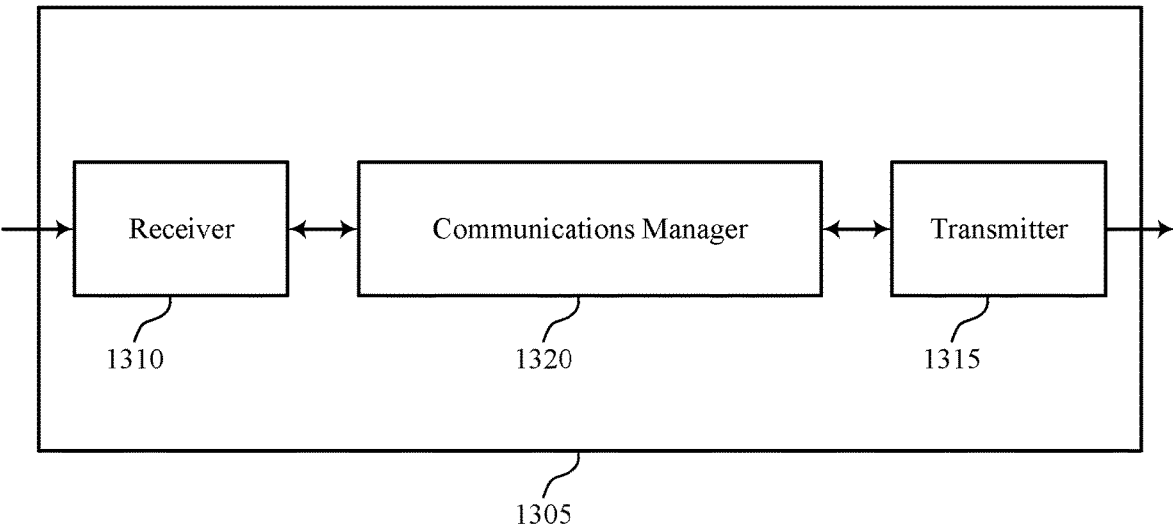
FIGS. 13 and 14 show block diagrams of devices that support techniques for full-duplex channel access in shared radio frequency spectrum in accordance with one or more aspects of the present disclosure.

FIG. 13 shows a block diagram 1300 of a device 1305 that supports techniques for full-duplex channel access in shared radio frequency spectrum in accordance with one or more aspects of the present disclosure. The device 1305 may be an example of aspects of a network entity 105 as described herein. The device 1305 may include a receiver 1310, a transmitter 1315, and a communications manager 1320. The device 1305, or one or more components of the device 1305 (e.g., the receiver 1310, the transmitter 1315, and the communications manager 1320), may include at least one processor, which may be coupled with at least one memory, to, individually or collectively, support or enable the described techniques. Each of these components may be in communication with one another (e.g., via one or more buses).

The receiver 1310 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1305. In some examples, the receiver 1310 may support obtaining information by receiving signals via one or more antennas. Additionally, or alternatively, the receiver 1310 may support obtaining information by receiving signals via one or more wired (e.g., electrical, fiber optic) interfaces, wireless interfaces, or any combination thereof.

The transmitter 1315 may provide a means for outputting (e.g., transmitting, providing, conveying, sending) information generated by other components of the device 1305. For example, the transmitter 1315 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1315 may support outputting information by transmitting signals via one or more antennas. Additionally, or alternatively, the transmitter 1315 may support outputting information by transmitting signals via one or more wired (e.g., electrical, fiber optic) interfaces, wireless interfaces, or any combination thereof. In some examples, the transmitter 1315 and the receiver 1310 may be co-located in a transceiver, which may include or be coupled with a modem.

The communications manager 1320, the receiver 1310, the transmitter 1315, or various combinations thereof or various components thereof may be examples of means for performing various aspects of techniques for full-duplex channel access in shared radio frequency spectrum as described herein. For example, the communications manager 1320, the receiver 1310, the transmitter 1315, or various combinations or components thereof may be capable of performing one or more of the functions described herein.

In some examples, the communications manager 1320, the receiver 1310, the transmitter 1315, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1320, the receiver 1310, the transmitter 1315, or various combinations or components thereof may be implemented in code (e.g., as communications management software or firmware) executed by at least one processor. If implemented in code executed by at least one processor, the functions of the communications manager 1320, the receiver 1310, the transmitter 1315, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1320 may be configured to perform various operations (e.g., receiving, obtaining, monitoring, outputting, transmitting) using or otherwise in cooperation with the receiver 1310, the transmitter 1315, or both. For example, the communications manager 1320 may receive information from the receiver 1310, send information to the transmitter 1315, or be integrated in combination with the receiver 1310, the transmitter 1315, or both to obtain information, output information, or perform various other operations as described herein.

The communications manager 1320 may support wireless communication in accordance with examples as disclosed herein. For example, the communications manager 1320 is capable of, configured to, or operable to support a means for transmitting, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band. The communications manager 1320 is capable of, configured to, or operable to support a means for transmitting a downlink dynamic grant for the downlink transmission to the downlink UE, where the downlink dynamic grant indicates downlink transmission resources in a second portion of the shared radio frequency spectrum band. The communications manager 1320 is capable of, configured to, or operable to support a means for monitoring for the first uplink transmission using the first portion of the shared radio frequency spectrum band while transmitting the downlink transmission to the downlink UE using the second portion of the shared radio frequency spectrum band.

By including or configuring the communications manager 1320 in accordance with examples as described herein, the device 1305 (e.g., at least one processor controlling or otherwise coupled with the receiver 1310, the transmitter 1315, the communications manager 1320, or a combination thereof) may support techniques for full-duplex communications in shared radio frequency spectrum. Such techniques may help to enhance reliability and scheduling flexibility of transmissions in full-duplex communications (e.g., to allow a network entity to schedule other UEs in the event of an LBT failure). Such techniques thus enhance network efficiency, reduce latency, enhance reliability, enhance throughput, and provide for enhanced user experience.

Figure 14:
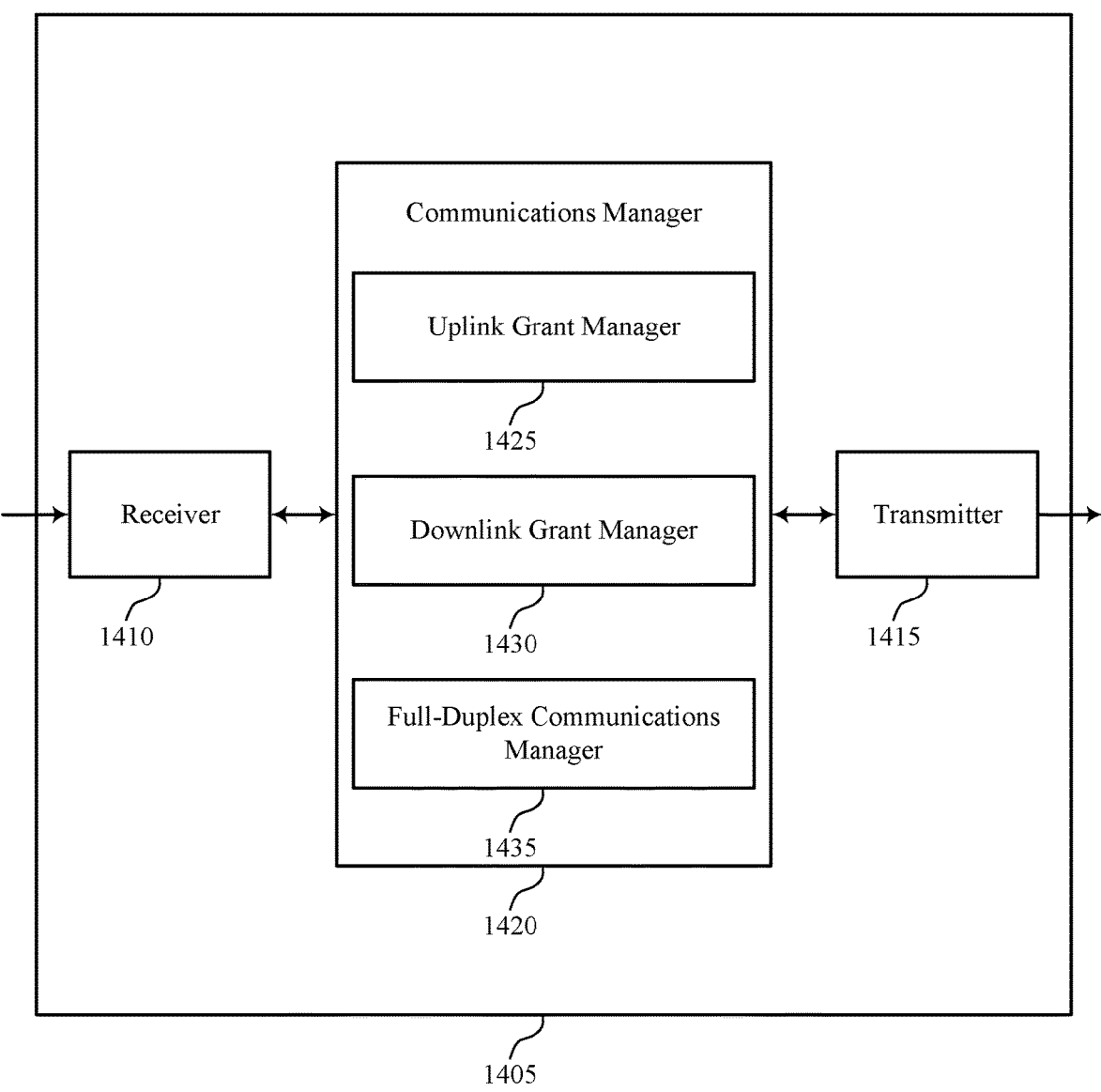

FIG. 14 shows a block diagram 1400 of a device 1405 that supports techniques for full-duplex channel access in shared radio frequency spectrum in accordance with one or more aspects of the present disclosure. The device 1405 may be an example of aspects of a device 1305 or a network entity 105 as described herein. The device 1405 may include a receiver 1410, a transmitter 1415, and a communications manager 1420. The device 1405, or one of more components of the device 1405 (e.g., the receiver 1410, the transmitter 1415, and the communications manager 1420), may include at least one processor, which may be coupled with at least one memory, to support the described techniques. Each of these components may be in communication with one another (e.g., via one or more buses).

The receiver 1410 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1405. In some examples, the receiver 1410 may support obtaining information by receiving signals via one or more antennas. Additionally, or alternatively, the receiver 1410 may support obtaining information by receiving signals via one or more wired (e.g., electrical, fiber optic) interfaces, wireless interfaces, or any combination thereof.

The transmitter 1415 may provide a means for outputting (e.g., transmitting, providing, conveying, sending) information generated by other components of the device 1405. For example, the transmitter 1415 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1415 may support outputting information by transmitting signals via one or more antennas. Additionally, or alternatively, the transmitter 1415 may support outputting information by transmitting signals via one or more wired (e.g., electrical, fiber optic) interfaces, wireless interfaces, or any combination thereof. In some examples, the transmitter 1415 and the receiver 1410 may be co-located in a transceiver, which may include or be coupled with a modem.

The device 1405, or various components thereof, may be an example of means for performing various aspects of techniques for full-duplex channel access in shared radio frequency spectrum as described herein. For example, the communications manager 1420 may include an uplink grant manager 1425, a downlink grant manager 1430, a full-duplex communications manager 1435, or any combination thereof. The communications manager 1420 may be an example of aspects of a communications manager 1320 as described herein. In some examples, the communications manager 1420, or various components thereof, may be configured to perform various operations (e.g., receiving, obtaining, monitoring, outputting, transmitting) using or otherwise in cooperation with the receiver 1410, the transmitter 1415, or both. For example, the communications manager 1420 may receive information from the receiver 1410, send information to the transmitter 1415, or be integrated in combination with the receiver 1410, the transmitter 1415, or both to obtain information, output information, or perform various other operations as described herein.

The communications manager 1420 may support wireless communication in accordance with examples as disclosed herein. The uplink grant manager 1425 is capable of, configured to, or operable to support a means for transmitting, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band. The downlink grant manager 1430 is capable of, configured to, or operable to support a means for transmitting a downlink dynamic grant for the downlink transmission to the downlink UE, where the downlink dynamic grant indicates downlink transmission resources in a second portion of the shared radio frequency spectrum band. The full-duplex communications manager 1435 is capable of, configured to, or operable to support a means for monitoring for the first uplink transmission using the first portion of the shared radio frequency spectrum band while transmitting the downlink transmission to the downlink UE using the second portion of the shared radio frequency spectrum band.

Figure 15:
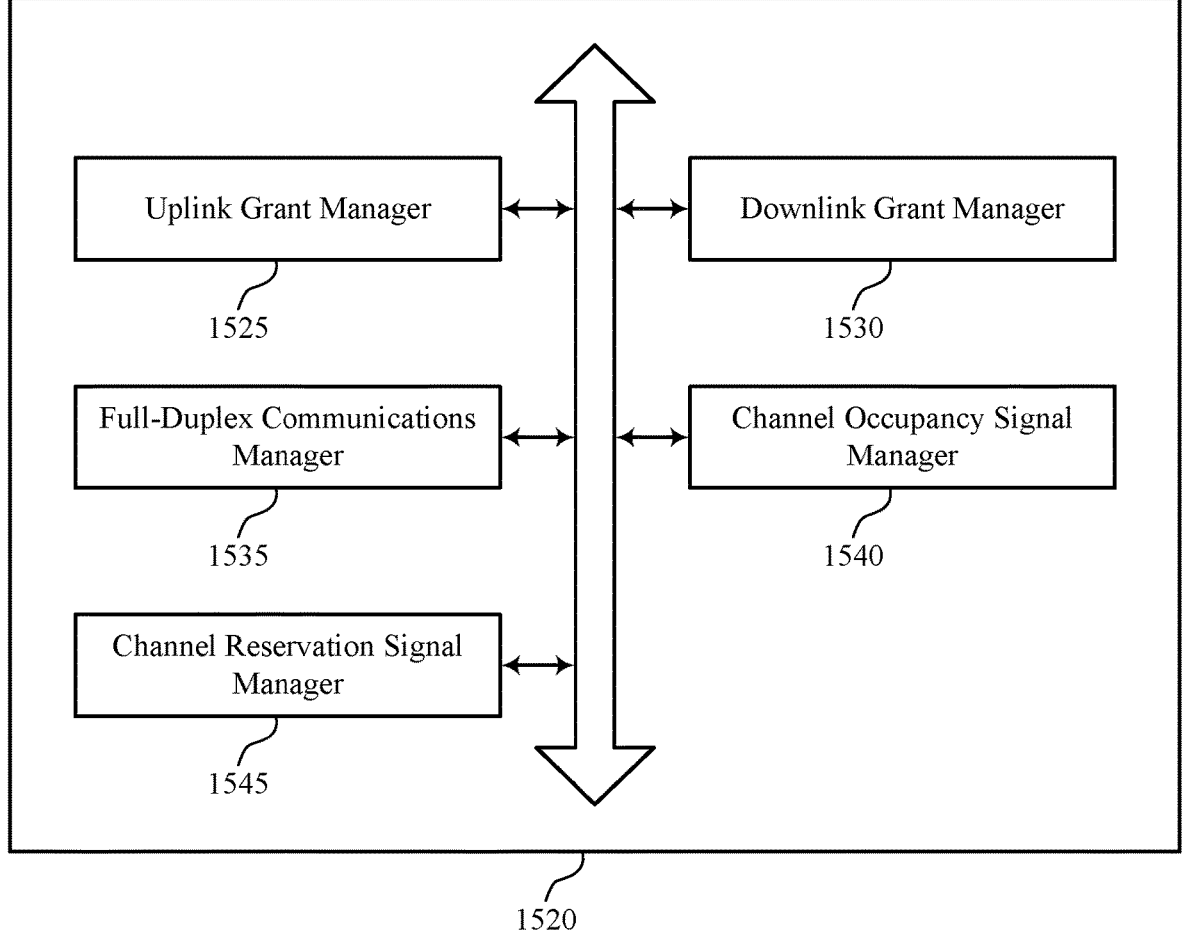
FIG. 15 shows a block diagram of a communications manager that supports techniques for full-duplex channel access in shared radio frequency spectrum in accordance with one or more aspects of the present disclosure.

FIG. 15 shows a block diagram 1500 of a communications manager 1520 that supports techniques for full-duplex channel access in shared radio frequency spectrum in accordance with one or more aspects of the present disclosure. The communications manager 1520 may be an example of aspects of a communications manager 1320, a communications manager 1420, or both, as described herein. The communications manager 1520, or various components thereof, may be an example of means for performing various aspects of techniques for full-duplex channel access in shared radio frequency spectrum as described herein. For example, the communications manager 1520 may include an uplink grant manager 1525, a downlink grant manager 1530, a full-duplex communications manager 1535, a channel occupancy signal manager 1540, a channel reservation signal manager 1545, or any combination thereof. Each of these components, or components or subcomponents thereof (e.g., one or more processors, one or more memories), may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1520 may support wireless communication in accordance with examples as disclosed herein. The uplink grant manager 1525 is capable of, configured to, or operable to support a means for transmitting, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band. The downlink grant manager 1530 is capable of, configured to, or operable to support a means for transmitting a downlink dynamic grant for the downlink transmission to the downlink UE, where the downlink dynamic grant indicates downlink transmission resources in a second portion of the shared radio frequency spectrum band. The full-duplex communications manager 1535 is capable of, configured to, or operable to support a means for monitoring for the first uplink transmission using the first portion of the shared radio frequency spectrum band while transmitting the downlink transmission to the downlink UE using the second portion of the shared radio frequency spectrum band.

In some examples, the uplink grant manager 1525 is capable of, configured to, or operable to support a means for receiving, from the uplink UE, an indication that the first uplink transmission will be transmitted by the UE. In some examples, communications with the downlink UE and the uplink UE are performed according to a full-duplex communication procedure at the network entity. In some examples, the first portion of the shared radio frequency spectrum band and the second portion of the shared radio frequency spectrum band occupy non-overlapping frequency resources of the shared radio frequency spectrum band, partially overlapping frequency resources of the shared radio frequency spectrum band, or fully overlapping frequency resources of the shared radio frequency spectrum band.

In some examples, the first uplink dynamic grant is transmitted at a first time and, to support indicates the first uplink transmission is to start at a second time, and the channel occupancy signal manager 1540 is capable of, configured to, or operable to support a means for transmitting, responsive to transmission of the first uplink dynamic grant, a downlink channel occupancy signal, the downlink channel occupancy signal transmission starting upon conclusion of the transmission of the first uplink dynamic grant or starting upon expiration of a maximum gap that other devices may occupy on the shared radio frequency spectrum band, and ending at the second time. In some examples, the channel occupancy signal manager 1540 is capable of, configured to, or operable to support a means for monitoring, prior to transmitting the downlink dynamic grant, for an uplink channel occupancy signal from the uplink UE.

In some examples, to support transmitting the downlink dynamic grant, the downlink grant manager 1530 is capable of, configured to, or operable to support a means for transmitting, to a first downlink UE responsive to detecting the uplink channel occupancy signal, a first downlink dynamic grant for a first downlink transmission to the first downlink UE.

In some examples, the uplink UE is a first uplink UE and the uplink transmission resources are first uplink transmission resources, and the uplink grant manager 1525 is capable of, configured to, or operable to support a means for transmitting, to a second uplink UE responsive to a failure to detect the uplink channel occupancy signal, a second uplink dynamic grant for a second uplink transmission of the second uplink UE, the second uplink dynamic grant transmitted subsequent to a time at which the uplink channel occupancy signal is configured to be transmitted by the first uplink UE, and where the second uplink dynamic grant indicates second uplink transmission resources that start subsequent to the first uplink transmission resources.

In some examples, to support transmitting the downlink dynamic grant, the downlink grant manager 1530 is capable of, configured to, or operable to support a means for transmitting, to a first downlink UE responsive to a failure to detect the uplink channel occupancy signal, a first downlink dynamic grant for a first downlink transmission to the first downlink UE. In some examples, to support transmitting the downlink dynamic grant, the full-duplex communications manager 1535 is capable of, configured to, or operable to support a means for disabling one or more receive components associated with receiving the first uplink transmission.

In some examples, to support transmitting the downlink dynamic grant, the downlink grant manager 1530 is capable of, configured to, or operable to support a means for transmitting, to a first downlink UE responsive to a failure to detect the uplink channel occupancy signal, a first downlink dynamic grant for a first downlink transmission to the first downlink UE, the first downlink dynamic grant indicating resources for both the first portion of a shared radio frequency spectrum band and the second portion of a shared radio frequency spectrum band.

In some examples, the uplink channel occupancy signal is a preconfigured signal, is configured by RRC signaling, is configured in an uplink scheduling control information communication, or any combinations thereof. In some examples, the uplink channel occupancy signal is a sounding reference signal.

In some examples, the channel reservation signal manager 1545 is capable of, configured to, or operable to support a means for transmitting, subsequent to transmitting the first uplink dynamic grant and responsive to a successful listen-before-talk procedure for the second portion of the shared radio frequency spectrum band, a downlink channel reservation signal that indicates the network entity will use the second portion of the shared radio frequency spectrum band to transmit the downlink transmission. In some examples, the downlink channel reservation signal is a clear-to-send (CTS) signal that is broadcast using the second portion of the shared radio frequency spectrum band.

In some examples, the channel reservation signal manager 1545 is capable of, configured to, or operable to support a means for monitoring, prior to transmitting the downlink dynamic grant, for an uplink channel reservation signal from the uplink UE that indicates the UE will use the first portion of the shared radio frequency spectrum band to transmit the first uplink transmission, and where the monitoring for the first uplink transmission is responsive to the uplink channel reservation signal. In some examples, the uplink channel reservation signal is received in a slot after transmission of the first uplink dynamic grant.

In some examples, the uplink UE is a first uplink UE and the uplink transmission resources are first uplink transmission resources, and the uplink grant manager 1525 is capable of, configured to, or operable to support a means for transmitting, to a second uplink UE responsive to a failure to detect the uplink channel reservation signal, a second uplink dynamic grant for a second uplink transmission of the second uplink UE, the second uplink dynamic grant transmitted subsequent to a time at which the uplink channel occupancy signal is configured to be transmitted by the first uplink UE, and where the second uplink dynamic grant indicates second uplink transmission resources that start subsequent to the first uplink transmission resources.

In some examples, to support transmitting the downlink dynamic grant, the downlink grant manager 1530 is capable of, configured to, or operable to support a means for transmitting, to a first downlink UE responsive to a failure to detect the uplink channel reservation signal, a first downlink dynamic grant for a first downlink transmission to the first downlink UE. In some examples, to support transmitting the downlink dynamic grant, the full-duplex communications manager 1535 is capable of, configured to, or operable to support a means for disabling one or more receive components associated with receiving the first uplink transmission.

In some examples, to support transmitting the downlink dynamic grant, the downlink grant manager 1530 is capable of, configured to, or operable to support a means for transmitting, to a first downlink UE responsive to a failure to detect the uplink channel reservation signal, a first downlink dynamic grant for a first downlink transmission to the first downlink UE, the first downlink dynamic grant indicating resources for both the first portion of a shared radio frequency spectrum band and the second portion of a shared radio frequency spectrum band.

In some examples, the first uplink dynamic grant indicates that the first uplink transmission is to be started using one or more parameters associated with a full-duplex communication procedure. In some examples, the first uplink dynamic grant includes a beam indication for a transmission beam for the first uplink transmission that is associated with a full-duplex communication procedure. In some examples, the downlink dynamic grant includes a beam indication for a transmission beam for the downlink transmission that is associated with a full-duplex communication procedure.

Figure 16:
FIG. 16 shows a diagram of a system including a device that supports techniques for full-duplex channel access in shared radio frequency spectrum in accordance with one or more aspects of the present disclosure.

FIG. 16 shows a diagram of a system 1600 including a device 1605 that supports techniques for full-duplex channel access in shared radio frequency spectrum in accordance with one or more aspects of the present disclosure. The device 1605 may be an example of or include the components of a device 1305, a device 1405, or a network entity 105 as described herein. The device 1605 may communicate with one or more network entities 105, one or more UEs 115, or any combination thereof, which may include communications over one or more wired interfaces, over one or more wireless interfaces, or any combination thereof. The device 1605 may include components that support outputting and obtaining communications, such as a communications manager 1620, a transceiver 1610, an antenna 1615, at least one memory 1625, code 1630, and at least one processor 1635. These components may be in electronic communication or otherwise coupled (e.g., operatively, communicatively, functionally, electronically, electrically) via one or more buses (e.g., a bus 1640).

The transceiver 1610 may support bi-directional communications via wired links, wireless links, or both as described herein. In some examples, the transceiver 1610 may include a wired transceiver and may communicate bi-directionally with another wired transceiver. Additionally, or alternatively, in some examples, the transceiver 1610 may include a wireless transceiver and may communicate bi-directionally with another wireless transceiver. In some examples, the device 1605 may include one or more antennas 1615, which may be capable of transmitting or receiving wireless transmissions (e.g., concurrently). The transceiver 1610 may also include a modem to modulate signals, to provide the modulated signals for transmission (e.g., by one or more antennas 1615, by a wired transmitter), to receive modulated signals (e.g., from one or more antennas 1615, from a wired receiver), and to demodulate signals. In some implementations, the transceiver 1610 may include one or more interfaces, such as one or more interfaces coupled with the one or more antennas 1615 that are configured to support various receiving or obtaining operations, or one or more interfaces coupled with the one or more antennas 1615 that are configured to support various transmitting or outputting operations, or a combination thereof. In some implementations, the transceiver 1610 may include or be configured for coupling with one or more processors or one or more memory components that are operable to perform or support operations based on received or obtained information or signals, or to generate information or other signals for transmission or other outputting, or any combination thereof. In some implementations, the transceiver 1610, or the transceiver 1610 and the one or more antennas 1615, or the transceiver 1610 and the one or more antennas 1615 and one or more processors or one or more memory components (e.g., the at least one processor 1635, the at least one memory 1625, or both), may be included in a chip or chip assembly that is installed in the device 1605. In some examples, the transceiver 1610 may be operable to support communications via one or more communications links (e.g., a communication link 125, a backhaul communication link 120, a midhaul communication link 162, a fronthaul communication link 168).

The at least one memory 1625 may include RAM, ROM, or any combination thereof. The at least one memory 1625 may store computer-readable, computer-executable code 1630 including instructions that, when executed by one or more of the at least one processor 1635, cause the device 1605 to perform various functions described herein. The code 1630 may be stored in a non-transitory computer-readable medium such as system memory or another type of memory. In some cases, the code 1630 may not be directly executable by a processor of the at least one processor 1635 but may cause a computer (e.g., when compiled and executed) to perform functions described herein. In some cases, the at least one memory 1625 may contain, among other things, a BIOS which may control basic hardware or software operation such as the interaction with peripheral components or devices. In some examples, the at least one processor 1635 may include multiple processors and the at least one memory 1625 may include multiple memories. One or more of the multiple processors may be coupled with one or more of the multiple memories which may, individually or collectively, be configured to perform various functions herein (for example, as part of a processing system).

The at least one processor 1635 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1635 may be configured to operate a memory array using a memory controller. In some other cases, a memory controller may be integrated into one or more of the at least one processor 1635. The at least one processor 1635 may be configured to execute computer-readable instructions stored in a memory (e.g., one or more of the at least one memory 1625) to cause the device 1605 to perform various functions (e.g., functions or tasks supporting techniques for full-duplex channel access in shared radio frequency spectrum). For example, the device 1605 or a component of the device 1605 may include at least one processor 1635 and at least one memory 1625 coupled with one or more of the at least one processor 1635, the at least one processor 1635 and the at least one memory 1625 configured to perform various functions described herein. The at least one processor 1635 may be an example of a cloud-computing platform (e.g., one or more physical nodes and supporting software such as operating systems, virtual machines, or container instances) that may host the functions (e.g., by executing code 1630) to perform the functions of the device 1605. The at least one processor 1635 may be any one or more suitable processors capable of executing scripts or instructions of one or more software programs stored in the device 1605 (such as within one or more of the at least one memory 1625). In some examples, the at least one processor 1635 may include multiple processors and the at least one memory 1625 may include multiple memories. One or more of the multiple processors may be coupled with one or more of the multiple memories, which may, individually or collectively, be configured to perform various functions herein. In some examples, the at least one processor 1635 may be a component of a processing system, which may refer to a system (such as a series) of machines, circuitry (including, for example, one or both of processor circuitry (which may include the at least one processor 1635) and memory circuitry (which may include the at least one memory 1625)), or components, that receives or obtains inputs and processes the inputs to produce, generate, or obtain a set of outputs. The processing system may be configured to perform one or more of the functions described herein. As such, the at least one processor 1635 or a processing system including the at least one processor 1635 may be configured to, configurable to, or operable to cause the device 1605 to perform one or more of the functions described herein. Further, as described herein, being "configured to," being "configurable to," and being "operable to" may be used interchangeably and may be associated with a capability, when executing code stored in the at least one memory 1625 or otherwise, to perform one or more of the functions described herein.

In some examples, a bus 1640 may support communications of (e.g., within) a protocol layer of a protocol stack. In some examples, a bus 1640 may support communications associated with a logical channel of a protocol stack (e.g., between protocol layers of a protocol stack), which may include communications performed within a component of the device 1605, or between different components of the device 1605 that may be co-located or located in different locations (e.g., where the device 1605 may refer to a system in which one or more of the communications manager 1620, the transceiver 1610, the at least one memory 1625, the code 1630, and the at least one processor 1635 may be located in one of the different components or divided between different components).

In some examples, the communications manager 1620 may manage aspects of communications with a core network 130 (e.g., via one or more wired or wireless backhaul links). For example, the communications manager 1620 may manage the transfer of data communications for client devices, such as one or more UEs 115. In some examples, the communications manager 1620 may manage communications with other network entities 105, and may include a controller or scheduler for controlling communications with UEs 115 in cooperation with other network entities 105. In some examples, the communications manager 1620 may support an X2 interface within an LTE/LTE-A wireless communications network technology to provide communication between network entities 105.

The communications manager 1620 may support wireless communication in accordance with examples as disclosed herein. For example, the communications manager 1620 is capable of, configured to, or operable to support a means for transmitting, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band. The communications manager 1620 is capable of, configured to, or operable to support a means for transmitting a downlink dynamic grant for the downlink transmission to the downlink UE, where the downlink dynamic grant indicates downlink transmission resources in a second portion of the shared radio frequency spectrum band. The communications manager 1620 is capable of, configured to, or operable to support a means for monitoring for the first uplink transmission using the first portion of the shared radio frequency spectrum band while transmitting the downlink transmission to the downlink UE using the second portion of the shared radio frequency spectrum band.

By including or configuring the communications manager 1620 in accordance with examples as described herein, the device 1605 may support techniques for full-duplex communications in shared radio frequency spectrum. Such techniques may help to enhance reliability and scheduling flexibility of transmissions in full-duplex communications (e.g., to allow a network entity to schedule other UEs in the event of an LBT failure). Such techniques thus enhance network efficiency, enhance reliability, reduce latency, enhance throughput, and provide for enhanced user experience.

In some examples, the communications manager 1620 may be configured to perform various operations (e.g., receiving, obtaining, monitoring, outputting, transmitting) using or otherwise in cooperation with the transceiver 1610, the one or more antennas 1615 (e.g., where applicable), or any combination thereof. Although the communications manager 1620 is illustrated as a separate component, in some examples, one or more functions described with reference to the communications manager 1620 may be supported by or performed by the transceiver 1610, one or more of the at least one processor 1635, one or more of the at least one memory 1625, the code 1630, or any combination thereof (for example, by a processing system including at least a portion of the at least one processor 1635, the at least one memory 1625, the code 1630, or any combination thereof). For example, the code 1630 may include instructions executable by one or more of the at least one processor 1635 to cause the device 1605 to perform various aspects of techniques for full-duplex channel access in shared radio frequency spectrum as described herein, or the at least one processor 1635 and the at least one memory 1625 may be otherwise configured to, individually or collectively, perform or support such operations.

FIG. 17 shows a flowchart illustrating a method 1700 that supports techniques for full-duplex channel access in shared radio frequency spectrum in accordance with aspects of the present disclosure. The operations of the method 1700 may be implemented by a UE or its components as described herein. For example, the operations of the method 1700 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1705, the method may include receiving, from a network entity, a dynamic grant for an uplink transmission to be transmitted contemporaneously with a downlink transmission from the network entity, the dynamic grant indicating transmission resources in a first portion of a shared radio frequency spectrum band for the uplink transmission, and downlink transmission from the network entity uses a second portion of the shared radio frequency spectrum band. The operations of block 1705 may be performed in accordance with examples as disclosed herein. In some examples, aspects of the operations of 1705 may be performed by an uplink grant manager 1125 as described with reference to FIG. 11.

At 1710, the method may include performing a listen-before-talk procedure for the first portion of the shared radio frequency spectrum band. The operations of block 1710 may be performed in accordance with examples as disclosed herein. In some examples, aspects of the operations of 1710 may be performed by an LBT manager 1130 as described with reference to FIG. 11.

At 1715, the method may include transmitting or refraining from transmitting the uplink transmission based on the listen-before-talk procedure indicating whether the first portion of the shared radio frequency spectrum band is available for the uplink transmission. The operations of block 1715 may be performed in accordance with examples as disclosed herein. In some examples, aspects of the operations of 1715 may be performed by an uplink transmission manager 1135 as described with reference to FIG. 11.

FIG. 18 shows a flowchart illustrating a method 1800 that supports techniques for full-duplex channel access in shared radio frequency spectrum in accordance with aspects of the present disclosure. The operations of the method 1800 may be implemented by a UE or its components as described herein. For example, the operations of the method 1800 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1805, the method may include receiving, from a network entity, a dynamic grant for an uplink transmission to be transmitted contemporaneously with a downlink transmission from the network entity, the dynamic grant indicating transmission resources in a first portion of a shared radio frequency spectrum band for the uplink transmission, and downlink transmission from the network entity uses a second portion of the shared radio frequency spectrum band. The operations of block 1805 may be performed in accordance with examples as disclosed herein. In some examples, aspects of the operations of 1805 may be performed by an uplink grant manager 1125 as described with reference to FIG. 11.

At 1810, the method may include performing a listen-before-talk procedure for the first portion of the shared radio frequency spectrum band. The operations of block 1810 may be performed in accordance with examples as disclosed herein. In some examples, aspects of the operations of 1810 may be performed by an LBT manager 1130 as described with reference to FIG. 11.

At 1815, the method may include transmitting, responsive to the listen-before-talk procedure indicating that the first portion of the shared radio frequency spectrum band is available for the uplink transmission, an indication to the network entity that the uplink transmission will be transmitted by the UE. The operations of block 1815 may be performed in accordance with examples as disclosed herein. In some examples, aspects of the operations of 1815 may be performed by a transmission confirmation manager 1150 as described with reference to FIG. 11.

At 1820, the method may include transmitting the uplink transmission. The operations of block 1820 may be performed in accordance with examples as disclosed herein. In some examples, aspects of the operations of 1820 may be performed by an uplink transmission manager 1135 as described with reference to FIG. 11.

FIG. 19 shows a flowchart illustrating a method 1900 that supports techniques for full-duplex channel access in shared radio frequency spectrum in accordance with aspects of the present disclosure. The operations of the method 1900 may be implemented by a UE or its components as described herein. For example, the operations of the method 1900 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 1905, the method may include receiving, from a network entity, a dynamic grant for an uplink transmission to be transmitted contemporaneously with a downlink transmission from the network entity, the dynamic grant indicating transmission resources in a first portion of a shared radio frequency spectrum band for the uplink transmission, and downlink transmission from the network entity uses a second portion of the shared radio frequency spectrum band. The operations of block 1905 may be performed in accordance with examples as disclosed herein. In some examples, aspects of the operations of 1905 may be performed by an uplink grant manager 1125 as described with reference to FIG. 11.

At 1910, the method may include performing a listen-before-talk procedure for the first portion of the shared radio frequency spectrum band. The operations of block 1910 may be performed in accordance with examples as disclosed herein. In some examples, aspects of the operations of 1910 may be performed by an LBT manager 1130 as described with reference to FIG. 11.

At 1915, the method may include transmitting, responsive to the listen-before-talk procedure indicating that the first portion of the shared radio frequency spectrum band is available for the uplink transmission, a channel occupancy signal starting upon conclusion of the listen-before-talk procedure and ending at the second time. The operations of block 1915 may be performed in accordance with examples as disclosed herein. In some examples, aspects of the operations of 1915 may be performed by a channel occupancy signal manager 1155 as described with reference to FIG. 11.

At 1920, the method may include transmitting the uplink transmission subsequent to the channel occupancy signal. The operations of block 1920 may be performed in accordance with examples as disclosed herein. In some examples, aspects of the operations of 1920 may be performed by an uplink transmission manager 1135 as described with reference to FIG. 11.

FIG. 20 shows a flowchart illustrating a method 2000 that supports techniques for full-duplex channel access in shared radio frequency spectrum in accordance with aspects of the present disclosure. The operations of the method 2000 may be implemented by a UE or its components as described herein. For example, the operations of the method 2000 may be performed by a UE 115 as described with reference to FIGS. 1 through 12. In some examples, a UE may execute a set of instructions to control the functional elements of the UE to perform the described functions. Additionally, or alternatively, the UE may perform aspects of the described functions using special-purpose hardware.

At 2005, the method may include receiving, from a network entity, a dynamic grant for an uplink transmission to be transmitted contemporaneously with a downlink transmission from the network entity, the dynamic grant indicating transmission resources in a first portion of a shared radio frequency spectrum band for the uplink transmission, and downlink transmission from the network entity uses a second portion of the shared radio frequency spectrum band. The operations of block 2005 may be performed in accordance with examples as disclosed herein. In some examples, aspects of the operations of 2005 may be performed by an uplink grant manager 1125 as described with reference to FIG. 11.

At 2010, the method may include performing a listen-before-talk procedure for the first portion of the shared radio frequency spectrum band. The operations of block 2010 may be performed in accordance with examples as disclosed herein. In some examples, aspects of the operations of 2010 may be performed by an LBT manager 1130 as described with reference to FIG. 11.

At 2015, the method may include transmitting, responsive to the listen-before-talk procedure indicating that the first portion of the shared radio frequency spectrum band is available for the uplink transmission, a channel reservation indication that the UE will use the first portion of the shared radio frequency spectrum band to transmit the uplink transmission. The operations of block 2015 may be performed in accordance with examples as disclosed herein. In some examples, aspects of the operations of 2015 may be performed by a channel reservation signal manager 1160 as described with reference to FIG. 11.

At 2020, the method may include transmitting the uplink transmission subsequent to the channel reservation indication. The operations of block 2020 may be performed in accordance with examples as disclosed herein. In some examples, aspects of the operations of 2020 may be performed by an uplink transmission manager 1135 as described with reference to FIG. 11.

FIG. 21 shows a flowchart illustrating a method 2100 that supports techniques for full-duplex channel access in shared radio frequency spectrum in accordance with aspects of the present disclosure. The operations of the method 2100 may be implemented by a network entity or its components as described herein. For example, the operations of the method 2100 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2105, the method may include transmitting, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band. The operations of block 2105 may be performed in accordance with examples as disclosed herein. In some examples, aspects of the operations of 2105 may be performed by an uplink grant manager 1525 as described with reference to FIG. 15.

At 2110, the method may include transmitting a downlink dynamic grant for the downlink transmission to the downlink UE, where the downlink dynamic grant indicates downlink transmission resources in a second portion of the shared radio frequency spectrum band. The operations of block 2110 may be performed in accordance with examples as disclosed herein. In some examples, aspects of the operations of 2110 may be performed by a downlink grant manager 1530 as described with reference to FIG. 15.

At 2115, the method may include monitoring for the first uplink transmission using the first portion of the shared radio frequency spectrum band while transmitting the downlink transmission to the downlink UE using the second portion of the shared radio frequency spectrum band. The operations of block 2115 may be performed in accordance with examples as disclosed herein. In some examples, aspects of the operations of 2115 may be performed by a full-duplex communications manager 1535 as described with reference to FIG. 15.

FIG. 22 shows a flowchart illustrating a method 2200 that supports techniques for full-duplex channel access in shared radio frequency spectrum in accordance with aspects of the present disclosure. The operations of the method 2200 may be implemented by a network entity or its components as described herein. For example, the operations of the method 2200 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2205, the method may include transmitting, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band. The operations of block 2205 may be performed in accordance with examples as disclosed herein. In some examples, aspects of the operations of 2205 may be performed by an uplink grant manager 1525 as described with reference to FIG. 15.

At 2210, the method may include receiving, from the uplink UE, an indication that the first uplink transmission will be transmitted by the UE. The operations of block 2210 may be performed in accordance with examples as disclosed herein. In some examples, aspects of the operations of 2210 may be performed by an uplink grant manager 1525 as described with reference to FIG. 15.

At 2215, the method may include transmitting a downlink dynamic grant for the downlink transmission to the downlink UE, where the downlink dynamic grant indicates downlink transmission resources in a second portion of the shared radio frequency spectrum band. The operations of block 2215 may be performed in accordance with examples as disclosed herein. In some examples, aspects of the operations of 2215 may be performed by a downlink grant manager 1530 as described with reference to FIG. 15.

At 2220, the method may include monitoring for the first uplink transmission using the first portion of the shared radio frequency spectrum band while transmitting the downlink transmission to the downlink UE using the second portion of the shared radio frequency spectrum band. The operations of block 2220 may be performed in accordance with examples as disclosed herein. In some examples, aspects of the operations of 2220 may be performed by a full-duplex communications manager 1535 as described with reference to FIG. 15.

FIG. 23 shows a flowchart illustrating a method 2300 that supports techniques for full-duplex channel access in shared radio frequency spectrum in accordance with aspects of the present disclosure. The operations of the method 2300 may be implemented by a network entity or its components as described herein. For example, the operations of the method 2300 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2305, the method may include transmitting, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band. The operations of block 2305 may be performed in accordance with examples as disclosed herein. In some examples, aspects of the operations of 2305 may be performed by an uplink grant manager 1525 as described with reference to FIG. 15.

At 2310, the method may include transmitting, responsive to transmission of the first uplink dynamic grant, a downlink channel occupancy signal, the downlink channel occupancy signal transmission starting upon conclusion of the transmission of the first uplink dynamic grant or starting upon expiration of a maximum gap that other devices may occupy on the shared radio frequency spectrum band, and ending at the second time. The operations of block 2310 may be performed in accordance with examples as disclosed herein. In some examples, aspects of the operations of 2310 may be performed by a channel occupancy signal manager 1540 as described with reference to FIG. 15.

At 2315, the method may include transmitting a downlink dynamic grant for the downlink transmission to the downlink UE, where the downlink dynamic grant indicates downlink transmission resources in a second portion of the shared radio frequency spectrum band. The operations of block 2315 may be performed in accordance with examples as disclosed herein. In some examples, aspects of the operations of 2315 may be performed by a downlink grant manager 1530 as described with reference to FIG. 15.

At 2320, the method may include monitoring for the first uplink transmission using the first portion of the shared radio frequency spectrum band while transmitting the downlink transmission to the downlink UE using the second portion of the shared radio frequency spectrum band. The operations of block 2320 may be performed in accordance with examples as disclosed herein. In some examples, aspects of the operations of 2320 may be performed by a full-duplex communications manager 1535 as described with reference to FIG. 15.

FIG. 24 shows a flowchart illustrating a method 2400 that supports techniques for full-duplex channel access in shared radio frequency spectrum in accordance with aspects of the present disclosure. The operations of the method 2400 may be implemented by a network entity or its components as described herein. For example, the operations of the method 2400 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2405, the method may include transmitting, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band. The operations of block 2405 may be performed in accordance with examples as disclosed herein. In some examples, aspects of the operations of 2405 may be performed by an uplink grant manager 1525 as described with reference to FIG. 15.

At 2410, the method may include monitoring, prior to transmitting the downlink dynamic grant, for an uplink channel occupancy signal from the uplink UE. The operations of block 2410 may be performed in accordance with examples as disclosed herein. In some examples, aspects of the operations of 2410 may be performed by a channel occupancy signal manager 1540 as described with reference to FIG. 15.

At 2415, the method may include transmitting, to a second uplink UE responsive to a failure to detect the uplink channel occupancy signal, a second uplink dynamic grant for a second uplink transmission of the second uplink UE, the second uplink dynamic grant transmitted subsequent to a time at which the uplink channel occupancy signal is configured to be transmitted by the first uplink UE, and where the second uplink dynamic grant indicates second uplink transmission resources that start subsequent to the first uplink transmission resources. The operations of block 2415 may be performed in accordance with examples as disclosed herein. In some examples, aspects of the operations of 2415 may be performed by an uplink grant manager 1525 as described with reference to FIG. 15.

At 2420, the method may include transmitting, to a first downlink UE responsive to detecting the uplink channel occupancy signal, a first downlink dynamic grant for a first downlink transmission to the first downlink UE. The operations of block 2420 may be performed in accordance with examples as disclosed herein. In some examples, aspects of the operations of 2420 may be performed by a downlink grant manager 1530 as described with reference to FIG. 15.

At 2425, the method may include monitoring for the first uplink transmission using the first portion of the shared radio frequency spectrum band while transmitting the downlink transmission to the downlink UE using the second portion of the shared radio frequency spectrum band. The operations of block 2425 may be performed in accordance with examples as disclosed herein. In some examples, aspects of the operations of 2425 may be performed by a full-duplex communications manager 1535 as described with reference to FIG. 15.

FIG. 25 shows a flowchart illustrating a method 2500 that supports techniques for full-duplex channel access in shared radio frequency spectrum in accordance with aspects of the present disclosure. The operations of the method 2500 may be implemented by a network entity or its components as described herein. For example, the operations of the method 2500 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2505, the method may include transmitting, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band. The operations of block 2505 may be performed in accordance with examples as disclosed herein. In some examples, aspects of the operations of 2505 may be performed by an uplink grant manager 1525 as described with reference to FIG. 15.

At 2510, the method may include monitoring for an uplink channel occupancy signal from the uplink UE. The operations of block 2510 may be performed in accordance with examples as disclosed herein. In some examples, aspects of the operations of 2510 may be performed by a channel occupancy signal manager 1540 as described with reference to FIG. 15.

At 2515, the method may include transmitting, to a first downlink UE responsive to a failure to detect the uplink channel occupancy signal, a first downlink dynamic grant for a first downlink transmission to the first downlink UE. The operations of block 2515 may be performed in accordance with examples as disclosed herein. In some examples, aspects of the operations of 2515 may be performed by a downlink grant manager 1530 as described with reference to FIG. 15.

At 2520, the method may include disabling one or more receive components associated with receiving the first uplink transmission. The operations of block 2520 may be performed in accordance with examples as disclosed herein. In some examples, aspects of the operations of 2520 may be performed by a full-duplex communications manager 1535 as described with reference to FIG. 15.

At 2525, the method may include transmitting the downlink transmission to the downlink UE using the second portion of the shared radio frequency spectrum band. The operations of block 2525 may be performed in accordance with examples as disclosed herein. In some examples, aspects of the operations of 2525 may be performed by a full-duplex communications manager 1535 as described with reference to FIG. 15.

FIG. 26 shows a flowchart illustrating a method 2600 that supports techniques for full-duplex channel access in shared radio frequency spectrum in accordance with aspects of the present disclosure. The operations of the method 2600 may be implemented by a network entity or its components as described herein. For example, the operations of the method 2600 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2605, the method may include transmitting, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band. The operations of block 2605 may be performed in accordance with examples as disclosed herein. In some examples, aspects of the operations of 2605 may be performed by an uplink grant manager 1525 as described with reference to FIG. 15.

At 2610, the method may include monitoring, prior to transmitting the downlink dynamic grant, for an uplink channel occupancy signal from the uplink UE. The operations of block 2610 may be performed in accordance with examples as disclosed herein. In some examples, aspects of the operations of 2610 may be performed by a channel occupancy signal manager 1540 as described with reference to FIG. 15.

At 2615, the method may include transmitting, to a first downlink UE responsive to a failure to detect the uplink channel occupancy signal, a first downlink dynamic grant for a first downlink transmission to the first downlink UE, the first downlink dynamic grant indicating resources for both the first portion of a shared radio frequency spectrum band and the second portion of a shared radio frequency spectrum band. The operations of block 2615 may be performed in accordance with examples as disclosed herein. In some examples, aspects of the operations of 2615 may be performed by a downlink grant manager 1530 as described with reference to FIG. 15.

At 2620, the method may include transmitting the downlink transmission to the downlink UE using the first portion and the second portion of the shared radio frequency spectrum band. The operations of block 2620 may be performed in accordance with examples as disclosed herein. In some examples, aspects of the operations of 2620 may be performed by a full-duplex communications manager 1535 as described with reference to FIG. 15.

FIG. 27 shows a flowchart illustrating a method 2700 that supports techniques for full-duplex channel access in shared radio frequency spectrum in accordance with aspects of the present disclosure. The operations of the method 2700 may be implemented by a network entity or its components as described herein. For example, the operations of the method 2700 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2705, the method may include transmitting, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band. The operations of block 2705 may be performed in accordance with examples as disclosed herein. In some examples, aspects of the operations of 2705 may be performed by an uplink grant manager 1525 as described with reference to FIG. 15.

At 2710, the method may include transmitting, subsequent to transmitting the first uplink dynamic grant and responsive to a successful listen-before-talk procedure for the second portion of the shared radio frequency spectrum band, a downlink channel reservation signal that indicates the network entity will use the second portion of the shared radio frequency spectrum band to transmit the downlink transmission. The operations of block 2710 may be performed in accordance with examples as disclosed herein. In some examples, aspects of the operations of 2710 may be performed by a channel reservation signal manager 1545 as described with reference to FIG. 15.

At 2715, the method may include transmitting a downlink dynamic grant for the downlink transmission to the downlink UE, where the downlink dynamic grant indicates downlink transmission resources in a second portion of the shared radio frequency spectrum band. The operations of block 2715 may be performed in accordance with examples as disclosed herein. In some examples, aspects of the operations of 2715 may be performed by a downlink grant manager 1530 as described with reference to FIG. 15.

At 2720, the method may include monitoring for the first uplink transmission using the first portion of the shared radio frequency spectrum band while transmitting the downlink transmission to the downlink UE using the second portion of the shared radio frequency spectrum band. The operations of block 2720 may be performed in accordance with examples as disclosed herein. In some examples, aspects of the operations of 2720 may be performed by a full-duplex communications manager 1535 as described with reference to FIG. 15.

FIG. 28 shows a flowchart illustrating a method 2800 that supports techniques for full-duplex channel access in shared radio frequency spectrum in accordance with aspects of the present disclosure. The operations of the method 2800 may be implemented by a network entity or its components as described herein. For example, the operations of the method 2800 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2805, the method may include transmitting, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band. The operations of block 2805 may be performed in accordance with examples as disclosed herein. In some examples, aspects of the operations of 2805 may be performed by an uplink grant manager 1525 as described with reference to FIG. 15.

At 2810, the method may include monitoring for an uplink channel reservation signal from the uplink UE that indicates the UE will use the first portion of the shared radio frequency spectrum band to transmit the first uplink transmission. The operations of block 2810 may be performed in accordance with examples as disclosed herein. In some examples, aspects of the operations of 2810 may be performed by a channel reservation signal manager 1545 as described with reference to FIG. 15.

At 2815, the method may include transmitting a downlink dynamic grant for the downlink transmission to the downlink UE, where the downlink dynamic grant indicates downlink transmission resources in a second portion of the shared radio frequency spectrum band. The operations of block 2815 may be performed in accordance with examples as disclosed herein. In some examples, aspects of the operations of 2815 may be performed by a downlink grant manager 1530 as described with reference to FIG. 15.

At 2820, the method may include monitoring for the first uplink transmission using the first portion of the shared radio frequency spectrum band while transmitting the downlink transmission to the downlink UE using the second portion of the shared radio frequency spectrum band. The operations of block 2820 may be performed in accordance with examples as disclosed herein. In some examples, aspects of the operations of 2820 may be performed by a full-duplex communications manager 1535 as described with reference to FIG. 15.

FIG. 29 shows a flowchart illustrating a method 2900 that supports techniques for full-duplex channel access in shared radio frequency spectrum in accordance with aspects of the present disclosure. The operations of the method 2900 may be implemented by a network entity or its components as described herein. For example, the operations of the method 2900 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 2905, the method may include transmitting, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band. The operations of block 2905 may be performed in accordance with examples as disclosed herein. In some examples, aspects of the operations of 2905 may be performed by an uplink grant manager 1525 as described with reference to FIG. 15.

At 2910, the method may include monitoring for an uplink channel reservation signal from the uplink UE that indicates the UE will use the first portion of the shared radio frequency spectrum band to transmit the first uplink transmission. The operations of block 2910 may be performed in accordance with examples as disclosed herein. In some examples, aspects of the operations of 2910 may be performed by a channel reservation signal manager 1545 as described with reference to FIG. 15.

At 2915, the method may include transmitting, to a second uplink UE responsive to a failure to detect the uplink channel reservation signal, a second uplink dynamic grant for a second uplink transmission of the second uplink UE, and the second uplink dynamic grant indicates second uplink transmission resources that start subsequent to the first uplink transmission resources. The operations of block 2915 may be performed in accordance with examples as disclosed herein. In some examples, aspects of the operations of 2915 may be performed by an uplink grant manager 1525 as described with reference to FIG. 15.

At 2920, the method may include transmitting a downlink dynamic grant for the downlink transmission to the downlink UE, where the downlink dynamic grant indicates downlink transmission resources in a second portion of the shared radio frequency spectrum band. The operations of block 2920 may be performed in accordance with examples as disclosed herein. In some examples, aspects of the operations of 2920 may be performed by a downlink grant manager 1530 as described with reference to FIG. 15.

At 2925, the method may include monitoring for the second uplink transmission using the first portion of the shared radio frequency spectrum band while transmitting the downlink transmission to the downlink UE using the second portion of the shared radio frequency spectrum band. The operations of block 2925 may be performed in accordance with examples as disclosed herein. In some examples, aspects of the operations of 2925 may be performed by a full-duplex communications manager 1535 as described with reference to FIG. 15.

FIG. 30 shows a flowchart illustrating a method 3000 that supports techniques for full-duplex channel access in shared radio frequency spectrum in accordance with aspects of the present disclosure. The operations of the method 3000 may be implemented by a network entity or its components as described herein. For example, the operations of the method 3000 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 3005, the method may include transmitting, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band. The operations of block 3005 may be performed in accordance with examples as disclosed herein. In some examples, aspects of the operations of 3005 may be performed by an uplink grant manager 1525 as described with reference to FIG. 15.

At 3010, the method may include monitoring for an uplink channel reservation signal from the uplink UE that indicates the UE will use the first portion of the shared radio frequency spectrum band to transmit the first uplink transmission. The operations of block 3010 may be performed in accordance with examples as disclosed herein. In some examples, aspects of the operations of 3010 may be performed by a channel reservation signal manager 1545 as described with reference to FIG. 15.

At 3015, the method may include transmitting, to a first downlink UE responsive to a failure to detect the uplink channel reservation signal, a first downlink dynamic grant for a first downlink transmission to the first downlink UE. The operations of block 3015 may be performed in accordance with examples as disclosed herein. In some examples, aspects of the operations of 3015 may be performed by a downlink grant manager 1530 as described with reference to FIG. 15.

At 3020, the method may include disabling one or more receive components associated with receiving the first uplink transmission. The operations of block 3020 may be performed in accordance with examples as disclosed herein. In some examples, aspects of the operations of 3020 may be performed by a full-duplex communications manager 1535 as described with reference to FIG. 15.

At 3025, the method may include transmitting the downlink transmission to the downlink UE using the second portion of the shared radio frequency spectrum band. The operations of block 3025 may be performed in accordance with examples as disclosed herein. In some examples, aspects of the operations of 3025 may be performed by a full-duplex communications manager 1535 as described with reference to FIG. 15.

FIG. 31 shows a flowchart illustrating a method 3100 that supports techniques for full-duplex channel access in shared radio frequency spectrum in accordance with aspects of the present disclosure. The operations of the method 3100 may be implemented by a network entity or its components as described herein. For example, the operations of the method 3100 may be performed by a network entity as described with reference to FIGS. 1 through 8 and 13 through 16. In some examples, a network entity may execute a set of instructions to control the functional elements of the network entity to perform the described functions. Additionally, or alternatively, the network entity may perform aspects of the described functions using special-purpose hardware.

At 3105, the method may include transmitting, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, where the first uplink dynamic grant is transmitted to an uplink UE and indicates uplink transmission resources in a first portion of the shared radio frequency spectrum band. The operations of block 3105 may be performed in accordance with examples as disclosed herein. In some examples, aspects of the operations of 3105 may be performed by an uplink grant manager 1525 as described with reference to FIG. 15.

At 3110, the method may include monitoring for an uplink channel reservation signal from the uplink UE that indicates the UE will use the first portion of the shared radio frequency spectrum band to transmit the first uplink transmission. The operations of block 3110 may be performed in accordance with examples as disclosed herein. In some examples, aspects of the operations of 3110 may be performed by a channel reservation signal manager 1545 as described with reference to FIG. 15.

At 3115, the method may include transmitting, to a first downlink UE responsive to a failure to detect the uplink channel reservation signal, a first downlink dynamic grant for a first downlink transmission to the first downlink UE, the first downlink dynamic grant indicating resources for both the first portion of a shared radio frequency spectrum band and the second portion of a shared radio frequency spectrum band. The operations of block 3115 may be performed in accordance with examples as disclosed herein. In some examples, aspects of the operations of 3115 may be performed by a downlink grant manager 1530 as described with reference to FIG. 15.

At 3120, the method may include transmitting the downlink transmission to the downlink UE using the first portion and the second portion of the shared radio frequency spectrum band. The operations of block 3120 may be performed in accordance with examples as disclosed herein. In some examples, aspects of the operations of 3120 may be performed by a full-duplex communications manager 1535 as described with reference to FIG. 15.

The following provides an overview of aspects of the present disclosure:

Aspect 1: A method for wireless communication at a UE, comprising: receiving, from a network entity, a dynamic grant for an uplink transmission to be transmitted contemporaneously with a downlink transmission from the network entity, the dynamic grant indicating transmission resources in a first portion of a shared radio frequency spectrum band for the uplink transmission, and downlink transmission from the network entity uses a second portion of the shared radio frequency spectrum band; performing a listen-before-talk procedure for the first portion of the shared radio frequency spectrum band; and transmitting or refraining from transmitting the uplink transmission based at least in part on the listen-before-talk procedure indicating whether the first portion of the shared radio frequency spectrum band is available for the uplink transmission.

Aspect 2: The method of aspect 1, further comprising: transmitting, responsive to the listen-before-talk procedure indicating that the first portion of the shared radio frequency spectrum band is available for the uplink transmission, an indication to the network entity that the uplink transmission will be transmitted by the UE.

Aspect 3: The method of any of aspects 1 through 2, wherein communications with the network entity are performed according to a full-duplex communication procedure at the network entity that is initiated responsive to the network entity obtaining at least the second portion of the shared radio frequency spectrum band for a channel occupancy time, and the first portion of the shared radio frequency spectrum band and the second portion of the shared radio frequency spectrum band occupy non-overlapping frequency resources of the shared radio frequency spectrum band, partially overlapping frequency resources of the shared radio frequency spectrum band, or fully overlapping frequency resources of the shared radio frequency spectrum band.

Aspect 4: The method of any of aspects 1 through 3, wherein the dynamic grant for the uplink transmission is received at a first time and indicates the uplink transmission is to start at a second time, and wherein the method further comprises: transmitting, responsive to the listen-before-talk procedure indicating that the first portion of the shared radio frequency spectrum band is available for the uplink transmission, a channel occupancy signal starting upon conclusion of the listen-before-talk procedure and ending at the second time.

Aspect 5: The method of aspect 4, wherein the channel occupancy signal is a preconfigured signal, is configured by RRC signaling, is configured in an uplink scheduling control information communication, or any combinations thereof.

Aspect 6: The method of any of aspects 1 through 3, further comprising: transmitting, responsive to the listen-before-talk procedure indicating that the first portion of the shared radio frequency spectrum band is available for the uplink transmission, a channel reservation indication that the UE will use the first portion of the shared radio frequency spectrum band to transmit the uplink transmission.

Aspect 7: The method of aspect 6, wherein the channel reservation indication is a clear-to-send (CTS) signal that is broadcast using the first portion of the shared radio frequency spectrum band.

Aspect 8: The method of any of aspects 6 through 7, wherein the channel reservation indication is transmitted in a first slot after receipt of the dynamic grant.

Aspect 9: The method of any of aspects 1 through 8, wherein the dynamic grant indicates that the uplink transmission is to be started using one or more parameters associated with a full-duplex communication procedure.

Aspect 10: The method of aspect 9, wherein the dynamic grant includes a beam indication for a transmission beam for the uplink transmission that is associated with the full-duplex communication procedure.

Aspect 11: The method of any of aspects 1 through 10, wherein the shared radio frequency spectrum band is unlicensed radio frequency spectrum.

Aspect 12: A method for wireless communication at a network entity, comprising: transmitting, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink UE, wherein the first uplink dynamic grant is transmitted to an uplink UE and indicates uplink transmission resources in a first portion of the shared radio frequency spectrum band; transmitting a downlink dynamic grant for the downlink transmission to the downlink UE, wherein the downlink dynamic grant indicates downlink transmission resources in a second portion of the shared radio frequency spectrum band; and monitoring for the first uplink transmission using the first portion of the shared radio frequency spectrum band while transmitting the downlink transmission to the downlink UE using the second portion of the shared radio frequency spectrum band.

Aspect 13: The method of aspect 12, wherein communications with the downlink UE and the uplink UE are performed according to a full-duplex communication procedure at the network entity, and the first portion of the shared radio frequency spectrum band and the second portion of the shared radio frequency spectrum band occupy non-overlapping frequency resources of the shared radio frequency spectrum band, partially overlapping frequency resources of the shared radio frequency spectrum band, or fully overlapping frequency resources of the shared radio frequency spectrum band.

Aspect 14: The method of any of aspects 12 through 13, further comprising: receiving, from the uplink UE, an indication that the first uplink transmission will be transmitted by the UE.

Aspect 15: The method of any of aspects 12 through 14, wherein the first uplink dynamic grant is transmitted at a first time and indicates the first uplink transmission is to start at a second time, and wherein the method further comprises: transmitting, responsive to transmission of the first uplink dynamic grant, a downlink channel occupancy signal, the downlink channel occupancy signal transmission starting upon conclusion of the transmission of the first uplink dynamic grant or starting upon expiration of a maximum gap that other devices may occupy on the shared radio frequency spectrum band, and ending at the second time.

Aspect 16: The method of any of aspects 12 through 15, further comprising: monitoring, prior to transmitting the downlink dynamic grant, for an uplink channel occupancy signal from the uplink UE.

Aspect 17: The method of aspect 16, wherein the transmitting the downlink dynamic grant comprises: transmitting, to a first downlink UE responsive to detecting the uplink channel occupancy signal, a first downlink dynamic grant for a first downlink transmission to the first downlink UE.

Aspect 18: The method of any of aspects 16 through 17, wherein the uplink UE is a first uplink UE and the uplink transmission resources are first uplink transmission resources, and the method further comprises: transmitting, to a second uplink UE responsive to a failure to detect the uplink channel occupancy signal, a second uplink dynamic grant for a second uplink transmission of the second uplink UE, the second uplink dynamic grant transmitted subsequent to a time at which the uplink channel occupancy signal is configured to be transmitted by the first uplink UE, and wherein the second uplink dynamic grant indicates second uplink transmission resources that start subsequent to the first uplink transmission resources.

Aspect 19: The method of any of aspects 16 through 18, wherein the transmitting the downlink dynamic grant comprises: transmitting, to a first downlink UE responsive to a failure to detect the uplink channel occupancy signal, a first downlink dynamic grant for a first downlink transmission to the first downlink UE; and disabling one or more receive components associated with receiving the first uplink transmission.

Aspect 20: The method of any of aspects 16 through 19, wherein the transmitting the downlink dynamic grant comprises: transmitting, to a first downlink UE responsive to a failure to detect the uplink channel occupancy signal, a first downlink dynamic grant for a first downlink transmission to the first downlink UE, the first downlink dynamic grant indicating resources for both the first portion of a shared radio frequency spectrum band and the second portion of a shared radio frequency spectrum band.

Aspect 21: The method of any of aspects 16 through 20, wherein the uplink channel occupancy signal is a preconfigured signal, is configured by RRC signaling, is configured in an uplink scheduling control information communication, or any combinations thereof.

Aspect 22: The method of aspect 21, wherein the uplink channel occupancy signal is a sounding reference signal.

Aspect 23: The method of any of aspects 12 through 15, further comprising: transmitting, subsequent to transmitting the first uplink dynamic grant and responsive to a successful listen-before-talk procedure for the second portion of the shared radio frequency spectrum band, a downlink channel reservation signal that indicates the network entity will use the second portion of the shared radio frequency spectrum band to transmit the downlink transmission.

Aspect 24: The method of aspect 23, wherein the downlink channel reservation signal is a clear-to-send (CTS) signal that is broadcast using the second portion of the shared radio frequency spectrum band.

Aspect 25: The method of any of aspects 12 through 15, further comprising: monitoring, prior to transmitting the downlink dynamic grant, for an uplink channel reservation signal from the uplink UE that indicates the UE will use the first portion of the shared radio frequency spectrum band to transmit the first uplink transmission, and wherein the monitoring for the first uplink transmission is responsive to the uplink channel reservation signal.

Aspect 26: The method of aspect 25, wherein the uplink channel reservation signal is received in a slot after transmission of the first uplink dynamic grant.

Aspect 27: The method of any of aspects 25 through 26, wherein the uplink UE is a first uplink UE and the uplink transmission resources are first uplink transmission resources, and the method further comprises: transmitting, to a second uplink UE responsive to a failure to detect the uplink channel reservation signal, a second uplink dynamic grant for a second uplink transmission of the second uplink UE, the second uplink dynamic grant transmitted subsequent to a time at which the uplink channel occupancy signal is configured to be transmitted by the first uplink UE, and wherein the second uplink dynamic grant indicates second uplink transmission resources that start subsequent to the first uplink transmission resources.

Aspect 28: The method of any of aspects 25 through 27, wherein the transmitting the downlink dynamic grant comprises: transmitting, to a first downlink UE responsive to a failure to detect the uplink channel reservation signal, a first downlink dynamic grant for a first downlink transmission to the first downlink UE; and disabling one or more receive components associated with receiving the first uplink transmission.

Aspect 29: The method of any of aspects 25 through 28, wherein the transmitting the downlink dynamic grant comprises: transmitting, to a first downlink UE responsive to a failure to detect the uplink channel reservation signal, a first downlink dynamic grant for a first downlink transmission to the first downlink UE, the first downlink dynamic grant indicating resources for both the first portion of a shared radio frequency spectrum band and the second portion of a shared radio frequency spectrum band.

Aspect 30: The method of any of aspects 12 through 29, wherein the first uplink dynamic grant indicates that the first uplink transmission is to be started using one or more parameters associated with a full-duplex communication procedure.

Aspect 31: The method of any of aspects 12 through 30, wherein the first uplink dynamic grant includes a beam indication for a transmission beam for the first uplink transmission that is associated with a full-duplex communication procedure.

Aspect 32: The method of any of aspects 12 through 31, wherein the downlink dynamic grant includes a beam indication for a transmission beam for the downlink transmission that is associated with a full-duplex communication procedure.

Aspect 33: A UE for wireless communication, comprising one or more memories storing processor-executable code, and one or more processors coupled with the one or more memories and individually or collectively operable to execute the code to cause the UE to perform a method of any of aspects 1 through 11.

Aspect 34: A UE for wireless communication, comprising at least one means for performing a method of any of aspects 1 through 11.

Aspect 35: A non-transitory computer-readable medium storing code for wireless communication, the code comprising instructions executable by a processor to perform a method of any of aspects 1 through 11.

Aspect 36: A network entity for wireless communication, comprising one or more memories storing processor-executable code, and one or more processors coupled with the one or more memories and individually or collectively operable to execute the code to cause the network entity to perform a method of any of aspects 12 through 32.

Aspect 37: A network entity for wireless communication, comprising at least one means for performing a method of any of aspects 12 through 32.

Aspect 38: A non-transitory computer-readable medium storing code for wireless communication, the code comprising instructions executable by a processor to perform a method of any of aspects 12 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A network entity, comprising:
one or more memories storing processor-executable code; and
one or more processors coupled with the one or more memories and individually or collectively operable to execute the code to cause the network entity to:
transmit, responsive to a listen-before-talk procedure indicating a shared radio frequency spectrum band is available for a channel occupancy time, a first uplink dynamic grant for a first uplink transmission to be transmitted contemporaneously with a downlink transmission from the network entity to a downlink user equipment (UE), wherein the first uplink dynamic grant is transmitted to an uplink UE and indicates uplink transmission resources in a first portion of the shared radio frequency spectrum band;
monitor for uplink signaling indicating a successful listen-before-talk procedure associated with the uplink UE;
transmit a downlink dynamic grant for the downlink transmission to the downlink UE responsive to monitoring for the uplink signaling indicating the successful listen-before-talk procedure associated with the uplink UE, wherein the downlink dynamic grant indicates downlink transmission resources in a second portion of the shared radio frequency spectrum band; and
monitor for the first uplink transmission using the first portion of the shared radio frequency spectrum band while transmitting the downlink transmission to the downlink UE using the second portion of the shared radio frequency spectrum band.

2. The network entity of claim 1, wherein:
communications with the downlink UE and the uplink UE are performed according to a full-duplex communication procedure at the network entity, and
the first portion of the shared radio frequency spectrum band and the second portion of the shared radio frequency spectrum band occupy non-overlapping frequency resources of the shared radio frequency spectrum band, partially overlapping frequency resources of the shared radio frequency spectrum band, or fully overlapping frequency resources of the shared radio frequency spectrum band.

3. The network entity of claim 1, wherein the one or more processors are individually or collectively further operable to execute the code to cause the network entity to:
receive, from the uplink UE, an indication that the first uplink transmission will be transmitted by the UE.

4. The network entity of claim 1, wherein the first uplink dynamic grant is transmitted at a first time, and, to indicate the first uplink transmission is to start at a second time, the one or more processors are individually or collectively further operable to execute the code to cause the network entity to:
transmit, responsive to transmission of the first uplink dynamic grant, a downlink channel occupancy signal, the downlink channel occupancy signal starting upon conclusion of the transmission of the first uplink dynamic grant or starting upon expiration of a maximum gap that other devices may occupy on the shared radio frequency spectrum band, and ending at the second time.

5. The network entity of claim 1, wherein the one or more processors are individually or collectively further operable to execute the code to cause the network entity to:

monitor, prior to transmitting the downlink dynamic grant, for an uplink channel occupancy signal from the uplink UE.

6. The network entity of claim 5, wherein, to transmit the downlink dynamic grant, the one or more processors are individually or collectively operable to execute the code to cause the network entity to:

transmit, to a first downlink UE responsive to detecting the uplink channel occupancy signal, a first downlink dynamic grant for a first downlink transmission to the first downlink UE.

7. The network entity of claim 5, wherein the uplink UE is a first uplink UE and the uplink transmission resources are first uplink transmission resources, and the one or more processors are individually or collectively further operable to execute the code to cause the network entity to:

transmit, to a second uplink UE responsive to a failure to detect the uplink channel occupancy signal, a second uplink dynamic grant for a second uplink transmission of the second uplink UE, the second uplink dynamic grant transmitted subsequent to a time at which the uplink channel occupancy signal is configured to be transmitted by the first uplink UE, and wherein the second uplink dynamic grant indicates second uplink transmission resources that start subsequent to the first uplink transmission resources.

8. The network entity of claim 5, wherein, to transmit the downlink dynamic grant, the one or more processors are individually or collectively operable to execute the code to cause the network entity to:

transmit, to a first downlink UE responsive to a failure to detect the uplink channel occupancy signal, a first downlink dynamic grant for a first downlink transmission to the first downlink UE; and disable one or more receive components associated with receiving the first uplink transmission.

9. The network entity of claim 5, wherein, to transmit the downlink dynamic grant, the one or more processors are individually or collectively operable to execute the code to cause the network entity to:

transmit, to a first downlink UE responsive to a failure to detect the uplink channel occupancy signal, a first downlink dynamic grant for a first downlink transmission to the first downlink UE, the first downlink dynamic grant indicating resources for both the first portion of the shared radio frequency spectrum band and the second portion of the shared radio frequency spectrum band.

10. The network entity of claim 5, wherein the uplink channel occupancy signal is a preconfigured signal, is configured by radio resource control (RRC) signaling, is configured in an uplink scheduling control information communication, or any combinations thereof.

11. The network entity of claim 1, wherein the one or more processors are individually or collectively further operable to execute the code to cause the network entity to:

transmit, subsequent to transmitting the first uplink dynamic grant and responsive to a successful listen-before-talk procedure for the second portion of the shared radio frequency spectrum band, a downlink channel reservation signal that indicates the network entity will use the second portion of the shared radio frequency spectrum band to transmit the downlink transmission.

12. The network entity of claim 11, wherein the downlink channel reservation signal is a clear-to-send (CTS) signal that is broadcast using the second portion of the shared radio frequency spectrum band.

13. The network entity of claim 1, wherein the one or more processors are individually or collectively further operable to execute the code to cause the network entity to:

monitor, prior to transmitting the downlink dynamic grant, for an uplink channel reservation signal from the uplink UE that indicates the UE will use the first portion of the shared radio frequency spectrum band to transmit the first uplink transmission, and wherein the monitoring for the first uplink transmission is responsive to the uplink channel reservation signal.

14. The network entity of claim 13, wherein the uplink channel reservation signal is received in a slot after transmission of the first uplink dynamic grant.

15. The network entity of claim 13, wherein the uplink UE is a first uplink UE and the uplink transmission resources are first uplink transmission resources, and the one or more processors are individually or collectively further operable to execute the code to cause the network entity to:

transmit, to a second uplink UE responsive to a failure to detect the uplink channel reservation signal, a second uplink dynamic grant for a second uplink transmission of the second uplink UE, the second uplink dynamic grant transmitted subsequent to a time at which the uplink channel reservation signal is configured to be transmitted by the first uplink UE, and wherein the second uplink dynamic grant indicates second uplink transmission resources that start subsequent to the first uplink transmission resources.

16. The network entity of claim 13, wherein, to transmit the downlink dynamic grant, the one or more processors are individually or collectively operable to execute the code to cause the network entity to:

transmit, to a first downlink UE responsive to a failure to detect the uplink channel reservation signal, a first downlink dynamic grant for a first downlink transmission to the first downlink UE; and disable one or more receive components associated with receiving the first uplink transmission.

17. The network entity of claim 13, wherein, to transmit the downlink dynamic grant, the one or more processors are individually or collectively operable to execute the code to cause the network entity to:

transmit, to a first downlink UE responsive to a failure to detect the uplink channel reservation signal, a first downlink dynamic grant for a first downlink transmission to the first downlink UE, the first downlink dynamic grant indicating resources for both the first portion of the shared radio frequency spectrum band and the second portion of the shared radio frequency spectrum band.

18. A user equipment (UE), comprising:

one or more memories storing processor-executable code; and one or more processors coupled with the one or more memories and individually or collectively operable to execute the code to cause the UE to:

receive, from a network entity and at a first time, a dynamic grant for an uplink transmission to be transmitted contemporaneously with a downlink transmission from the network entity, the dynamic grant indicating transmission resources in a first portion of a shared radio frequency spectrum band for the uplink transmission, and the downlink transmission from the network entity uses a second por-
tion of the shared radio frequency spectrum band;
perform a listen-before-talk procedure for the first
portion of the shared radio frequency spectrum band;
transmit, responsive to the listen-before-talk procedure
indicating that the first portion of the shared radio
frequency spectrum band is available for the uplink
transmission, uplink signaling that occupies the
shared radio frequency spectrum band starting upon
conclusion of the listen-before-talk procedure and
ending at a second time; and
transmit the uplink transmission at the second time
based at least in part on the listen-before-talk pro-
cedure indicating whether the first portion of the
shared radio frequency spectrum band is available
for the uplink transmission.

19. The UE of claim 18, wherein the one or more
processors are individually or collectively further operable
to execute the code to cause the UE to:
transmit, responsive to the listen-before-talk procedure
indicating that the first portion of the shared radio
frequency spectrum band is available for the uplink
transmission, an indication to the network entity that
the uplink transmission will be transmitted by the UE.

20. The UE of claim 18, wherein the dynamic grant for the
uplink transmission is received at the first time, and, to
indicate the uplink transmission is to start at the second time,
the one or more processors are individually or collectively
further operable to execute the code to cause the UE to:
transmit, responsive to the listen-before-talk procedure
indicating that the first portion of the shared radio
frequency spectrum band is available for the uplink
transmission, a channel occupancy signal starting upon
conclusion of the listen-before-talk procedure and end-
ing at the second time, wherein the channel occupancy
signal comprises a sounding reference signal.

21. The UE of claim 18, wherein the one or more
processors are individually or collectively further operable
to execute the code to cause the UE to:
transmit, responsive to the listen-before-talk procedure
indicating that the first portion of the shared radio
frequency spectrum band is available for the uplink
transmission, a channel reservation indication that the
UE will use the first portion of the shared radio fre-
quency spectrum band to transmit the uplink transmis-
sion.

22. The UE of claim 18, wherein the dynamic grant
indicates that the uplink transmission is to be started using
one or more parameters associated with a full-duplex com-
munication procedure.

23. The UE of claim 22, wherein the dynamic grant
includes a beam indication for a transmission beam for the
uplink transmission that is associated with the full-duplex
communication procedure.

24. A method for wireless communication at a network
entity, comprising:
transmitting, responsive to a listen-before-talk procedure
indicating a shared radio frequency spectrum band is
available for a channel occupancy time, a first uplink
dynamic grant for a first uplink transmission to be
transmitted contemporaneously with a downlink trans-
mission from the network entity to a downlink user
equipment (UE), wherein the first uplink dynamic grant
is transmitted to an uplink UE and indicates uplink
transmission resources in a first portion of the shared
radio frequency spectrum band;

monitor for uplink signaling indicating a successful listen-
before-talk procedure associated with the uplink UE;
transmitting a downlink dynamic grant for the downlink
transmission to the downlink UE responsive to moni-
toring for the uplink signaling indicating the successful
listen-before-talk procedure associated with the uplink
UE, wherein the downlink dynamic grant indicates
downlink transmission resources in a second portion of
the shared radio frequency spectrum band; and
monitoring for the first uplink transmission using the first
portion of the shared radio frequency spectrum band
while transmitting the downlink transmission to the
downlink UE using the second portion of the shared
radio frequency spectrum band.

25. The method of claim 24, further comprising:
monitoring, prior to transmitting the downlink dynamic
grant, for an uplink channel occupancy signal from the
uplink UE.

26. The method of claim 25, wherein the uplink UE is a
first uplink UE and the uplink transmission resources are
first uplink transmission resources, and the method further
comprises:
transmitting, to a second uplink UE responsive to a failure
to detect the uplink channel occupancy signal, a second
uplink dynamic grant for a second uplink transmission
of the second uplink UE, the second uplink dynamic
grant transmitted subsequent to a time at which the
uplink channel occupancy signal is configured to be
transmitted by the first uplink UE, and wherein the
second uplink dynamic grant indicates second uplink
transmission resources that start subsequent to the first
uplink transmission resources.

27. A method for wireless communication at a user
equipment (UE), comprising:
receiving, from a network entity and at a first time, a
dynamic grant for an uplink transmission to be trans-
mitted contemporaneously with a downlink transmis-
sion from the network entity, the dynamic grant indi-
cating transmission resources in a first portion of a
shared radio frequency spectrum band for the uplink
transmission, and the downlink transmission from the
network entity uses a second portion of the shared radio
frequency spectrum band;
performing a listen-before-talk procedure for the first
portion of the shared radio frequency spectrum band;
transmit, responsive to the listen-before-talk procedure
indicating that the first portion of the shared radio
frequency spectrum band is available for the uplink
transmission, uplink signaling that occupies the shared
radio frequency spectrum band starting upon conclu-
sion of the listen-before-talk procedure and ending at a
second time; and
transmitting the uplink transmission at the second time
based at least in part on the listen-before-talk procedure
indicating whether the first portion of the shared radio
frequency spectrum band is available for the uplink
transmission.

28. The method of claim 27, further comprising:
transmitting, responsive to the listen-before-talk proce-
dure indicating that the first portion of the shared radio
frequency spectrum band is available for the uplink
transmission, an indication to the network entity that
the uplink transmission will be transmitted by the UE.

29. The method of claim 27, wherein the dynamic grant
for the uplink transmission is received at the first time and
indicates the uplink transmission is to start at the second
time, and wherein the method further comprises:

transmitting, responsive to the listen-before-talk proce-
dure indicating that the first portion of the shared radio
frequency spectrum band is available for the uplink
transmission, a channel occupancy signal starting upon
conclusion of the listen-before-talk procedure and end-
ing at the second time, wherein the channel occupancy
signal comprises a sounding reference signal.

\* \* \* \* \*